(12) United States Patent
Yamaguchi et al.

(10) Patent No.: US 9,132,731 B2
(45) Date of Patent: Sep. 15, 2015

(54) VEHICLE DRIVE FORCE DISTRIBUTION CONTROL SYSTEM

(75) Inventors: Ichiro Yamaguchi, Yokohama (JP); Yoshitaka Deguchi, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 2294 days.

(21) Appl. No.: 11/857,903

(22) Filed: Sep. 19, 2007

(65) Prior Publication Data

US 2008/0071451 A1    Mar. 20, 2008

(30) Foreign Application Priority Data

Sep. 20, 2006    (JP) .................... 2006-254108

(51) Int. Cl.
| | |
|---|---|
| *G06F 7/00* | (2006.01) |
| *G06F 17/00* | (2006.01) |
| *G06F 19/00* | (2011.01) |
| *B60K 23/08* | (2006.01) |
| *B60K 6/52* | (2007.10) |
| *B60K 17/356* | (2006.01) |
| *B60W 10/06* | (2006.01) |
| *B60W 10/08* | (2006.01) |
| *B60W 30/045* | (2012.01) |
| *B60K 7/00* | (2006.01) |
| *B60W 10/04* | (2006.01) |
| *B60W 10/18* | (2012.01) |
| *B60W 50/00* | (2006.01) |

(52) U.S. Cl.
CPC .............. *B60K 23/0808* (2013.01); *B60K 6/52* (2013.01); *B60K 17/356* (2013.01); *B60W 10/06* (2013.01); *B60W 10/08* (2013.01); *B60W 30/045* (2013.01); *B60K 7/0007* (2013.01); *B60L 2240/423* (2013.01); *B60W 10/04* (2013.01); *B60W 10/18* (2013.01); *B60W 2050/0028* (2013.01); *B60W 2300/18* (2013.01); *B60W 2520/14* (2013.01); *B60W 2710/083* (2013.01); *B60W 2720/14* (2013.01); *B60W 2720/30* (2013.01); *Y02T 10/6265* (2013.01); *Y02T 10/6286* (2013.01); *Y02T 10/642* (2013.01)

(58) Field of Classification Search
USPC .......................................... 701/69
See application file for complete search history.

(56) References Cited

U.S. PATENT DOCUMENTS

| | | | | |
|---|---|---|---|---|
| 2002/0109402 | A1* | 8/2002 | Nakamura ................ | 303/146 |
| 2006/0015236 | A1* | 1/2006 | Yamaguchi et al. ........... | 701/69 |
| 2006/0041364 | A1* | 2/2006 | Tsukasaki et al. ............. | 701/69 |

FOREIGN PATENT DOCUMENTS

| | | |
|---|---|---|
| JP | 6-117285 A | 4/1994 |
| JP | 10-114263 A | 5/1998 |
| JP | 10-295004 A | 11/1998 |

(Continued)

*Primary Examiner* — Imran Mustafa
(74) *Attorney, Agent, or Firm* — Foley & Lardner LLP

(57) ABSTRACT

A controller (8) controlling a drive force distributed to each wheel (1-4) of a vehicle sets dynamic drive force target values (Fxf, Fx$_3$, Fx$_4$) to the wheels, and determines a variation amount target ratio related to variation amounts ($\Delta$M, $\Delta$Fx, $\Delta$Fy) of a vehicle yaw moment (M), a vehicle front/aft force (Fx), and a vehicle lateral force (Fy) such that a vehicle behavior generated by the dynamic drive force target values does not vary. The controller (8) determines sets of the drive forces (Fxf(j, k), Fx$_3$(j, k), Fx$_4$(j, k)) realizing the variation amount target ratio, selects drive force command values from these sets such that each drive force command value is within a drive force limiting range, and controls a drive force regulating mechanism (20, 12, 13, 15, 16**) according to the selected drive force command values.

18 Claims, 27 Drawing Sheets

(56) References Cited

FOREIGN PATENT DOCUMENTS

| | | | |
|---|---|---|---|
| JP | 11-78843 | A | 3/1999 |
| JP | 2005-73457 | A | 3/2005 |
| JP | 2006-33927 | A | 2/2006 |
| JP | 2006-094679 | A | 4/2006 |
| JP | 2007-1330 | A | 1/2007 |

* cited by examiner

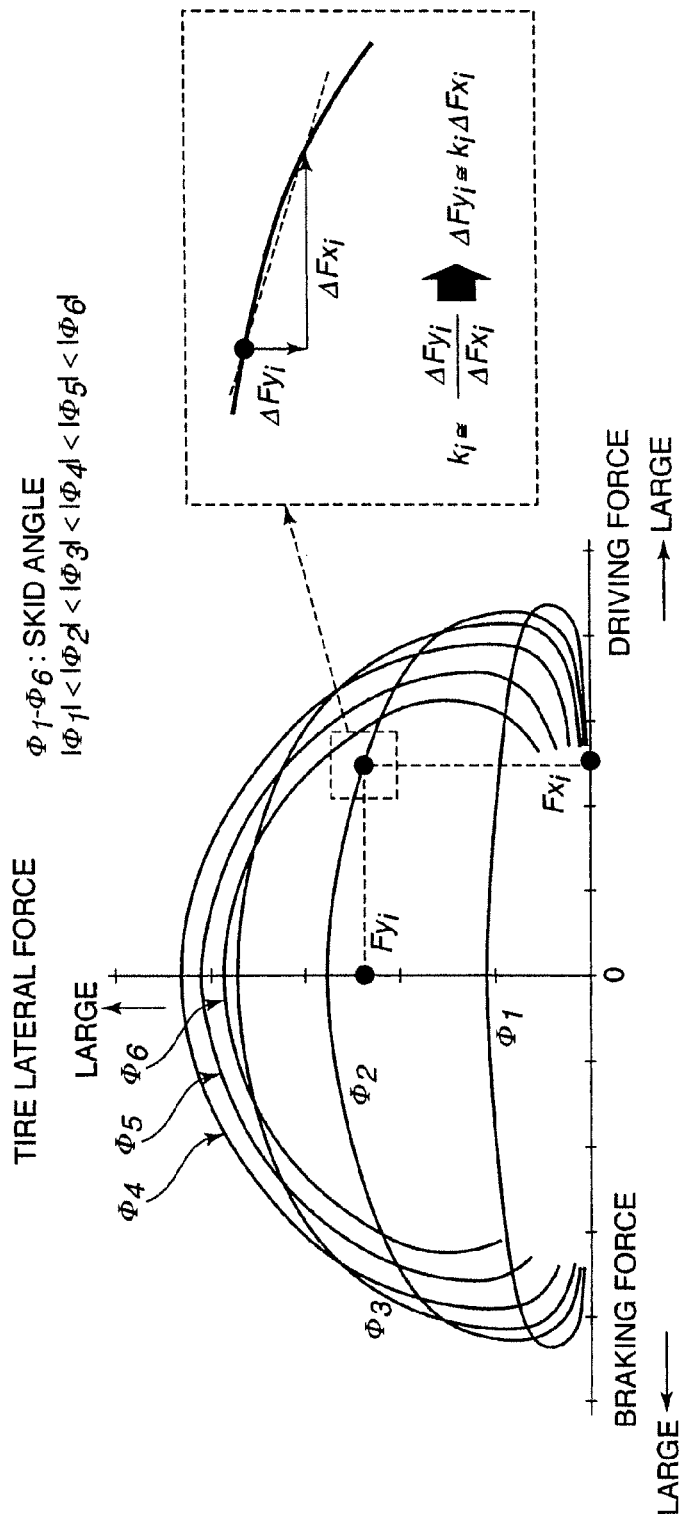

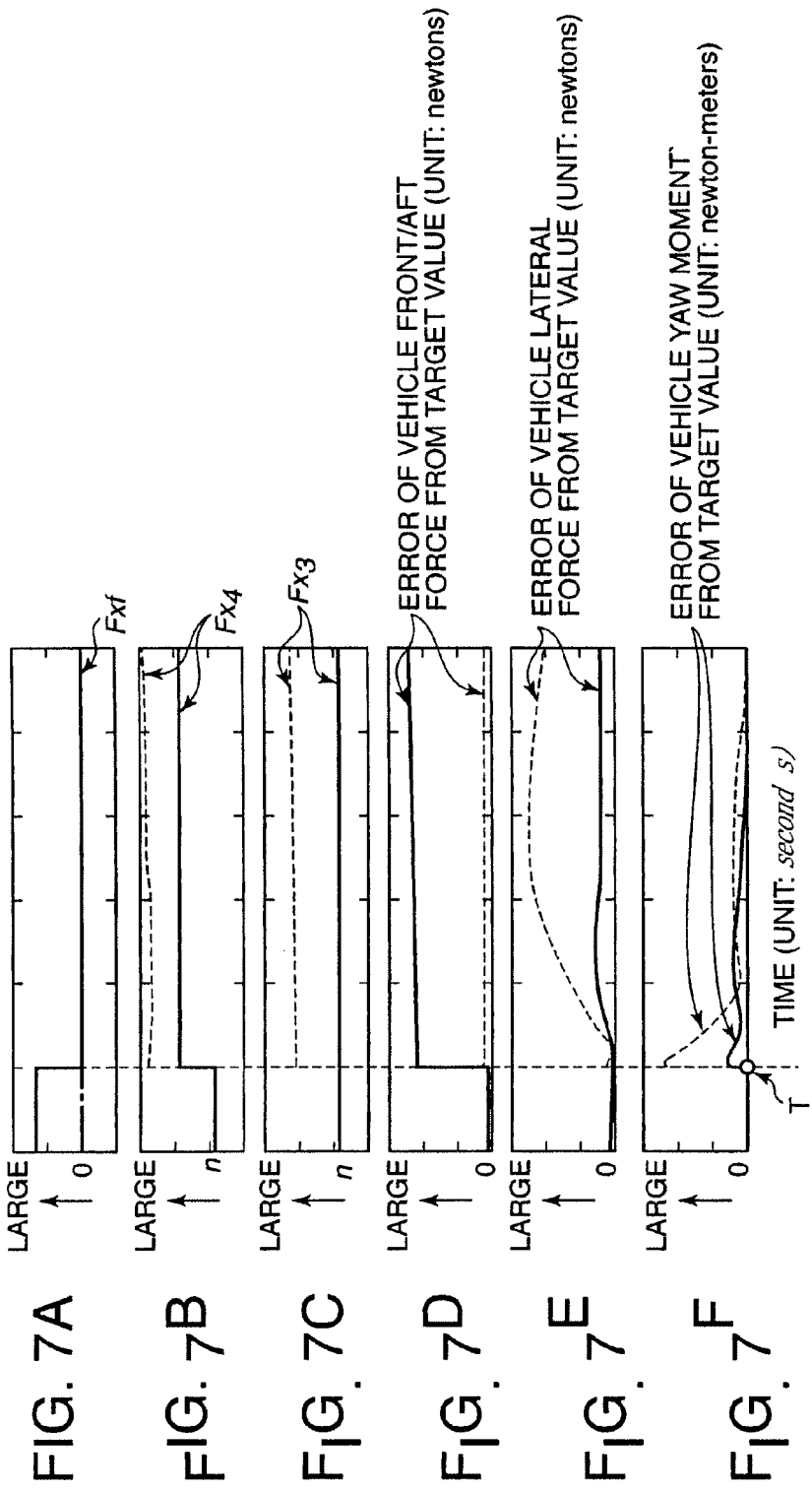

A CASE OF NEGATIVE $F_x^*$ (BRAKING)

A CASE OF NEGATIVE $F_x^*$ (BRAKING)

A CASE OF SMALL $F_x{}^*$ (GENTLE ACCELERATION)

A CASE OF SMALL $F_x{}^*$ (GENTLE ACCELERATION)

A CASE OF LARGE $F_x^*$ (RAPID ACCELERATION)

A CASE OF LARGE $F_x^*$ (RAID ACCELERATION)

VEHICLE DRIVE FORCE DISTRIBUTION CONTROL SYSTEM

FIELD OF THE INVENTION

This invention relates to the control of drive force distributed to wheels in a four-wheel drive vehicle.

BACKGROUND OF THE INVENTION

JPH10-295004A published by the Japan Patent Office in 1998 discloses a drive force distribution control system for a four-wheel drive vehicle. The four-wheel drive vehicle includes a vehicle that drives a right rear wheel and a left rear wheel independently of each other while driving a right front wheel and a left front wheel via a differential gear, a vehicle that drives a right front wheel and a left front wheel independently of each other while driving a right rear wheel and a left rear wheel via a differential gear, and a vehicle that drives each of the four wheels independently.

The prior art system corrects a drive force of each wheel so as not to cause a variation in a yaw moment acting on the vehicle body when a tendency for slippage or wheel lock is detected in a wheel or plural wheels, or in other words when a drive force that can be transmitted from a wheel or plural wheels to the road surface is limited.

According to the prior art system, when a tendency for slippage or wheel lock is detected in any one wheel or plural wheels, a drive force of the corresponding wheel(s) is rendered to be zero. Further, the drive force is redistributed such that a sum total of all of the drive forces of the wheels and a difference in the drive forces of the right wheels and the left wheels does not vary.

If the drive force is thus redistributed, a front/aft force and a yaw moment about the center of gravity of the vehicle which are generated as the sum total of the drive forces acting on the wheels, can be maintained at the same values before and after the redistribution of the drive force even when the drive force that can be transmitted from a wheel or a plural wheels to the road surface is limited, thereby preventing the vehicle drive performance from deteriorating.

SUMMARY OF THE INVENTION

When a vehicle is turning, a tire lateral force acts on each of the wheels depending on a skid angle thereof. Since the drive force and the tire lateral force have a non-linear relationship, the tire lateral force varies in a non-linear fashion with respect to the drive force acting on the wheel when it is corrected by applying the prior art drive force distribution control system.

As a result a variation in the tire lateral force of a wheel having a corrected drive force may bring about an unreproducible variation in the relationship between a vehicle lateral force generated by the tire lateral forces and a yaw moment about the center of gravity of the vehicle. Such an unreproducible variation may cause a driver of the vehicle to feel discomfort.

It is therefore an object of this invention to redistribute the drive force to vary the front/aft force, the lateral force, and the yaw moment, which act on the vehicle, while maintaining the reproducible relationship there-among, when the drive force that can be transmitted from a wheel or plural wheels to the road surface is limited.

In order to achieve the above object, this invention provides a driving/braking force control system for a vehicle having at least a pair of a right wheel and a left wheel which are independently controlled. The system comprises a driving/braking force regulating mechanism which applies a wheel driving/braking force to each of the wheels and a programmable controller which controls the driving/braking force regulating mechanism.

The controller is programmed to set dynamic wheel driving/braking force target values on the basis of a present operation state, calculate a vehicle front/aft force, a vehicle lateral force and a vehicle yaw moment as parameters representing vehicle behavior generated by the wheel dynamic driving/braking force target values, calculate a wheel driving/braking force limiting range for each of the dynamic wheel driving/braking force target values, and determine, when one of the dynamic wheel driving/braking force target values is not within the wheel driving/braking force limiting range, a vehicle behavior variation amount target value which is represented by a ratio of variation amount target values of the vehicle front/aft force, the vehicle lateral force, and the vehicle yaw moment.

The controller is further programmed to calculate a variation in a tire lateral force of each wheel accompanying a variation in the wheel driving/braking force of each wheel on the basis of a sensitivity of the tire lateral force of each wheel, calculate sets of the wheel driving/braking forces that achieve the vehicle behavior variation amount target value even when a variation in the tire lateral force of each wheel accompanying a variation in the wheel driving/braking force of each wheel occurs, select a set of the wheel driving/braking forces from the sets of the wheel driving/braking forces as wheel driving/braking force command values such that each of the wheel driving/braking forces in the selected set is within the driving/braking force limiting range, and control the driving/braking force regulating mechanism to apply wheel driving/braking forces to the right wheel and the left wheel according to the wheel driving/braking force command values.

This invention also provides a driving/braking force control method comprising setting dynamic wheel driving/braking force target values on the basis of a present operation state, calculating a vehicle front/aft force, a vehicle lateral force and a vehicle yaw moment as parameters representing vehicle behavior generated by the wheel dynamic driving/braking force target values, calculating a wheel driving/braking force limiting range for each of the dynamic wheel driving/braking force target values, and determining, when one of the dynamic wheel driving/braking force target values is not within the wheel driving/braking force limiting range, a vehicle behavior variation amount target value which is represented by a ratio of variation amount target values of the vehicle front/aft force, the vehicle lateral force, and the vehicle yaw moment.

The method further comprises calculating a variation in a tire lateral force of each wheel accompanying a variation in the wheel driving/braking force of each wheel on the basis of a sensitivity of the tire lateral force of each wheel, calculating sets of the wheel driving/braking forces that achieve the vehicle behavior variation amount target value even when a variation in the tire lateral force of each wheel accompanying a variation in the wheel driving/braking force of each wheel occurs, selecting a set of the wheel driving/braking forces from the sets of the wheel driving/braking forces as wheel driving/braking force command values such that each of the wheel driving/braking forces in the selected set is within the driving/braking force limiting range, and controlling the driving/braking force regulating mechanism to apply wheel driving/braking forces to the right wheel and the left wheel according to the wheel driving/braking force command values.

The details as well as other features and advantages of this invention are set forth in the remainder of the specification and are shown in the accompanying drawings.

BRIEF DESCRIPTION OF THE DRAWINGS

FIGS. 4A and 4B are diagrams showing relationships among the tire drive force, the tire lateral force, and a tire skid angle.

FIGS. 7A-7F are timing charts showing the wheel drive force of each wheel, a vehicle front/aft force, a vehicle lateral force, and a vehicle yaw moment obtained by a simulation applying the logic of FIG. 6.

DESCRIPTION OF THE PREFERRED EMBODIMENTS

Embodiments of this invention will now be described in detail with reference to the drawings.

A logic upon which this invention is based will be described first. A four-wheel drive vehicle which can independently drive front wheels, a right rear wheel, and a left rear wheel, is taken as an example for describing the logic.

Figure 1:
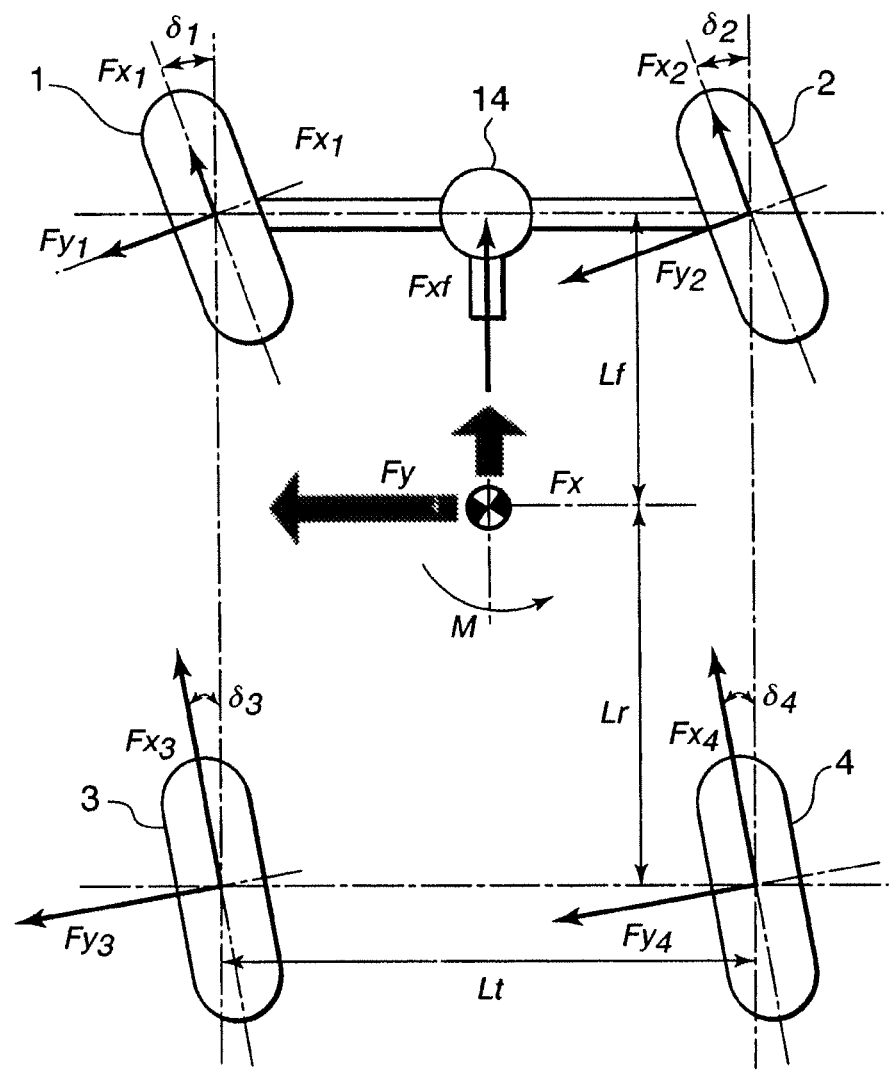
FIG. 1 is a schematic diagram of drive wheels of a vehicle describing a tire drive force, a tire lateral force, and a steering angle of a wheel of a vehicle.

Referring to FIG. 1 of the drawings, in a vehicle which can independently drive front wheels 1, 2, a right rear wheel 4, and a left rear wheel 3, a wheel drive force distributed to each wheel, a tire lateral force, and a steering angle of each wheel are shown along with a vehicle front/aft force, a vehicle lateral force, and a yaw moment about the center of gravity of the vehicle.

Figure 2A:
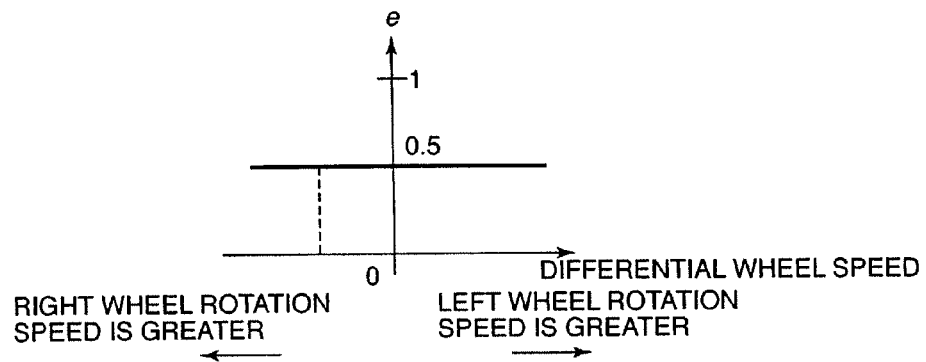
FIGS. 2A and 2B are diagrams showing distribution characteristics of a drive force to a right wheel and a left wheel of the vehicle.
Figure 2B:
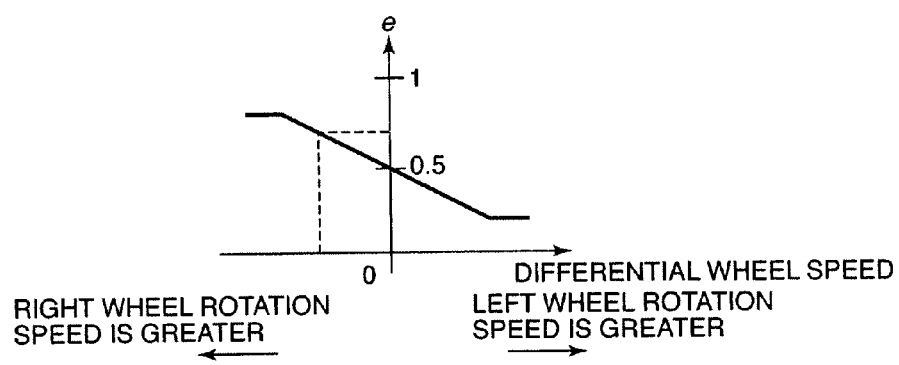

Herein, $\delta_1$-$\delta_4$ denote the steering angles in radians (rad) of the wheels 1-4. $Fx_1$-$Fx_4$ denote wheel drive forces in newtons (N) distributed to the wheels 1-4. $Fx_1$ and $Fx_2$ are drive forces of the front wheels which are distributed via a differential gear mechanism, a sum total of which corresponds to a front wheel drive force Fxf, Referring to FIGS. 2A and 2B, the wheel drive forces distributed to the right and left wheels will be described. FIG. 2A shows a case where the drive forces are distributed to the right and left wheels evenly irrespective of a difference in the wheel speeds of the right and left wheels. FIG. 2B shows a case of a limited-slip differential mechanism where the wheel drive forces distributed to the right and left wheels vary according to the difference in the wheel speeds of the right and left wheels. According to the limited-slip differential mechanism, a greater drive force is distributed to a wheel which has a lower rotation speed, and the relationship between the front wheel drive force Fxf and the drive forces $Fx_1$, $Fx_2$ of the left front wheel and the right front wheel are expressed by the following equations (1), (2).

$$Fx_1 = eFxf \quad (1)$$

$$Fx_2 = (1-e)Fxf \quad (2)$$

where e denotes a drive force distribution ratio of the front wheel drive force Fxf to the left front wheel 1.

Referring again to FIG. 1, $Fy_1$-$Fy_4$ denote the tire lateral forces in newtons (N) acting on the tire of the wheels 1-4. Fx denotes a front/aft component of the sum total of the wheel drive forces in newtons (N) whereas Fy denotes a lateral component of the sum total of the wheel drive forces in newtons (N). M denotes a vehicle yaw moment corresponding to a sum total of yaw moments about the center of gravity of the vehicle generated by the wheel drive forces in newton-meters (Nm). Lt denotes a tread length of the vehicle in meters (m). Lf denotes a distance from the center of gravity of the vehicle to the front wheels axis in meters (m), and Lr denotes a distance from the center of gravity of the vehicle to the rear wheels axis in meters (m). The wheelbase of the vehicle is defined as Ll=Lf+Lr (m). The steering angle $\delta_i$ (i=1 to 4) and the vehicle yaw moment M take positive values when directed counter-clockwise viewed from above. The steering angle $\delta_i$ takes a value of zero when the direction of the corresponding wheel coincide with the front/aft direction of the vehicle.

The wheel drive force $Fx_i$ (i=1 to 4) takes a positive value when it acts in a direction for advancing the vehicle. The tire lateral force $Fy_i$ (i=1 to 4) takes a positive value when it is directed towards the left hand side of the vehicle.

A front/aft component $Fx_i'$ and a lateral component $Fy_i'$ of a resultant force of the wheel drive force $Fx_i$ and the tire lateral force $Fy_i$ will be considered.

Figure 3:
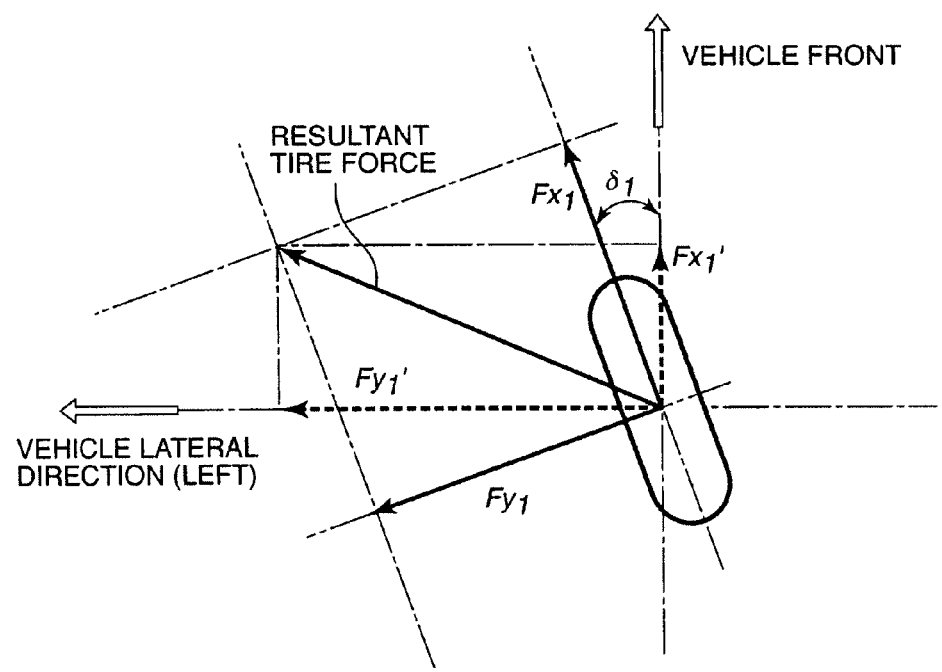
FIG. 3 is a diagram describing forces acting on a tire of the vehicle.

Referring to FIG. 3, when the steering angle $\delta_i$ (i=1 to 4) of the wheels 1-4 is given, the front/aft component $Fx_i'$ and the lateral component $Fy_i'$ of the resultant force of the wheel drive force $Fx_i$ and the tire lateral force $Fy_i$ are expressed by the following equations (3) and (4).

$$Fx_i' = Fx_i \cos \delta_i - Fy_i \sin \delta_i \tag{3}$$

$$Fy_i' = Fx_i \sin \delta_i + Fy_i \cos \delta_i \tag{4}$$

where $Fx_i'$ takes a positive value when it acts on the vehicle to advance, while $Fy_i'$ takes a positive value when it is directed towards the left hand side of the vehicle.

Assuming that a tire lateral force variation amount is $\Delta Fy_i$ when the wheel drive force $Fx_i$ has varied by a variation amount $\Delta Fx_i$, variation amounts $\Delta Fx_i'$, $\Delta Fy_i'$ of the front/aft component $Fx_i'$ and the lateral component $Fy_i'$ are expressed by the following equations (5), (6).

$$\Delta Fx_i' = \Delta Fx_i \cos \delta_i - \Delta Fy_i \sin \delta_i \tag{5}$$

$$\Delta Fy_i' = \Delta Fx_i \sin \delta_i + \Delta Fy_i \cos \delta_i \tag{6}$$

Herein, the relationship between the wheel drive force and the tire lateral force is expressed in FIGS. 4A and 4B. FIGS. 4A and 4B are diagrams defining the relationship between the wheel drive force and the tire lateral force when a wheel load and a friction coefficient of the road surface remain constant. The abscissa denotes the wheel drive force while the ordinate denotes the tire lateral force. Using the relationship expressed in FIGS. 4A and 4B, a sensitivity of the tire lateral force with respect to the wheel drive force variation amount $\Delta Fx_i$ is expressed as $k_i$ (i=1-4), providing that the current wheel drive force is $Fx_i$ and the current tire lateral force is $Fy_i$. Specifically, $k_i$ corresponds to a value of the following equation (7) obtained when the values of $\Delta Fx_i$ and $\Delta Fy_i$ are minute, as can be understood from FIGS. 4A and 4B.

$$k_i = \frac{\Delta Fy_i}{\Delta Fx_i} \tag{7}$$

When the values of $\Delta Fx_i$ and $\Delta Fy_i$ are minute and the equation (7) holds approximately, the relation $\Delta Fy_i = k_i \Delta Fx_i$ holds, and the variation amounts $\Delta Fx_i'$, $\Delta Fy_i'$ of the front/aft component $Fx_i'$ and the lateral component $Fy_i'$ when the wheel drive force $Fx_i$ has varied by a sufficiently minute amount $\Delta Fx_i$ can be expressed by the following equations (8) and (9).

$$\Delta Fx_i' = (\cos \delta_i - k_i \sin \delta_i) \Delta Fx_i = p_i \Delta Fx_i \, (p_i = \cos \delta_i - k_i \sin \delta_i) \tag{8}$$

$$\Delta Fy_i' = (\sin \delta_i + k_i \cos \delta_i) \Delta Fx_i = q_i \Delta Fx_i \, (q_i = \sin \delta_i + k_i \cos \delta_i) \tag{9}$$

$\Delta Fx_1'$, $\Delta Fx_2'$, $\Delta Fy_1'$, $\Delta Fy_2'$ can also be expressed as follows using the equations (1) and (2).

$$\Delta Fx_1' = (\cos \delta_1 - k_1 \sin \delta_1) e \Delta Fxf = e p_1 \Delta Fxf \tag{10}$$

$$\Delta Fy_1' = (\sin \delta_1 + k_1 \cos \delta_1) e \Delta Fxf = e q_1 \Delta Fxf \tag{11}$$

$$\Delta Fx_2' = (\cos \delta_2 - k_2 \sin \delta_2)(1-e) \Delta Fxf = (1-e) p_1 \Delta Fxf \tag{12}$$

$$\Delta Fy_2' = (\sin \delta_2 + k_2 \cos \delta_2)(1-e) \Delta Fxf = (1-e) q_2 \Delta Fxf \tag{13}$$

In FIG. 1, the front/aft component Fx of the sum total of the wheel drive forces, and the vehicle yaw moment M corresponding to a sum total of yaw moments about the center of gravity of the vehicle generated by the wheel drive forces can be expressed by the following equations (14)-(16). As described above, the vehicle yaw moment M takes a positive value when it is directed clockwise viewed from above.

$$Fx = Fx_1' + Fx_2' + Fx_3' + Fx_4' \tag{14}$$

$$Fy = Fy_1' + Fy_2' + Fy_3' + Fy_4' \tag{15}$$

$$M = \{(Fx_2' + Fx_4') - (Fx_1' + Fx_3')\} \times \frac{Lt}{2} + \{(Fy_1' + Fy_2') \times Lf - (Fy_3' + Fy_4') \times Lr\} \tag{16}$$

Accordingly, the variation amounts $\Delta Fx$, $\Delta Fy$, and $\Delta M$ when the wheel drive force $\_Fx_i$ has varied by a variation amount $\Delta Fx_i$ in each wheel are expressed by the following equations (17)-(19) using $p_i$ and $q_i$ in the equations (8) and (9).

$$\Delta Fx = \Delta Fx_1' + \Delta Fx_2' + \Delta Fx_3' + \Delta Fx_4' = (ep_1 + (1-e)p_2) \Delta Fxf + p_3 \Delta Fx_3 + p_4 \Delta Fx_4 \tag{17}$$

$$\Delta Fy = \Delta Fy_1' + \Delta Fy_2' + \Delta Fy_3' + \Delta Fy_4' = (eq_1 + (1-e)q_2) \Delta Fxf + q_3 \Delta Fx_3 + q_4 \Delta Fx_4 \tag{18}$$

$$\Delta M = \{(\Delta Fx_2' + \Delta Fx_4') - (\Delta Fx_1' + \Delta Fx_3')\} \times \tag{19}$$
$$\frac{Lt}{2} + \{(\Delta Fy_1' + \Delta Fy_2') \times Lf - (\Delta Fy_3' + \Delta Fy_4') \times Lr\}$$
$$= \left\{(-ep_1 + (1-e)p_2)\frac{Lt}{2} + (eq_1 + (1-e)q_2)Lf\right\} \Delta Fxf + $$
$$\left(-\frac{p_3 Lt}{2} - q_3 Lr\right) \Delta Fx_3 + \left(\frac{p_4 Lt}{2} - q_4 Lr\right) \Delta Fx_4$$

In order to cause the variation amounts $\Delta Fx$, $\Delta Fy$, and $\Delta M$ of the front/aft force Fx, the lateral force Fy, and the yaw moment M to have the ratio defined by the relation (20) below, the relation defined by following equation (21) must hold.

$$\Delta Fx : \Delta Fy : \Delta M = R_x : R_y : R_m \tag{20}$$

$$\begin{bmatrix} R_y \Delta F_x - R_x \Delta F_y \\ R_m \Delta F_x - R_x \Delta M \end{bmatrix} = \begin{bmatrix} 0 \\ 0 \end{bmatrix} \tag{21}$$

The values of $\Delta Fxf$, $\Delta Fx_3$, and $\Delta Fx_4$ which realize the relation (20) can be obtained by the following equations (22)-(25) by substituting the equations (17)-(19) for $\Delta Fx$, $\Delta Fy$, and $\Delta M$ in the equation (21). It should be noted that Rx, Ry, and Rm in the equation (20) are constants.

$$\Delta Fxf : \Delta Fx_3 : \Delta Fx_4 = Dr_f : Dr_3 : Dr_4 \tag{22}$$

where, $$Dr_f = \{2R_y p_3 p_4 - R_x(p_3 q_4 + p_4 q_3)\} \times L_t + 2R_y(p_4 q_3 - p_3 q_4) \times L_t + 2R_m(p_4 q_3 - p_3 q_4) \tag{23}$$

-continued $$Dr_3 = \{R_x(e-1)p_2q_4 + R_x(1-e)p_4q_2 + \\ e(R_xp_1q_4 + R_xp_4q_1 - 2R_yp_1p_4)\} \times L_t + \\ 2\{R_y(1-e)p_4q_2 + R_x(e-1)q_2q_4 + 2e(R_yp_4q_1 - R_xq_1q_4)\} \times L_f + \\ 2\{R_y(1-e)p_2q_4 + R_x(e-1)q_2q_4 + 2e(R_yp_1q_4 - R_xq_1q_4)\} \times L_r + \\ 2R_m\{(e-1)p_4q_2 + (1-e)p_2q_4 + e(p_1q_4 - p_4q_1)\} \qquad (24)$$

$$Dr_4 = \{R_x(1-e)p_3q_2 + R_x(1-e)p_2q_3 + \\ eR_x(-p_1q_3 + p_3q_1) + 2R_y(e-1)p_2p_3\} \times L_t + \\ 2\{R_y(e-1)p_3q_2 + R_x(1-e)q_2q_3 + 2e(R_xq_1q_3 - R_yp_3q_1)\} \times L_f + \\ 2\{R_y(e-1)p_2q_3 + R_x(1-e)q_2q_3 + 2e(R_xq_1q_3 - R_yp_1q_3)\} \times L_r + \\ 2R_m\{(e-1)p_2q_3 + (1-e)p_3q_2 + e(p_3q_1 - p_1q_3)\} \qquad (25)$$

Accordingly, when the value of Rm which is a ratio of the vehicle yaw moment variation amount ΔM, is set to be sufficiently smaller than the values of Rx and Ry, and the wheel drive force is caused to vary minutely, the vehicle yaw moment M seldom varies.

The values of ΔFxf, ΔFx$_3$, ΔFx$_4$ which maintain the vehicle lateral force and the vehicle yaw moment unchanged, or in other words keep the variation amounts ΔFy and ΔM of the vehicle lateral force Fy and the vehicle yaw moment M at zero, are expressed by the following equations (26)-(29) which correspond to the equations (22)-(25) when the values of Ry and Rm are set to be zero.

$$\Delta Fxf : \Delta Fx_3 : \Delta Fx_4 = Dx_f : Dx_3 : Dx_4 \qquad (26)$$

$$Dx_f = (p_3q_4 + p_4q_3)Lt \qquad (27)$$

$$Dx_3 = 2(eq_1q_4 - eq_2q_4 + q_2q_4)(Lf + Lr) + \{(1-e)(p_2q_4 - p_4q_2) - e(p_2q_4 - p_4q_2)\}Lt \qquad (28)$$

$$Dx_4 = 2(eq_2q_3 - eq_1q_3 + q_2q_3)(Lf + Lr) + \{(e-1)(p_2q_3 + p_3q_2) + e(p_1q_3 - p_3q_1)\}Lt \qquad (29)$$

When the wheel drive forces distributed to the wheels 1-4 are varied sufficiently minutely while keeping the ratio defined by the equation (26), the vehicle lateral force and the vehicle yaw moment do not vary.

Providing that the wheel drive force when the wheel drive force is not limited is expressed as (Fxf, Fx$_3$, Fx$_4$)=(Fxf(0), Fx$_3$(0), Fx$_4$(0)), and a drive force of any one wheel is varied by a sufficiently minute amount, correction amounts of the wheel drive forces of the other two wheels are calculated using the equation (26) from the sensitivity k$_i$ of the tire lateral force with respect to the drive force variation amount of each wheel so as to obtain an alternative wheel drive force that results in an identical vehicle lateral force and an identical vehicle yaw moment to that of the present occasion. It should be noted that the right front wheel drive force Fx$_1$ and the left front wheel drive force Fx$_2$ are herein expressed as the front wheel drive force Fxf, because the distribution ratio between Fx$_1$ and Fx$_2$ depends on the limited-slip differential mechanism 14 and hence is not controllable.

By repeatedly performing this processing, a set or plural sets of wheel drive forces which can realize a required vehicle behavior can be obtained.

Figure 5A:
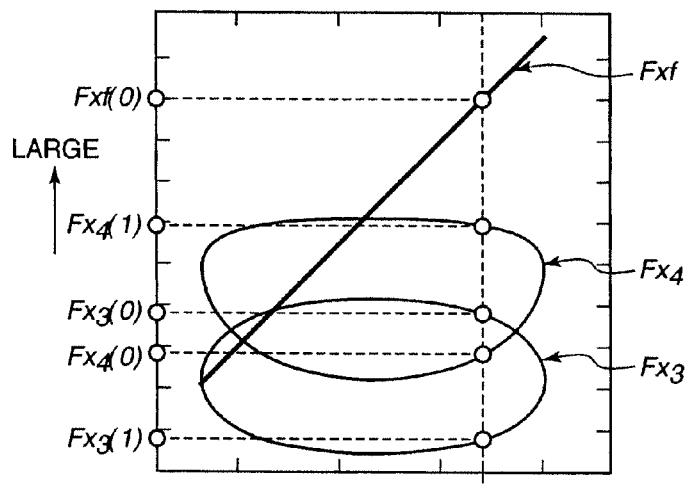
FIGS. 5A-5D are diagrams showing relationships among a wheel drive force of each wheel, a vehicle front/aft force, a vehicle lateral force, and a vehicle yaw moment.

FIGS. 5A-5D show an example of sets of wheel drive forces obtained in this manner. FIG. 5A shows a result obtained in this manner to achieve the vehicle lateral force and the vehicle yaw moment in a case where the front wheels 1, 2 are steered to the left hand side and the drive force corresponding to the running resistance is distributed to each wheel in accordance with the wheel load ratio thereof such that the vehicle performs a steady left turn at a constant running speed.

Figure 5B:
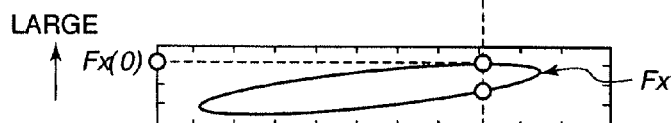
Figure 5C:
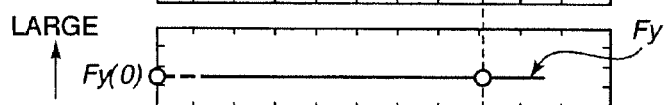
Figure 5D:
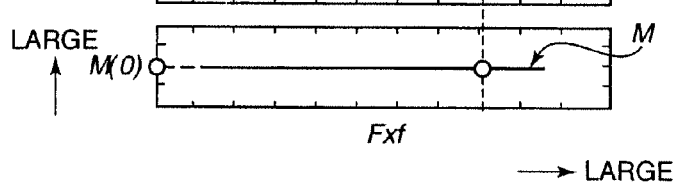

FIGS. 5B-5D show the vehicle front/aft force, the vehicle lateral force, and the vehicle yaw moment realized by the wheel drive force defined in FIG. 5A.

The abscissa in FIGS. 5A-5D represents the front wheel drive force Fxf. The ordinate in FIG. 5A denotes the wheel drive force of each wheel with respect to the front wheel drive force Fxf. The ordinate in FIG. 5B denotes the vehicle front/aft force Fx, the ordinate in FIG. 5C denotes the vehicle lateral force Fy, and the ordinate in FIG. 51) denotes the vehicle yaw moment M.

In FIGS. 5A-5D, the wheel drive force when the vehicle performs a steady turn at a constant running speed in accordance with the wheel load ratio is expressed by the equation (Fxf, Fx$_3$, Fx$_4$)=(Fxf(0), Fx$_3$(0), Fx$_4$(0)), and the resultant vehicle front/aft force Fx, vehicle lateral force Fy, and vehicle yaw moment M are expressed by the equation (Fx, Fy, M)=(Fx(0), Fy(0), M(0)).

As shown in FIGS. 5A-5D, from this equation (Fxf, Fx$_3$, Fx$_4$)=(Fxf(0), Fx$_3$(0), Fx$_4$(0)) of the wheel drive force, the wheel drive force of each wheel is obtained by minutely varying the front wheel drive force Fxf, the left rear wheel drive force Fx$_3$, and the right rear wheel drive force Fx$_4$ following the equation (26).

Accordingly, when the front wheel drive force Fxf=Fxf(0), the wheel drive forces which realize the same vehicle lateral force and the same vehicle yaw moment is either of two groups of the wheel drive forces (Fxf, Fx$_3$, Fx$_4$)=(Fxf(0), Fx$_3$(0), Fx$_4$(0)) and (Fxf, Fx$_3$, Fx$_4$)=(Fxf(0), Fx$_3$(1), Fx$_4$(1)). The group of the wheel drive force (Fxf, Fx$_3$, Fx$_4$)=(Fxf(0), Fx$_3$(0), Fx$_4$(1)), for example, does not realize the same vehicle lateral force and vehicle yaw moment.

As can be understood from FIGS. 5A-5D, the wheel drive forces obtained by minutely varying the wheel drive forces in accordance with the equation (26) realize substantially the same vehicle lateral force and vehicle yaw moment.

From within the sets of the wheel drive forces that realize the same lateral force and yaw moment, using a logic that allows limitation of the wheel drive force of each wheel, a simulation is performed with respect to a case where the front wheel drive force Fxf is limited to zero in a step like fashion at a time T while the vehicle shown in FIG. 1 performs a steady turn.

Figure 6:
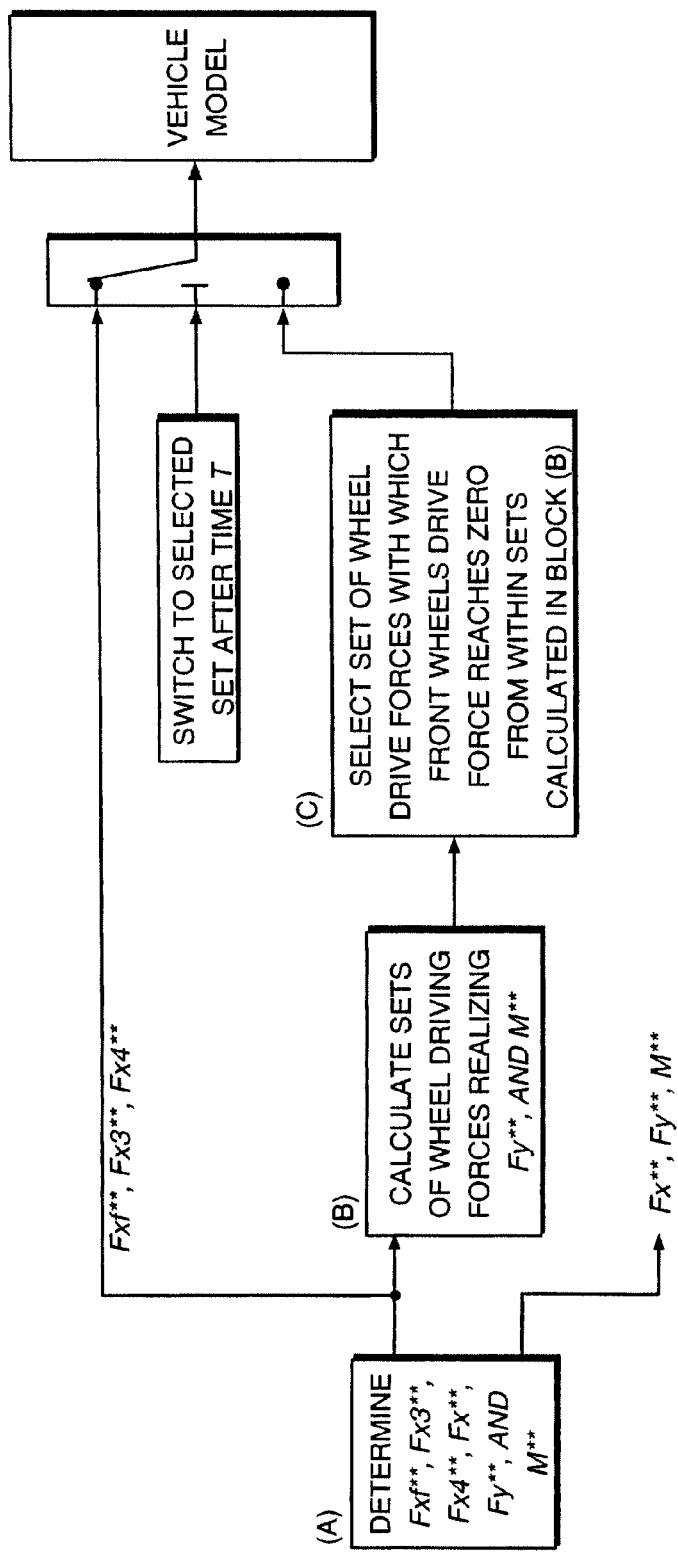
FIG. 6 is a block diagram for describing a drive force distribution control logic according to this invention, simulating a case where a front wheel drive force Fxf is limited to zero at a time T during which the vehicle is turning steadily.

FIG. 6 shows the control logic applied for the simulation. Herein, dynamic wheel drive force target values Fxf, Fx$_3$, Fx$_4$ and target values Fx, Fy, M of the vehicle front/aft force, the vehicle lateral force, and the vehicle yaw moment are determined on the basis of an accelerator pedal depression amount by a driver of the vehicle, an operation amount of a steering wheel by the driver, and a vehicle speed in a Block (A).

In a Block (B), sets of wheel drive forces that can realize the vehicle lateral force and the vehicle yaw moment realized by the dynamic wheel drive force target values Fxf, Fx$_3$, Fx$_4$** are calculated. After the time T when the front wheels driving force Fxf is limited to zero, a set of the wheel drive forces with which the front wheels driving force Fxf becomes zero is selected in a Block (C).

It should be noted that the dynamic wheel drive force target values Fxf, Fx$_3$, Fx$_4$ correspond to the target values Fx, Fy, M of the vehicle front/aft force, the vehicle lateral force, and the vehicle yaw moment. In other words, the dynamic wheel drive force target values Fxf, Fx$_3$, Fx$_4$ realize the target values Fx, Fy, M.

FIGS. 7A-7F show a result of simulation applying the logic of FIG. 6. In FIGS. 7A-7C, the ordinates denote the front wheel drive force Fxf, the drive force Fx$_4$ of the right rear wheels 4, and the drive force Fx$_3$ of the left rear wheels 3, respectively. Herein, the drive force $Fx_3$ of the left rear wheel is assumed to be zero while the other drive forces are set to have arbitrary values. In FIGS. 7D-7F, the ordinates denote an absolute value of an error between the vehicle front/aft force, the vehicle lateral force, and the vehicle yaw moment, and their respective target values Fx, Fy, M.

In FIGS. 7A-7F, the broken lines represent a result achieved by the drive force distribution control system of the prior art JPH10-295004A, and the solid lines represent a result achieved by this invention. As shown in these figures, this invention shows a higher reproducibility of the target values of the vehicle lateral force and the vehicle yaw moment than the prior art system.

The values of $\Delta Fxf$, $\Delta Fx_3$, $\Delta Fx_4$ which keep the vehicle front/aft force and the vehicle yaw moment unchanged, or in other words, keep the variation amounts $\Delta Fx$ and $\Delta M$ of the vehicle front/aft force Fx and the vehicle yaw moment M at zero, are expressed by the following equations (30)-(33) corresponding to the equations (22)-(25) where Rx and Rm are set equal to zero.

$$\Delta Fxf : \Delta Fx_3 : \Delta Fx_4 = Dy_f : Dy_3 : Dy_4 \tag{30}$$

where $$Dy_f = p_3 p_4 Lt + (-p_3 q_4 + p_4 q_3) Lr \tag{31}$$

$$Dy_3 = -ep_1 p_4 Lt + (ep_4 q_1 + (1-e)p_4 q_2) Lf + (ep_1 q_4 + (1-e)p_2 q_4) Lr \tag{32}$$

$$Dy_4 = -(1-e)p_2 p_3 Lt + (-ep_3 q_1 - (1-e)p_3 q_2) Lf + (-ep_1 q_3 - (1-e)p_2 q_3) Lr \tag{33}$$

FIGS. 8A-8D show an example of sets of wheel drive forces obtained in a similar manner to the sets of FIGS. 5A-5D, but using the equation (30).

Figure 8A:
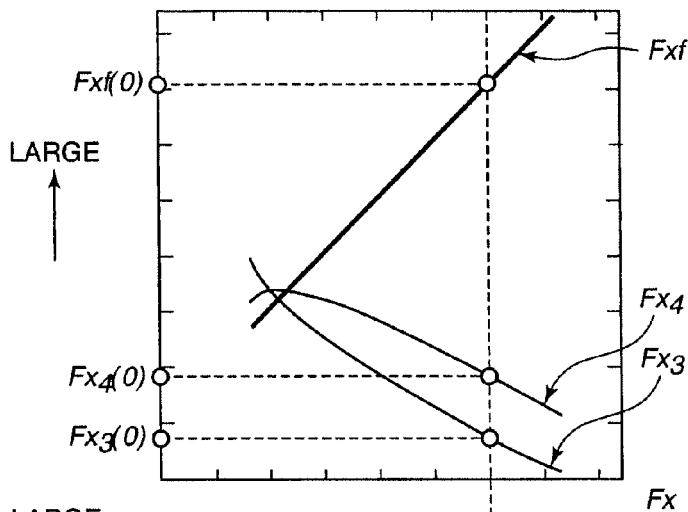
FIGS. 8A-8D are diagrams showing relationships among the wheel drive force of each wheel, the vehicle front/aft force, the vehicle lateral force, and the vehicle yaw moment.

FIG. 8A shows a result obtained in the above manner to achieve the vehicle lateral force and the vehicle yaw moment in a case where the front wheels 1, 2 are steered to the left hand side and the wheel drive force corresponding to the running resistance is distributed to each wheel in accordance with the wheel load ratio thereof such that the vehicle performs a steady left turn at a constant running speed.

Figure 8B:
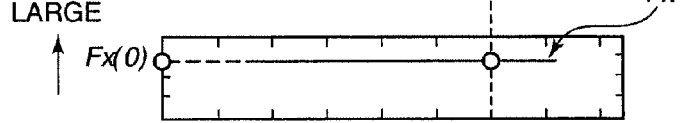
Figure 8C:
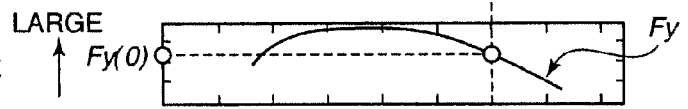
Figure 8D:
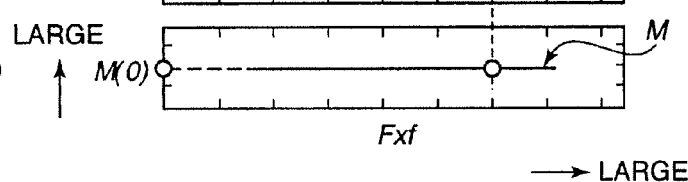

FIGS. 8B-8D show the vehicle front/aft force, the vehicle lateral force, and the vehicle yaw moment realized by the wheel drive forces defined in FIG. 5A.

The abscissas and the ordinates in FIGS. 8A-8D are set in the same manner as those of FIGS. 5A-5D.

In FIGS. 8A-8D, the wheel drive forces when the vehicle performs a steady turn at a constant running speed in accordance with the wheel load ratio is expressed by the equation (Fxf, $Fx_3$, $Fx_4$)=(Fxf(0), $Fx_3$(0), $Fx_4$(0)), and the resultant vehicle front/aft force Fx, vehicle lateral force Fy, and vehicle yaw moment M are expressed by the equation (Fx, Fy, M)= (Fx(0), Fy(0), M(0)).

As can be understood from FIGS. 8A-8D, the wheel drive forces obtained by minutely varying the wheel drive forces in accordance with the equation (30) realize substantially the same vehicle front/aft force and vehicle yaw moment.

From within the sets of the wheel drive forces that realize the same front/aft force and yaw moment, using a logic that allows limitation of the wheel drive force of each wheel, a simulation is performed with respect to a case where the left rear wheel drive force $Fx_3$ is limited to zero in a step like fashion after a time T while the vehicle shown in FIG. 1 performs a steady turn.

Figure 9:
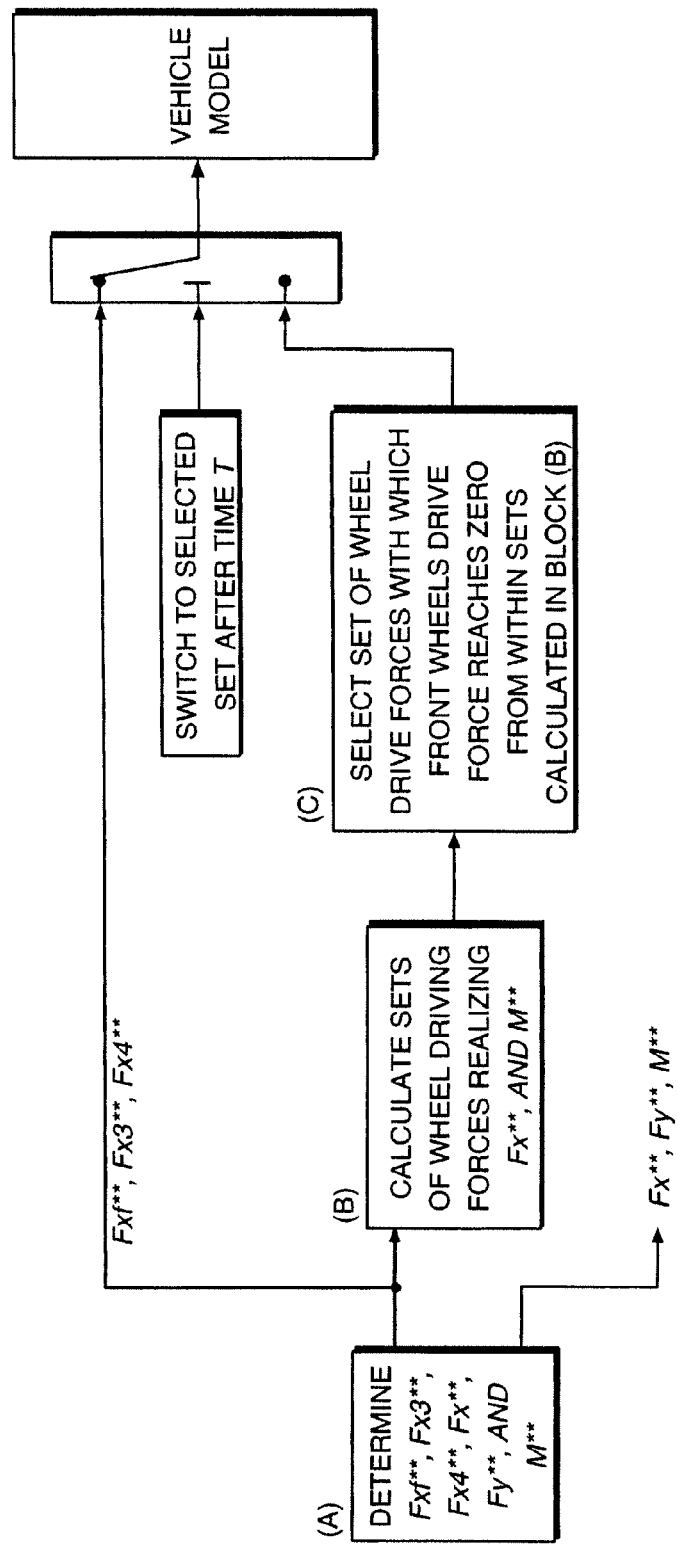
FIG. 9 is similar to FIG. 6 but shows a different control logic applied in the same situation.

FIG. 9 shows the control logic applied for the simulation. In FIG. 9, dynamic wheel drive force target values Fxf, $Fx_3$, $Fx_4$ and target values Fx, Fy, M of the vehicle front/aft force, the vehicle lateral force, and the vehicle yaw moment are determined on the basis of the accelerator pedal depression amount, the steering wheel operation amount, and the vehicle speed in a Block (A).

In a Block (B), sets of wheel drive forces that can realize the vehicle front/aft force and the vehicle yaw moment are realized by the dynamic wheel drive force target values Fxf, $Fx_3$, $Fx_4$**. After the time T when the left rear wheel driving force $Fx_3$ is limited to zero, a set of the wheel drive forces by which the left rear wheel driving force $Fx_3$ becomes zero is selected in a Block (C).

Figure 10:
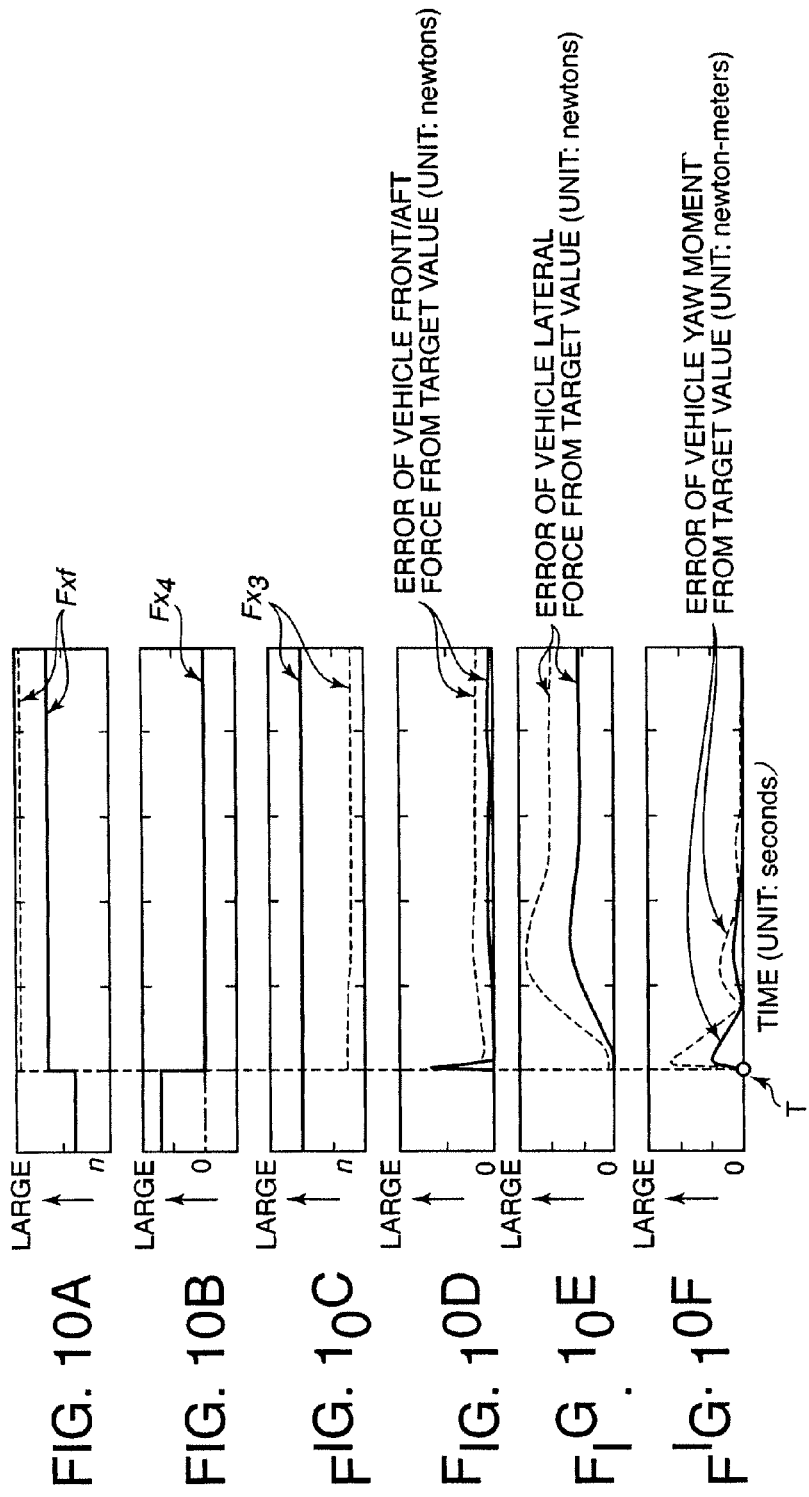
FIGS. 10A-10F are timing charts showing the wheel drive force of each wheel, the vehicle front/aft force, the vehicle lateral force, and the vehicle yaw moment obtained by a simulation applying the logic of FIG. 9.

FIGS. 10A-10F show a result of simulation applying the logic of FIG. 9. The abscissas and ordinates in FIGS. 10A-10C are set in the same manner as those of FIGS. 7A-7F.

As shown in these figures, this invention shows a higher reproducibility of the target values of the vehicle front/aft force and the vehicle yaw moment than the prior art system.

Further, when the ratio of the variation amounts $\Delta Fx$, $\Delta Fy$, $\Delta M$ of the vehicle front/aft force, the vehicle lateral force, and the vehicle yaw moment is set according to the following equation (34), the values of $\Delta Fxf$, $\Delta Fx_3$, $\Delta Fx_4$ are expressed by the equations (35)-(38) which replace the equations (22)-(25). However, it should be noted that fi appearing in the equation (34) is a vehicle skid angle in radians (rad) which is detected or estimated. In this embodiment, the vehicle skid angle is estimated in a routine of FIG. 9 which will be described later.

$$\Delta Fx : \Delta Fy : \Delta M = R_x : R_y : R_m = \cos\beta : \sin\beta : 0 \tag{34}$$

$$\Delta Fxf : \Delta Fx_3 : \Delta Fx_4 = Da_f : Da_3 : Da_4 \tag{35}$$

where $$Da_f = \tag{36}$$
$$\{2p_3 p_4 \sin\beta - (p_3 q_4 + p_4 q_3)\cos\beta\} \times L_t + 2(p_4 q_3 - p_3 q_4)\sin\beta \times L_r$$

$$Da_3 = [\{(1-e)(p_4 q_2 - p_2 q_4) + e(p_1 q_4 + p_4 q_1)\}\cos\beta - 2ep_1 p_4 \sin\beta] \times \tag{37}$$
$$L_t + 2\{(1-e)p_4 q_2 + ep_4 q_1\}\sin\beta \times L_f +$$
$$2\{(1-e)p_2 q_4 + ep_1 q_4\}\sin\beta \times L_r +$$
$$2(L_f + L_r)\{(e-1)q_2 q_4 - eq_1 q_4\}\cos\beta$$

$$Da_4 = [\{(1-e)(p_2 q_3 + p_3 q_2) + e(p_3 q_1 - p_1 q_3)\}\cos\beta + \tag{38}$$
$$2(e-1)p_2 p_3 \sin\beta] \times L_t + 2\{(e-1)p_3 q_2 - ep_3 q_1\}\sin\beta \times L_f +$$
$$2\{(e-1)p_2 q_3 - ep_1 q_3\}\sin\beta \times L_r +$$
$$2(L_f + L_r)\{(1-e)q_2 q_3 + eq_1 q_3\}\cos\beta$$

By controlling the variation amounts $\Delta Fx$, $\Delta Fy$, $\Delta M$ of the vehicle front/aft force, the vehicle lateral force, and the vehicle yaw moment to satisfy the ratio defined by the equation (34), variations in a vehicle centripetal acceleration $\alpha$ having a unit of meters per square second (m/sec²) and a vehicle yaw rate $\gamma$ having a unit of radians per second (rad/sec), as well as the vehicle skid angle $\beta$ (rad) can be suppressed.

Figure 22:
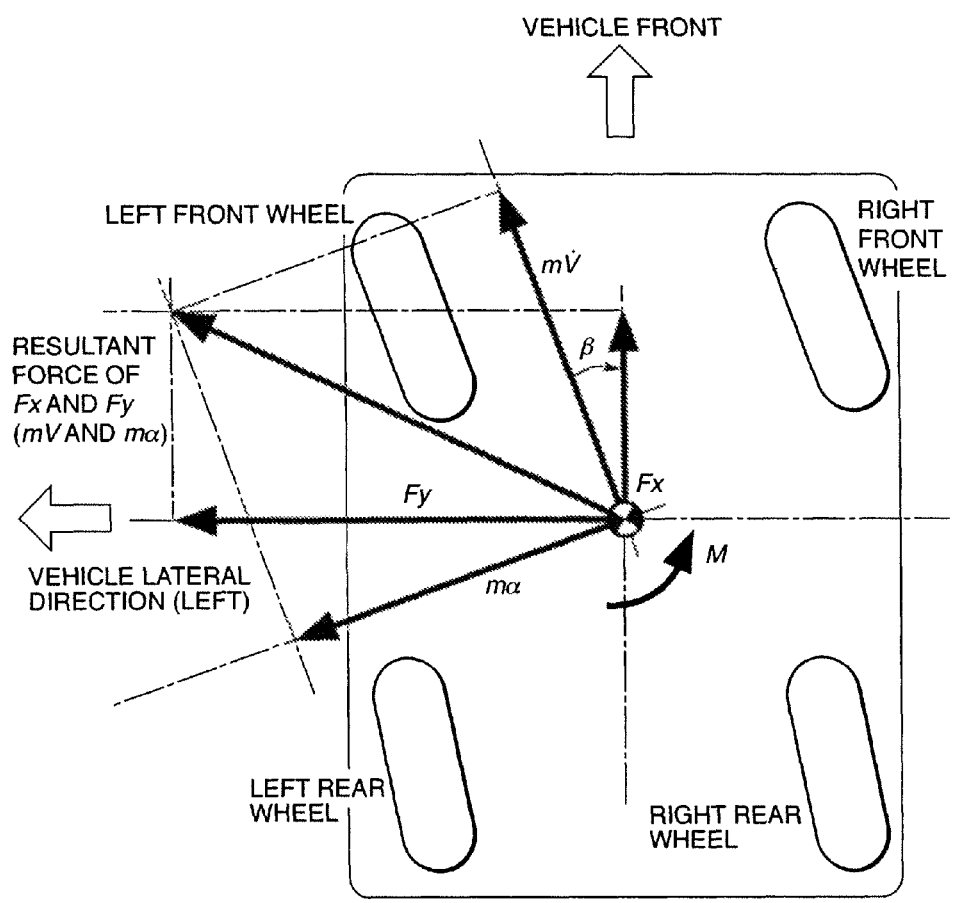
FIG. 22 is a diagram describing loads acting on a center of gravity of a vehicle.

Referring to FIG. 22, the reason for this suppression will be described.

First the reason why variation in the vehicle centripetal acceleration $\alpha$ and the yaw rate $\gamma$ are suppressed will be described.

The vehicle front/aft force Fx, the vehicle lateral force Fy, the centripetal acceleration $\alpha$, and the vehicle skid angle $\beta$ have the relationship shown in FIG. 22. Providing that a mass of the vehicle is m having a unit of kilograms (kg), and the vehicle speed is V (m/sec), Fx, Fy, m, α, γ have a relationship expressed by the following equations (39)-(41).

$$Fx = m\{\dot{V}\cos\beta - \alpha\sin\beta\} \quad (39)$$

$$Fy = m\{\dot{V}\sin\beta + \alpha\cos\beta\} \quad (40)$$

$$M = I\dot{\gamma} \quad (41)$$

Providing that variation amounts in a differential $\dot{V}$ of the vehicle speed V, the centripetal acceleration α, and a differential $\dot{\gamma}$ of the yaw rate γ are expressed as $\Delta\dot{V}$, $\Delta\alpha$, $\Delta\dot{\gamma}$, respectively, when the vehicle front/aft force, the vehicle lateral force, and the vehicle yaw moment are varied by ΔFx, ΔFy, ΔM, respectively, the vehicle front/aft force, the vehicle lateral force, and the vehicle yaw moment after the variation, i.e., Fx+ΔFx, Fy+ΔFy, and M+ΔM, are expressed by the following equations (42)-(44).

$$Fx + \Delta Fx = m\{(\dot{V} + \Delta\dot{V})\cos\beta - (\alpha + \Delta\alpha)\sin\beta\} \quad (42)$$

$$Fy + \Delta Fy = m\{(\dot{V} + \Delta\dot{V})\sin\beta + (\alpha + \Delta\alpha)\cos\beta\} \quad (43)$$

$$M + \Delta M = I(\dot{\gamma} + \Delta\dot{\gamma}) \quad (44)$$

Calculating the difference between the equations (42)-(44) and the equations (39)-(41), the variation amounts ΔFx, ΔFy, ΔM in the vehicle front/aft force, the vehicle lateral force, and the vehicle yaw moment are expressed by the following equations (45)-(47).

$$\Delta Fx = m\{\Delta\dot{V}\cos\beta - \Delta\alpha\sin\beta\} \quad (45)$$

$$\Delta Fy = m\{\Delta\dot{V}\sin\beta + \Delta\alpha\cos\beta\} \quad (46)$$

$$\Delta M = I\Delta\dot{\gamma} \quad (47)$$

Since the ratio of the variation amounts ΔFx, ΔFy, ΔM of the vehicle front/aft force, the vehicle lateral force, and the vehicle yaw moment is set according to the equation (34), providing that ΔFx is expressed by the following equation ΔFx=k cos β where k is an arbitrary constant, ΔFy and ΔM can be expressed as ΔFy=k sin β, and ΔM=0, respectively. By substituting these values into the equations (45)-(47), the following equations (48)-(50) are obtained.

$$k\cos\beta = m\{\Delta\dot{V}\cos\beta - \Delta\alpha\sin\beta\} \quad (48)$$

$$k\sin\beta = m\{\Delta\dot{V}\sin\beta + \Delta\alpha\cos\beta\} \quad (49)$$

$$0 = I\Delta\dot{\gamma} \quad (50)$$

By solving the equations (48) and (49) to eliminate ΔV', Δα is found to be 0. If the ratio of ΔFx, ΔFy, and ΔM coincides with the ratio defined by the equation (34), the variation amount Δα of the vehicle centripetal acceleration α can be zero, and the variation amount αγ' of the differential of the vehicle yaw rate γ can also be zero from the equation (50), and hence variation in the vehicle centripetal acceleration α and the vehicle yaw rate γ can be suppressed.

Next, the reason why variation in the vehicle skid angle β can be suppressed will be described. The vehicle skid angle β is an angle subtended by a front/aft component vx (m/sec) of the vehicle speed V and a lateral component vy (m/sec) of the same, and is expressed by the following equation (51).

$$\beta = \tan^{-1}\frac{v_y}{v_x} \quad (51)$$

A time differential $\dot{\beta}$ of the skid angle β can be expressed by the equation (52) from the relations Fx=m$\dot{v}_x$, Fy=m$\dot{v}_y$, $\dot{v}_x$=$F_x$/m+$v_y$γ, and $\dot{v}_y$=$F_y$/m−$v_x$γ.

$$\dot{\beta} = \frac{d}{dt}\left(\tan^{-1}\frac{v_y}{v_x}\right) \quad (52)$$

$$= \frac{1}{1+\left(\frac{v_y}{v_x}\right)^2}\left(\frac{v_x\dot{v}_y - \dot{v}_x v_y}{v_x^2}\right)$$

$$= \frac{1}{mV}(F_y\cos\beta - F_x\sin\beta) - \gamma$$

Providing that a variation amount in the differential $\dot{\beta}$ when the vehicle front/aft force, the vehicle lateral force, and the vehicle yaw moment are varied by ΔFx, ΔFy, ΔM, respectively, is $\Delta\dot{\beta}$, $\dot{\beta}+\Delta\dot{\beta}$ can be expressed by the equation (53) using the vehicle front/aft force after variation Fx+ΔFx, and the vehicle lateral force after variation Fy+ΔFy.

$$\dot{\beta} + \Delta\dot{\beta} = \frac{1}{mV}\{(F_y + \Delta F_y)\cos\beta - (F_x + \Delta F_x)\sin\beta\} - \gamma \quad (53)$$

Accordingly, the variation amount $\Delta\dot{\beta}$ in the differential of the vehicle skid angle can be expressed by the equation (54) by subtracting the right term of the equation (52) from the right term of the equation (53).

$$\Delta\dot{\beta} = \frac{1}{mV}\{\Delta F_y\cos\beta - \Delta F_x\sin\beta\} \quad (54)$$

If the ratio between ΔFx and ΔFy is as expressed by the equation (34), the variation amount $\Delta\dot{\beta}$ in the differential of the vehicle skid angle β is zero, and hence the variation in the vehicle skid angle β can be suppressed as in the case of the variation in the vehicle centripetal acceleration α and the vehicle yaw rate γ.

The basic idea of this invention is as described above.

Next, an embodiment of this invention applying the above basic idea to drive force distribution control of a vehicle will be described.

Figure 11:
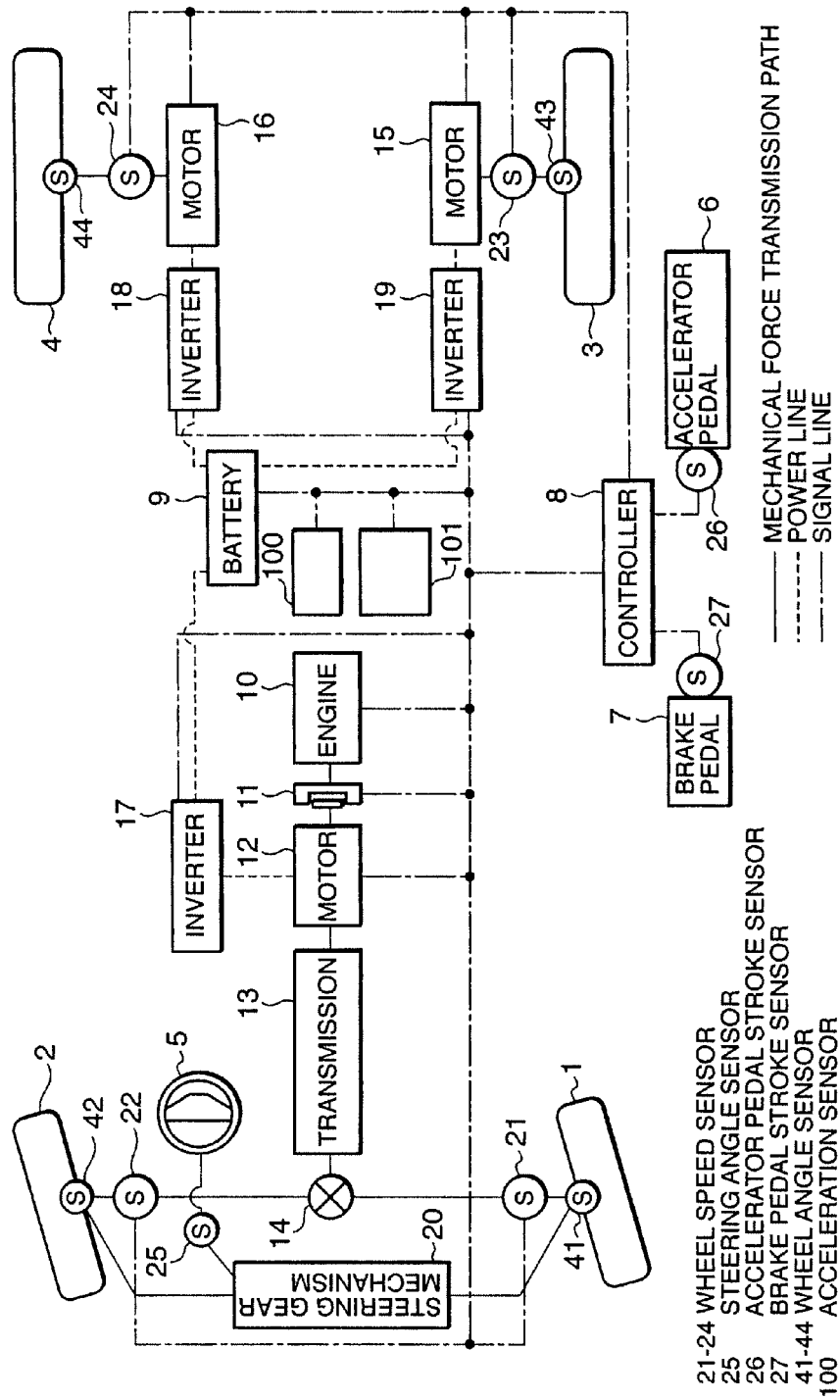
FIG. 11 is a schematic diagram of a vehicle drive force distribution control system according to this invention.

Referring to FIG. 11, the vehicle comprises an internal combustion engine 10 and an electric motor 12 driven by electric power supplied from a battery 9, as a drive force source of front wheels 1, 2. The drive force output from the engine 10 and the motor 12 is transmitted to the right front wheel 2 and the left front wheel 1 via a transmission 13 and the limited-slip differential mechanism 14. A clutch 11 is interposed between the internal combustion engine 10 and the electric motor 12 such that the vehicle can travel using only a drive force supplied from the electric motor 12 by releasing the clutch 11 when the internal combustion engine 10 is not operative.

The vehicle comprises an electric motor 16 for driving the right rear wheel 4 and an electric motor 15 for driving the left rear wheel 3. These rear wheels 3, 4 are driven independently of each other. The electric motors 15, 16 operate using electric power supplied from the battery 9. The limited-slip differential gear mechanism 14 has the characteristic shown in FIG. 2B.

The electric motors 12, 15, 16 are constituted by alternate current motors such as three phase synchronous motors or three phase induction motors that can be operated to generate electric power as well as to supply drive force. The battery 9 is constituted by a nickel-hydrogen battery or a lithium-ion battery. The vehicle further comprises inverters 17-19 which convert alternate current generated by the electric motors 12, 15, 16 into direct current to charge the battery 9 as well as convert direct current discharged from the battery 9 into direct current to drive the electric motors 12, 15, 16.

Wheel rotation speeds of the wheels 1-4 are detected by wheel speed sensors 21-24 disposed in the vicinity of the wheels 1-4 and input respectively into a controller 8 as signals. The wheels 1-4 have an identical diameter R. The electric motors 15, 16 are connected directly to the rear wheels 3, 4, respectively, such that the reduction ration is unity.

A front/aft acceleration and a lateral acceleration of the vehicle are detected by an acceleration sensor 100 disposed at the center of gravity of the vehicle. The vehicle yaw rate is detected by a yaw rate sensor 101. The detected front/aft acceleration and lateral acceleration of the vehicle and the vehicle yaw rate are input respectively into the controller as signals.

A steering operation of a steering wheel 5 by the driver of the vehicle is transmitted to the front wheels 1, 2 via a steering gear mechanism 20, and the steering angles of the front wheels 1, 2 are thereby determined. A variation amount of the steering angles of the front wheels 1, 2 is set to be $1/16$ of a variation amount of the steering angle of the steering wheel 5.

The steering angles of the wheels 1-4 are detected by wheel angle sensors 41-44, and the detected wheel angles are input into the controller 8 as signals.

The steering operation angle of the steering wheel 5 by the driver is detected by a steering angle sensor 25. A depression amount of an accelerator pedal 6 with which the vehicle is provided is detected by an accelerator pedal stroke sensor 26 as an accelerator pedal depression amount. A depression amount of a brake pedal with which the vehicle is provided is detected by a brake pedal stroke sensor 27 as a brake pedal depression amount. The detection data by these sensors 25-27 are also input into the controller 8 as signals.

The controller 8 is constituted by a microcomputer comprising a central processing unit (CPU), a read-only memory (ROM), a random access memory (RAM), and an input/output interface (I/O interface). The controller 8 may be constituted by a plurality of microcomputers.

Based on the input signals as described above, the controller 8 calculates the target wheel drive forces to the wheels 1-4 and outputs operation command values for various actuators such as the internal combustion engine 10, the electric motors 12, 15, 16 and the transmission 13 so as to achieve the target wheel drive forces.

Figure 12A:
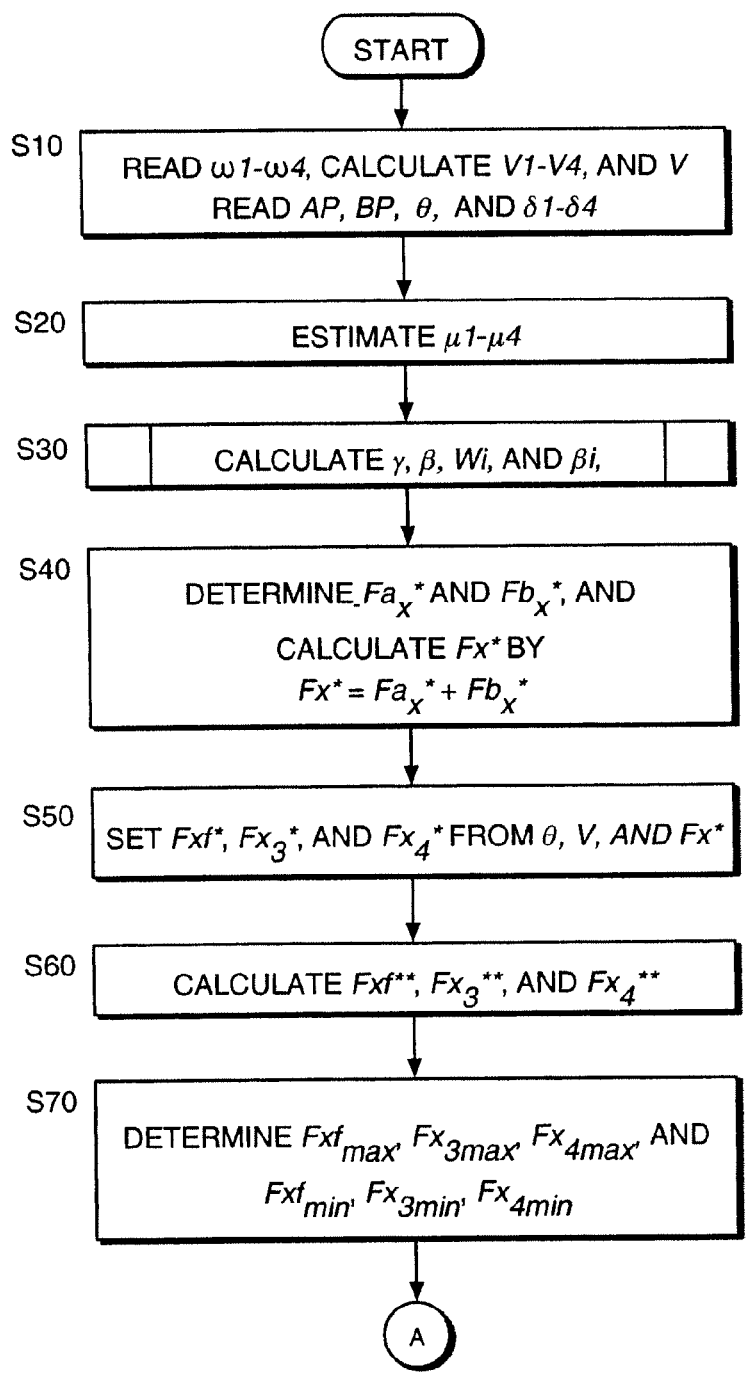
FIGS. 12A and 12B are a flowchart describing a vehicle drive force distribution control routine performed by a controller according to this invention.
Figure 12B:
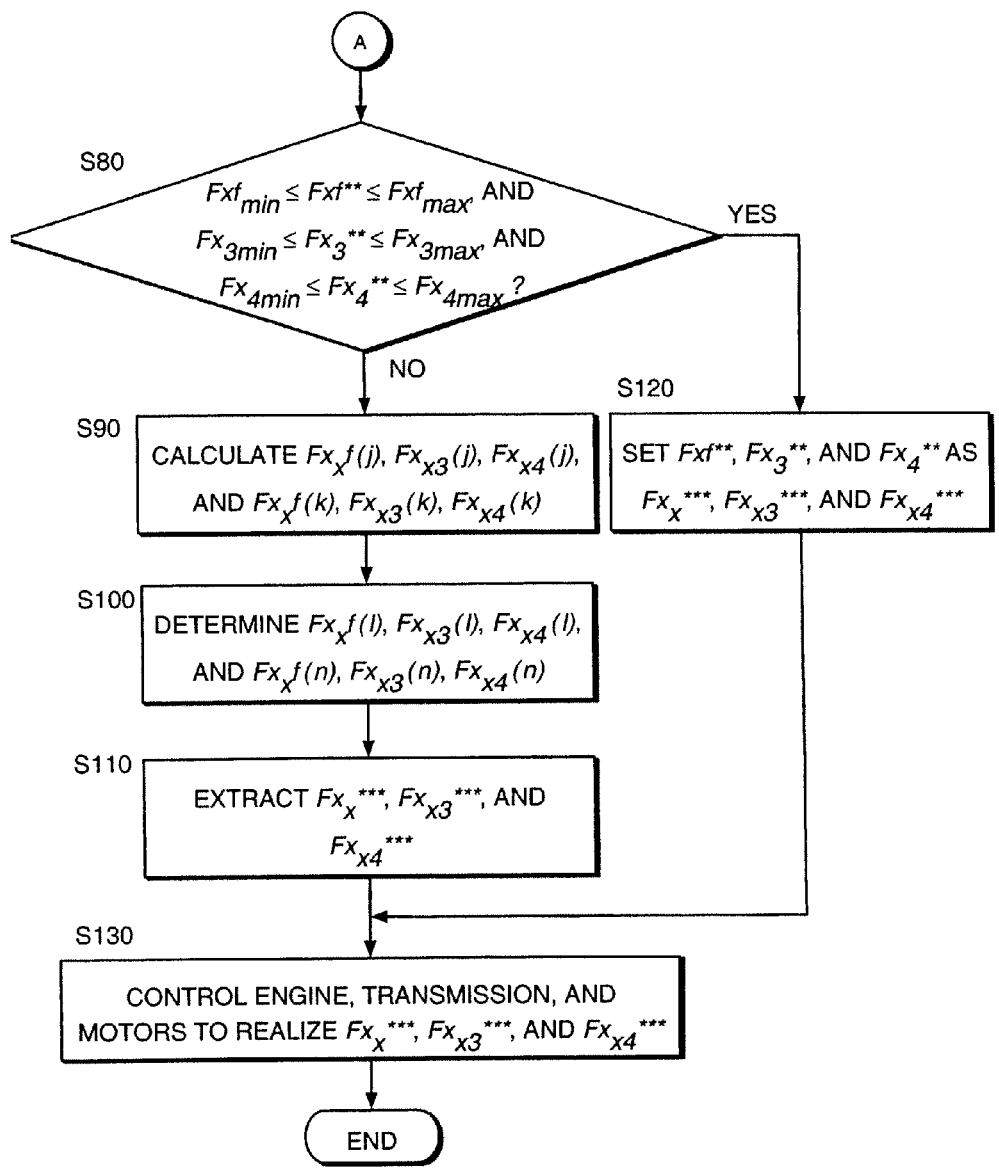

Referring to FIGS. 12A and 12B next, a vehicle drive force distribution control routine performed by the controller 8 for this purpose will be described. The controller 8 performs this routine at regular intervals, ten milliseconds, for example.

In a step S10, the controller 8 reads the wheel rotation speeds $\omega_1$, $\omega_2$, $\omega_3$, and $\omega_4$ of the wheels 1-4 detected by the wheel speed sensors 21-24. The controller 8 calculates wheel running speeds V1, V2, V3, and V4 of the wheels 1-4 from the wheel rotation speeds $\omega_1$, $\omega_2$, $\omega_3$, and $\omega_4$, and the radius R of the wheels 1-4. The controller 8 further calculates a vehicle speed V using the following equation (55) from the wheel running speeds V1, V2, V3, and V4, $$V = \frac{(V1 + V2 + V3 + V4)}{4} \quad (55)$$

The controller 8 reads an accelerator pedal depression amount AP detected by the accelerator pedal stroke sensor 26, a brake pedal depression amount BP detected by the brake pedal stroke sensor 27, a steering operation angle θ of the steering wheel 5 detected by the steering angle sensor 25, a vehicle front/aft acceleration αx and a vehicle lateral acceleration αy detected by the acceleration sensor 100, a vehicle yaw rate γ detected by the yaw rate sensor 101, and steering angles $\delta_1$, $\delta_2$, $\delta_3$, and $\delta_4$ of the wheels 1-4 detected by the wheel angle sensors 41-44.

The controller 8 calculates a drive force distribution ratio e to the left front wheel 1 of the front wheels 1, 2, which are connected to the electric motor 13 via the limited-slip differential mechanism by referring to a map having the characteristic shown in FIG. 2B. The controller 8 also calculates a speed ratio ω of the transmission 13.

In the following description, the vehicle speed V and the wheel running speeds V1-V4 take positive values in the advancing direction of the vehicle. The steering operation angle θ of the steering wheel 5 takes a positive value when it is operated counter-clockwise. The vehicle front/aft acceleration αx takes a positive value when the vehicle accelerates forward. The vehicle lateral acceleration αy takes a positive value when the vehicle accelerates towards the center in a left turn. The vehicle yaw rate γ takes a positive value in a counter-clockwise direction viewed from above.

If the vehicle is not provided with the wheel angle sensors 41-44, this invention can still be implemented by calculating a steering angle $\delta_i$ of the wheels 1-4 from the steering operation angle θ of the steering wheel 5. In this case, the steering angles $\delta_1$, $\delta_2$ of the front wheels 1, 2 are set as $\delta_1 = \delta_2 = \theta/16$, while the steering angles $\delta_3$, $\delta_4$ of the rear wheels 3, 4 are set as $\delta_3 = \delta_4 = 0$, for example. It is preferable that the steering angle of the wheels 1-4 is corrected by considering the effect of suspension such as compliance steer and roll steer.

In a step S20, the controller 8 estimates road surface friction coefficients μ1-μ4 of the wheels 1-4. An estimating method for estimating the road surface friction coefficients of the vehicle wheels is disclosed for example in JPH11-78843, published by the Japan Patent Office in 1999. JPH11-78843 discloses estimation of the road surface friction coefficient of the wheels by estimating a gradient of a friction coefficient between the tire and the road surface.

A method disclosed in JPH 10-114263 published by the Japan Patent Office in 1998 may also be applied. JPH 10-114263 discloses estimation of the road surface friction coefficient of the wheels based on a gradient of a braking torque or a driving torque with respect to a slip speed, which is regarded as a physical quantity equivalent to the gradient of the road surface friction coefficient of the wheels.

In a step S30, the controller 8 calculates the vehicle yaw rate γ, the vehicle skid angle β, a wheel load Wi of each wheel 1-4, and a wheel skid angle βi of each wheel 1-4, which are state quantities of the vehicle, from the dynamic wheel drive force target values Fxf*, $Fx_3$*, $Fx_4$*** of the front wheels 1, 2, the left rear wheel 4, and the right front wheel 3, respectively, which were calculated in a step S130 on the preceding occasion when the routines was performed, and the vehicle speed V obtained in the step S10. The method of calculation will be described later with reference to a flowchart shown in FIG. 19.

Herein, the sign of βi is positive when the angle of the direction of the wheel speed measured from the front/aft direction of the vehicle is counter-clockwise when viewed from above.

In a step S40, the controller 8 calculates a static vehicle front/aft force target value Fx* from the accelerator pedal depression amount AP, the brake pedal depression amount BP, and the vehicle speed V using the equation (56) below.

$$F_x^* = Fa_x^* + Fb_x^* \quad (56)$$

Figure 13:
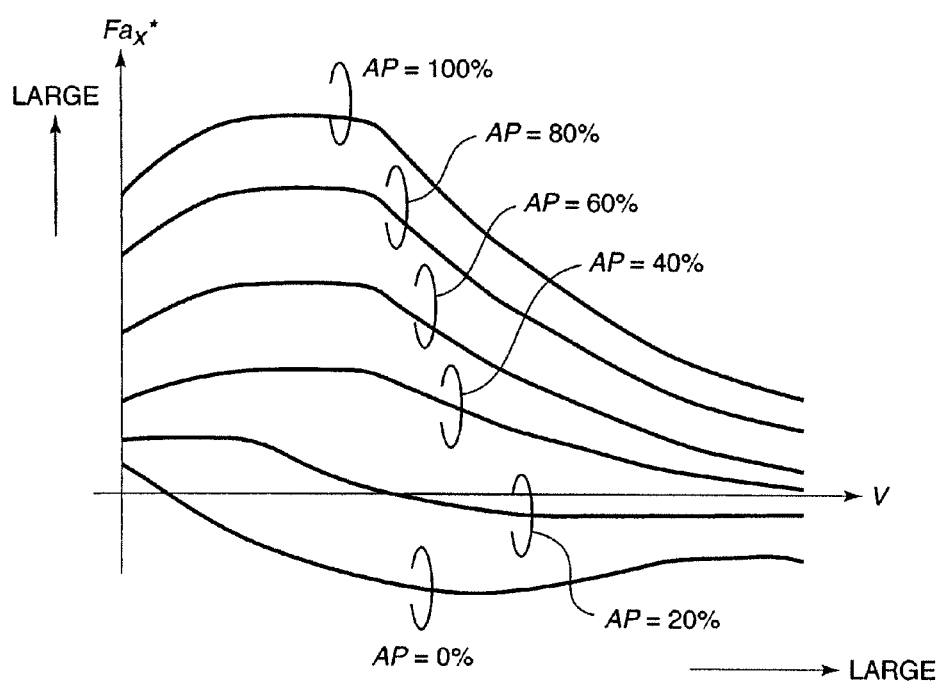
FIG. 13 is a diagram showing the characteristic of a map stored by the controller defining a relationship of a vehicle speed, an accelerator pedal depression amount, and a target drive force.
Figure 14:
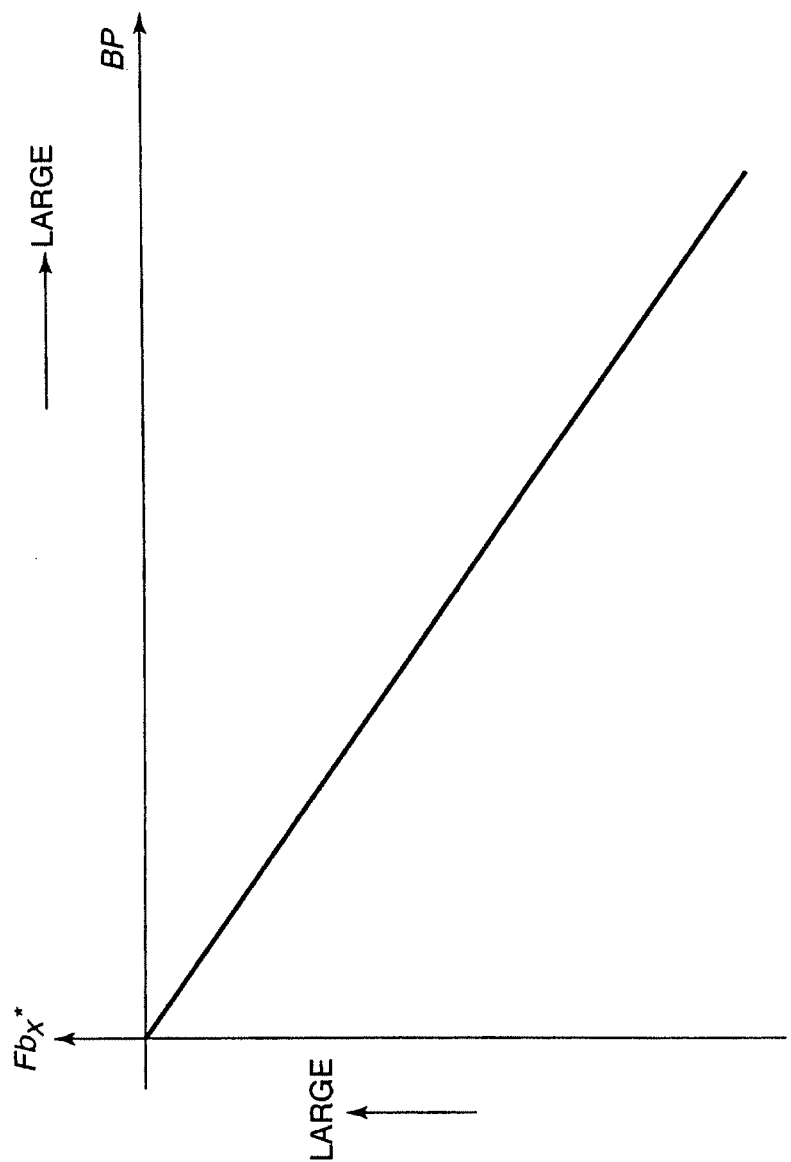
FIG. 14 is a diagram showing the characteristic of a map stored by the controller defining the relationship of the vehicle speed, the accelerator pedal depression amount, and a target braking force.
Figure 15A:
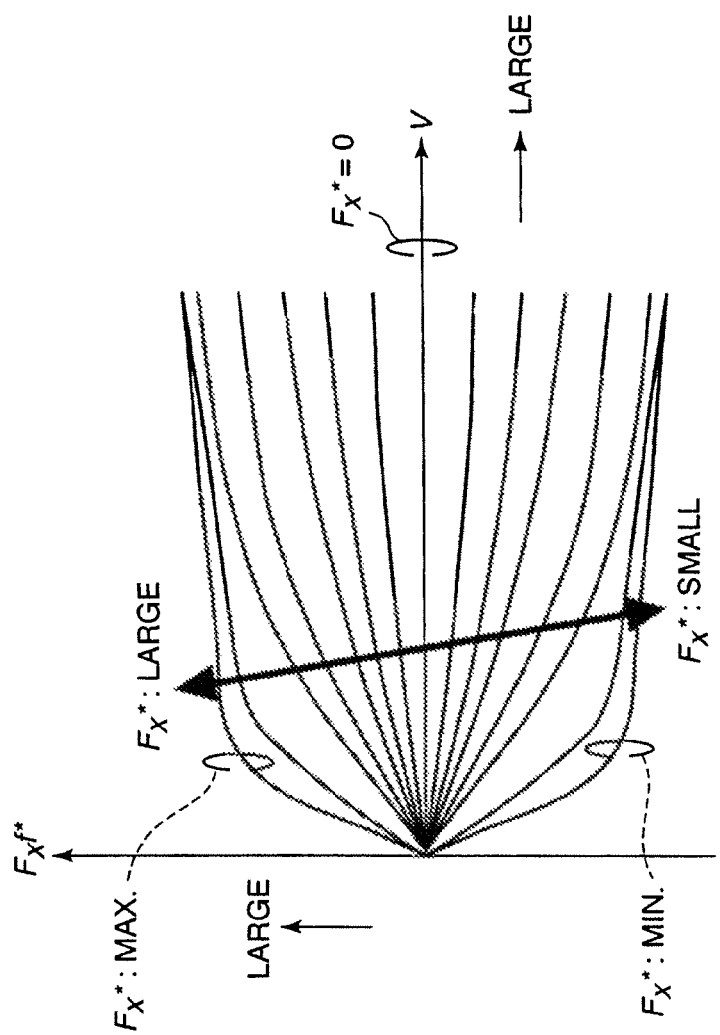
FIGS. 15A-15G are diagrams showing the characteristic of a map stored by the controller defining the relationship of the vehicle speed, a steering angle, and a static wheel drive force.
Figure 15B:
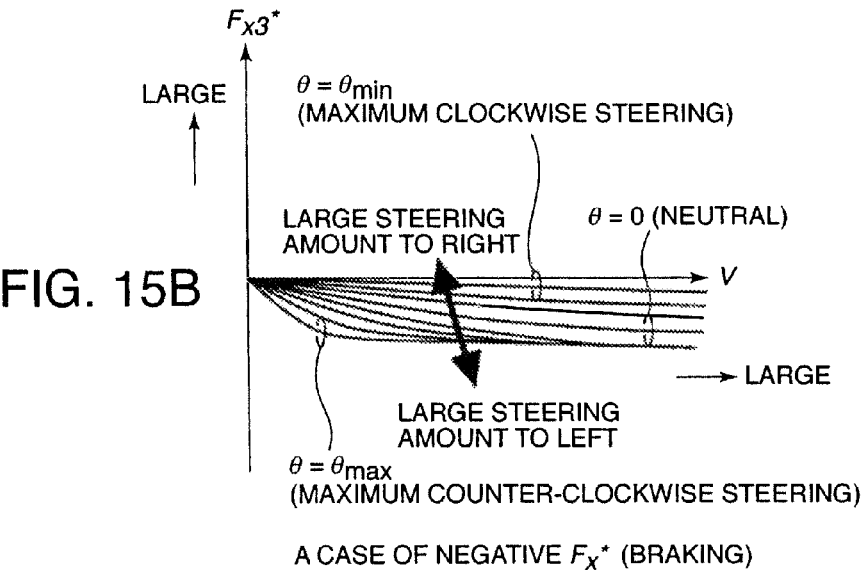
Figure 15C:
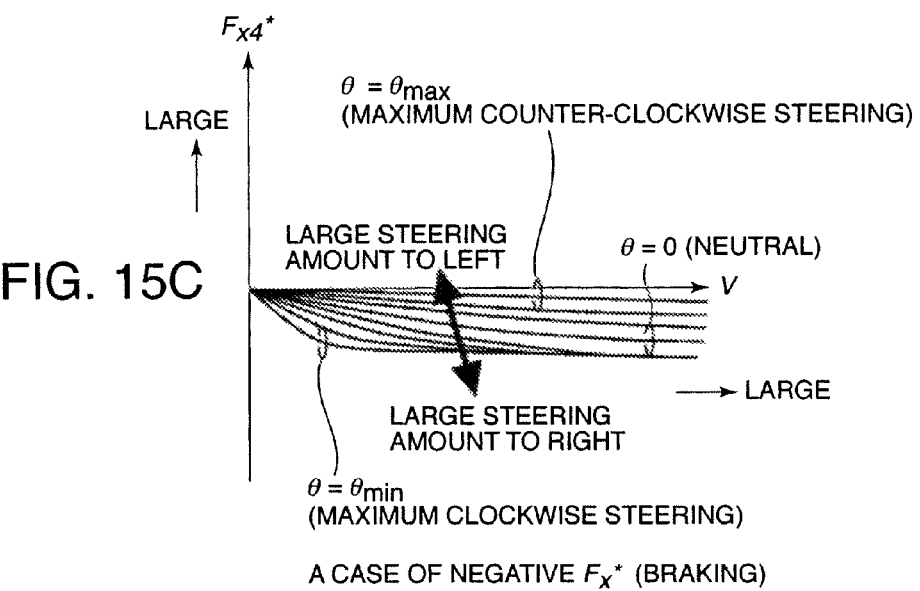
Figure 15D:
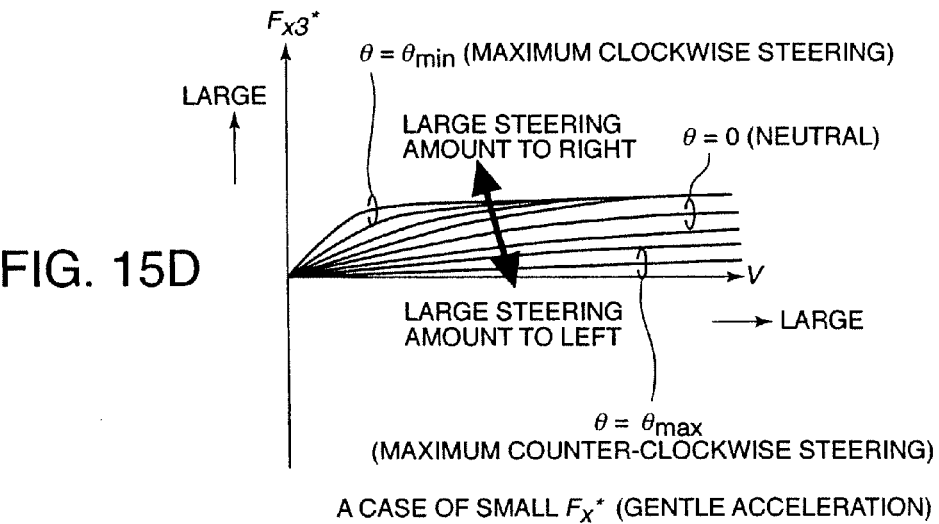
Figure 15E:
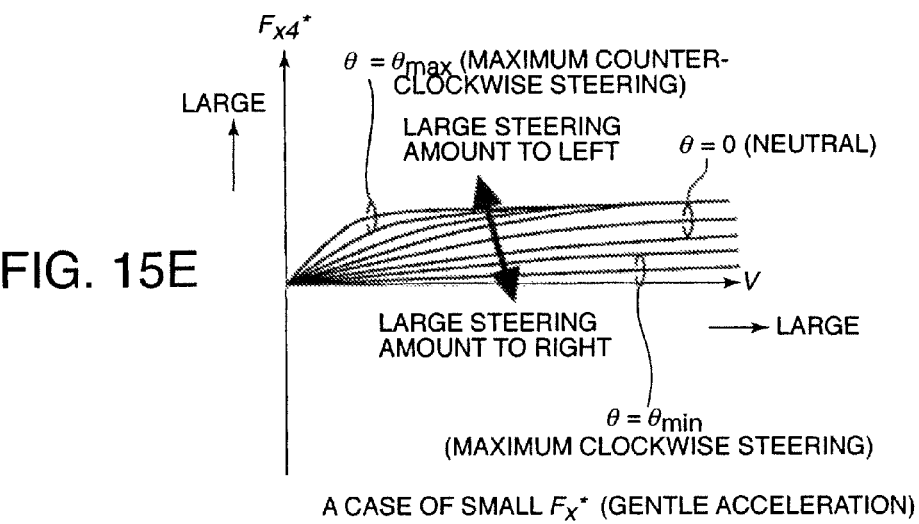
Figure 15F:
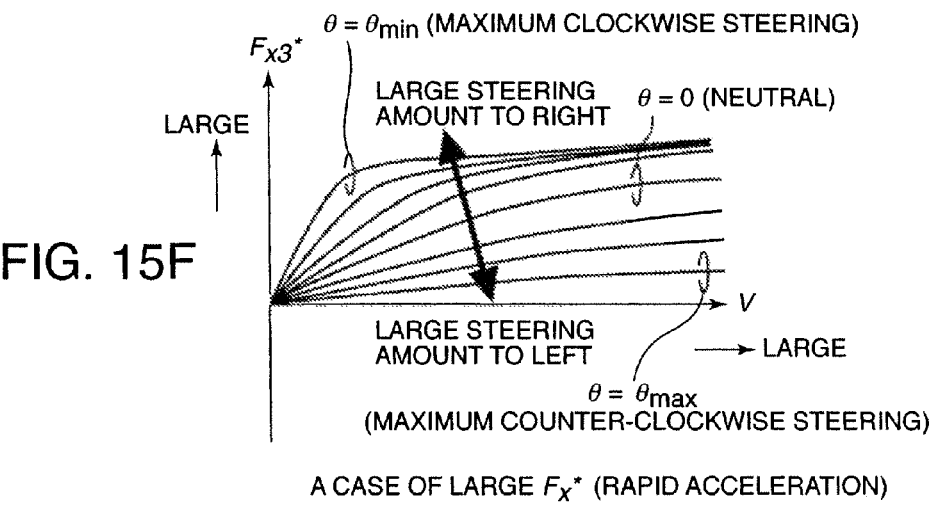
Figure 15G:
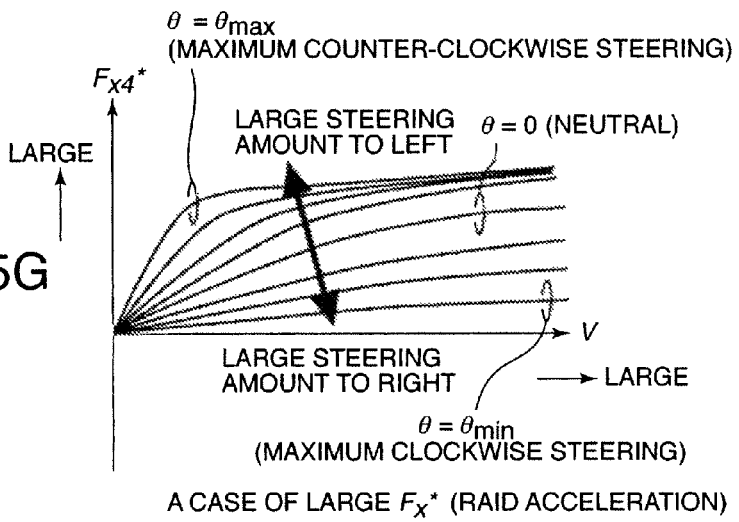

Fax* is determined on the basis of the accelerator pedal depression amount AP and the vehicle speed V by referring to a target drive force map having the characteristic shown in FIG. 13. Fbx* is determined from the brake pedal depression amount AP and the vehicle speed V by referring to a target brake force map having the characteristic shown in FIG. 14.

The signs of Fx*, Fax*, and Fbx* are positive when they accelerate the vehicle forward.

In a step S50, the controller 8 determines wheel drive force target values Fxf*, Fx$_3$*, and Fx$_4$* of the front wheels 1, 2, the left rear wheel 3, and the right rear wheel 4 from the steering operation angle θ of the steering wheel 5, the vehicle speed V, and the static vehicle front/aft force target value Fx* by referring to static wheel drive force maps having the characteristic shown in FIGS. 15A-15G.

The static wheel drive force shown in FIGS. 15A-15G is set such that the sum total of the front/aft forces generated by Fxf*, Fx$_3$*, and Fx$_4$* according to the steering operation angle θ of the steering wheel 5 and the vehicle speed V is equal to the static vehicle front/aft force target value Fx*. The drive forces Fx$_3$*, Fx$_4$* of the left rear wheel 3 and the right rear wheel 4 are set so as to generate a vehicle lateral force and a vehicle yaw moment, thereby providing driving comfort to the driver of the vehicle.

In a step S60, the controller 8 determines dynamic wheel drive force target values Fxf, Fx$_3$, and Fx$_4$** by applying time delay processing to the static wheel drive force target values Fxf*, Fx$_3$*, and Fx$_4$* determined in the step S50. This time delay is applied to cause the driver to feel comfort. A first order delay with a time constant of 0.2 seconds is applied in this embodiment.

In a step S70, the controller 8 determines upper limiting values Fxf$_{max}$, Fx$_{3max}$, and Fx$_{4max}$ and lower limiting values Fxf$_{min}$, Fx$_{3min}$, and Fx$_{4min}$ of the drive force which the front wheels 1, 2, the left rear wheel 3, and the right front wheel 4 can output. The upper limiting values Fxf$_{max}$, Fx$_{3max}$, and Fx$_{4max}$ and the lower limiting values Fxf$_{min}$, Fx$_{3min}$, and Fx$_{4min}$ are determined in view of preventing slippage and wheel lock of the wheels or in view of preventing overheating of the electric motors driving the wheels, as explained below.

First a method for preventing slippage and wheel lock of the wheels will be described. With respect to the rear wheels 3, 4, the controller 8 calculates the upper limiting value and the lower limiting value of the wheel drive force of each wheel by multiplying the road surface friction coefficient μ estimated in the step S20 by the wheel load Wi, i.e., Fx$_{3max}$=−Fx$_{3min}$=μ3 W3, and Fx$_{4max}$=−Fx$_{4min}$=μ4 W4. With respect to the front wheels 1, 2, the controller 8 calculates the upper limiting value and the lower limiting value of the wheel drive force of the front wheels 1, 2 such that neither the left front wheel 1 nor the right front wheel 2 causes slippage or wheel lock, using the equation (57) below from the drive force distribution ratio e to the left front wheel 2 obtained in the step S10.

$$Fxf_{max} = \min\left(\frac{\mu_1 W_1}{e}, \frac{\mu_2 W_2}{1-e}\right), Fxf_{min} = -Fxf_{max} \quad (57)$$

It is preferable that, when a front wheel has fallen into a state of slippage or wheel lock, the controller 8 calculates a drive force which can suppress the slippage and the wheel lock through feedback control of the drive force depending on a deviation of a drive wheel rotation speed from a target wheel rotation speed or a deviation of a wheel slip amount from a target wheel slip amount, as disclosed in JPH06-117285 published by the Japan Patent Office in 1994, and sets the calculated value as the upper limiting value Fxf$_{max}$, Fx$_{3max}$, or Fx$_{4max}$, or the lower limiting value Fxf$_{min}$, Fx$_{3min}$, or Fx$_{4min}$.

Next, a method for preventing overheating of the electric motor will be described.

The controller 8 determines upper and lower limiting values of the wheel drive force of each wheel at which thermal destruction of the electric motors 12 (15, 16) does not occur. The controller 8 sets the upper and lower limiting values as upper limiting values Fxf$_{max}$, Fx$_{3max}$, or Fx$_{4max}$, and lower limiting values Fxf$_{min}$, Fx$_{3min}$, or Fx$_{4min}$, respectively.

Specifically, with respect to the rear wheels 3, 4, a map defining a relation between a motor temperature and a maximum output force Ptmax that does not cause overheating of the electric motor 15(16) is prepared in advance, and the controller 8 calculates the upper limiting values Fx$_{3max}$, Fx$_{4max}$, and the lower limiting values Fx$_{3min}$, Fx$_{4min}$ from the maximum output force Ptmax and the wheel rotation speeds ω$_3$ and ω$_4$ using the following equation (58).

$$Fx_{3max} = -Fx_{3min} = \frac{Pt\max}{\omega_3}, Fx_{4max} = -Fx_{4min} = \frac{Pt\max}{\omega_4} \quad (58)$$

With respect to the front wheels 1, 2, the upper limiting value Fxf$_{max}$ and the lower limiting value Fxf$_{min}$ are calculated from the maximum output force Ptmax and a rotation speed ωf of the electric motor 12 driving the front wheels 1, 2 using the equation (59) below.

$$Fxf_{max} = \frac{Pt\max}{\omega_f R}, Fxf_{min} = -Fxf_{max} \quad (59)$$

Figure 16:
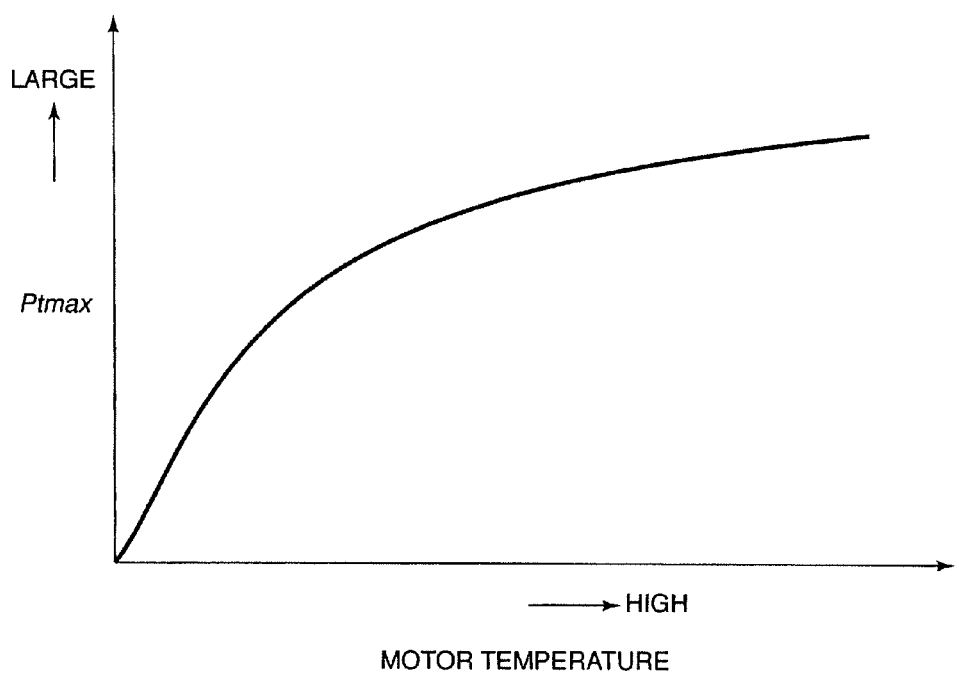
FIG. 16 is a diagram showing the characteristic of a map stored by the controller defining a motor temperature and a maximum motor output power which brings about overheating.

The characteristic of the map defining the relationship between the current motor temperature and the maximum output force which does not cause the electric motor to overheat is shown in FIG. 16, for example.

In order to determine finally the upper and lower limiting values from the values obtained through the above two methods, it is preferable to apply select-low processing for determining the upper limiting values Fxf$_{max}$, Fx$_{3max}$, and Fx$_{4max}$ while applying select-high processing for determining the lower limiting values Fxf$_{min}$, Fx$_{3min}$, and Fx$_{4min}$ such that the prevention of wheel slippage, wheel lock, and overheating of the motors is ensured.

In a case where a defect in any of the electric motors 12, 15, 16, the internal combustion engine 10, or the transmission 13 is found, it is preferable to set the upper and lower limiting values to be zero for the wheel which can no longer output a drive force.

In a vehicle in which the controller performs cooperative control of a braking force applied to each wheel by a mechanical braking mechanism and a driving force transmitted to each wheel from an electric motor, it is preferable to add a maximum braking force applied to each wheel by the mechanical braking mechanism to the lower limiting values Fxf$_{min}$, Fx$_{3min}$, and Fx$_{4min}$.

In a step S80, the controller 8 determines whether or not the dynamic wheel drive force target values Fxf, Fx$_3$, and Fx$_4$** obtained in the step S60 are within the ranges between the upper limiting values Fxf$_{max}$, Fx$_{3max}$, and Fx$_{4max}$, and the lower limiting values Fxf$_{min}$, Fx$_{3min}$, and Fx$_{4min}$ calculated respectively in the step S70. In other words, it is determined whether or not all the following relations (60)-(62) hold.

$$Fxf_{min} \leq Fxf^{**} \leq Fxf_{max} \quad (60)$$

$$Fx_{3min} \leq Fx_3^{**} \leq Fx_{3max} \quad (61)$$

$$Fx_{4min} \leq Fx_4^{**} \leq Fx_{4max} \quad (62)$$

When all the above conditions hold, the process proceeds to a step S120 where the controller 8 sets Fxf, $Fx_3$, and $Fx_4$ as the wheel drive force command values Fxf*, $Fx_3$*, and $Fx_4$*, and performs the processing of the step S130. When any of the above conditions does not hold, the controller 8 performs the processing of a step S90.

It is preferable that the controller 8 estimates electric power that can be consumed by each electric motor from the electric power that the battery 9 can input or output or the electric power that can be generated by the electric motor 12. The controller 8 then estimates an electric power required when the dynamic wheel drive force target values Fxf, $Fx_3$, and $Fx_4$ are output, considering an inverter loss so as to determine if the values Fxf, $Fx_3$, and $Fx_4$ can actually be output. In this case, if Fxf, $Fx_3$, and $Fx_4$ satisfy the relations (60)-(62) and the electric power required for outputting Fxf, $Fx_3$, and $Fx_4$ is lower than the consumable electric power by the motors 12, 15, 16, the controller 8 sets Fxf, $Fx_3$, and $Fx_4$ as the wheel drive force command values Fxf*, $Fx_3$*, and $Fx_4$*, and the routine proceeds to the step S130. If not, the routine proceeds to the step S90.

In the step S90, the controller 8 calculates first sets of the wheel drive forces which realize the vehicle lateral force Fy and the vehicle yaw moment M, and second sets of the wheel drive forces which realize the vehicle front/aft force Fx and the vehicle yaw moment M. Alternatively, the controller 8 calculates sets of the wheel drive forces which realize the relation $\Delta Fx : \Delta Fy : \Delta M = \cos\delta : \sin\beta : 0$, where $\Delta Fx$ is a variation amount of the vehicle front/aft force, $\Delta Fy$ is a variation amount of the vehicle lateral force, $\Delta M$ is a variation amount of the vehicle yaw moment M, and $\beta$ is the vehicle skid angle, as the second sets.

In this embodiment, the controller 8 obtains plural sets of wheel drive forces according to target vehicle behaviors so as to compare the vehicle behaviors in a step S110 which will be described later.

The calculation of the above sets of the wheel drive forces will be described in detail.

(The First Sets of the Wheel Drive Forces)

The controller 8 determines sets of wheel drive forces $Fx_xf(j)$, $Fx_{x3}(j)$, and $Fx_{x4}(j)$ (j=1, 2, ...) that realize the vehicle lateral force Fy and the vehicle yaw moment M generated by the dynamic wheel drive force target values Fxf, $Fx_3$, and $Fx_4$** determined in the step S60, in the following manner.

First, the controller 8 determines minute drive force variation amounts $\Delta Fxf$, $\Delta Fx_3$, and $\Delta Fx_4$ of the wheels 1-4 in the present operation state such that the amounts do not bring about a variation in the vehicle lateral force and the vehicle yaw moment. The controller 8 adds the values of $\Delta Fxf$, $\Delta Fx_3$, and $\Delta Fx_4$ to the dynamic wheel drive force target values $\Delta Fxf$, $\Delta Fx_3$, and $\Delta Fx_4$**, respectively. The results are $Fx_xf(1)$, $Fx_{x3}(1)$, and $Fx_{x4}(1)$.

The present operation state herein signifies the drive force distribution ratio e to the left front wheel 2, the wheel load Wi of each wheel, the wheel skid angle $\beta i$ of each wheel, the road surface friction coefficient $\mu i$ of each wheel, and the dynamic wheel drive force target values Fxf, $Fx_3$, $Fx_4$** at present.

Further, the controller 8 calculates $\Delta Fxf$, $\Delta Fx_3$, and $\Delta Fx_4$ again on the basis of the drive force distribution ratio e to the left front wheel 2, the wheel load Wi of each wheel, the wheel skid angle $\beta i$ of each wheel, the road surface friction coefficient $\mu i$ of each wheel, and $Fx_xf(1)$, $Fx_{x3}(1)$, and $Fx_{x4}(1)$, to calculate $Fx_xf(2)$, $Fx_{x4}(2)$, and $Fx_{x4}(2)$ by adding the newly calculated values $\Delta Fxf$, $\Delta Fx_3$, and $\Delta Fx_4$ to $Fx_xf(1)$, $Fx_{x3}(1)$, and $Fx_{x4}(1)$, respectively.

By repeating the above processing, the controller finally obtains the sets of the wheel drive forces $Fx_xf(j)$, $Fx_{x3}(j)$, and $Fx_{x4}(j)$.

With respect to $\Delta Fxf$, $\Delta Fx_3$, $\Delta Fx_4$, a set of $\Delta Fxf$, $\Delta Fx_3$, $\Delta Fx_4$ which increases $\Delta Fxf$, and a set of $\Delta Fxf$, $\Delta Fx_3$, $\Delta Fx_4$ which decreases $\Delta Fxf$ may coexist in the present operation state. In this case, the controller 8 preferably calculates the wheel drive forces for both sets to finally obtain the sets of $Fx_xf(j)$, $Fx_{x3}(j)$, and $Fx_{x4}(j)$.

A method for obtaining $\Delta Fxf$, $\Delta Fx_3$, and $\Delta Fx_4$ in the present operation state is described below.

The controller 8 obtains sensitivities $K_{fy}$, $K_{3y}$, and $K_{4y}$ of the lateral force acting on each wheel and a sensitivity $K_{fM}$, $K_{3M}$, and $K_{4M}$ of the yaw moment acting on each wheel with respect to variation in the wheel drive force of each wheel from the drive force acting on each wheel and the skid angle of each wheel at present by referring to a vehicle behavior sensitivity map. Herein, $K_{fy}$ denotes a sensitivity of the vehicle lateral force with respect to the variation in the drive forces acting on the front wheels 1, 2. $K_{3y}$ denotes a sensitivity of the vehicle lateral force with respect to the variation in the drive force acting on the left rear wheel 3. $K_{4y}$ denotes sensitivity of the vehicle lateral force with respect to the variation in the drive force acting on the right rear wheel 4. $K_{fM}$ denotes a sensitivity of the vehicle yaw moment with respect to the variation in the drive forces acting on the front wheels 1, 2. $K_{3M}$ denotes a sensitivity of the vehicle yaw moment with respect to the variation in the drive force acting on the left rear wheel 3. $K_{4M}$ denotes a sensitivity of the vehicle yaw moment with respect to the variation in the drive force acting on the right rear wheel 4.

Figure 17A:
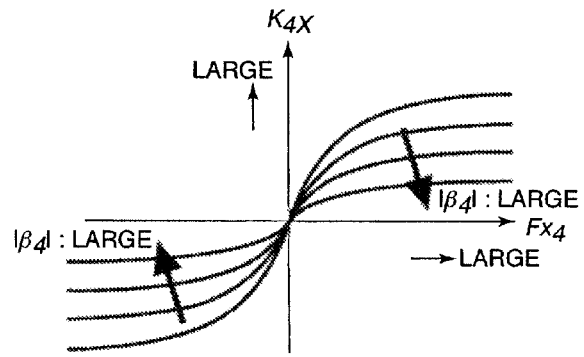
FIGS. 17A-17C are diagrams showing the characteristic of a vehicle behavior map stored by the controller.
Figure 17B:
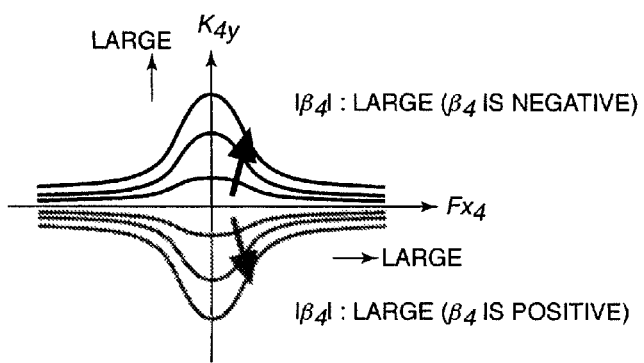
Figure 17C:
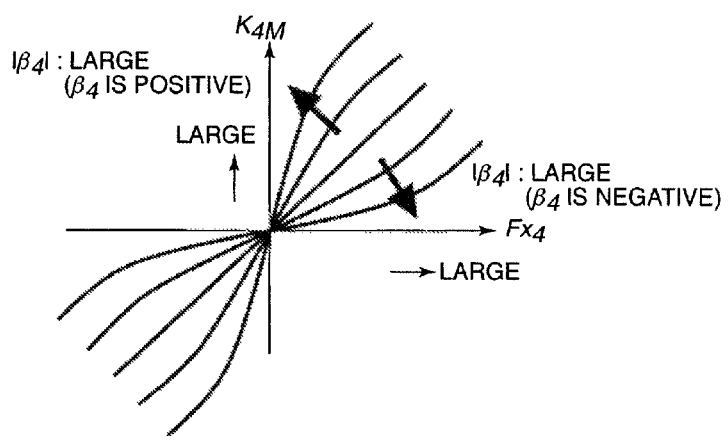

The vehicle behavior sensitivity map has characteristics shown in FIGS. 17A-17C. It should be noted however that these figures show only the characteristics of the right rear wheel 4 as an example.

This vehicle behavior sensitivity map is prepared in the following manner.

Specifically, all the combinations of the drive force and the skid angle that are possible in this vehicle are first extracted with respect to each wheel. In the respective combinations, variation amounts in the vehicle front/aft force, the vehicle lateral force, and the vehicle yaw moment are then calculated respectively when the drive force acting on any of the front wheels, 1, 2, the left rear wheel 3, and the right rear wheel 4 has varied by a minute amount. The vehicle behavior sensitivity map is obtained by plotting the calculation results.

It is preferable that various maps of this kind are further prepared with respect to combinations of the wheel load on each wheel, the road surface friction coefficient of each wheel, and the drive force distribution ratio e to the left front wheel 1 that are possible in the vehicle.

The controller 8 calculates $\Delta Fxf$, $\Delta Fx_3$, and $\Delta Fx_4$ which satisfy the equation (63) on the basis of these sensitivities $K_{fy}$, $K_{3y}$, $K_{4y}$, $K_{fM}$, $K_{3M}$, and $K_{4M}$ by substituting a minute value for $\Delta Fxf$.

There may be a case where the solution is not found depending on the combination of the sensitivities (a case where the rank in the equation (63) falls from 2 to 1 when $\Delta Fxf$ is assumed to be a constant). If such a case is encountered, ΔFxf, ΔFx₃, and ΔFx₄ which satisfy the equation (63) are calculated by substituting a minute value for ΔFx₃ or ΔFx₄.

$$\begin{bmatrix} \Delta Fy \\ \Delta M \end{bmatrix} = \begin{bmatrix} 0 \\ 0 \end{bmatrix} = \begin{bmatrix} K_{fy} & K_{3y} & K_{4y} \\ K_{fM} & K_{3M} & K_{4M} \end{bmatrix} \begin{bmatrix} \Delta Fx_f \\ \Delta Fx_3 \\ \Delta Fx_4 \end{bmatrix} \quad (63)$$

It is also possible to calculate ΔFxf, ΔFx₃, and ΔFx₄ by substituting a minute value for any of ΔFxf, ΔFx₃, and ΔFx₄ such that the relation (30) holds.

Providing that the response delay of the forces acting on the tire is sufficiently small, when one or both of the vehicle front/aft force and the vehicle lateral force varies due to a variation in the wheel drive forces, the wheel loads on the wheels also vary. When ΔFxf, ΔFx₃, and ΔFx₄ are newly calculated, therefore, it is further preferable that the wheel load on each wheel which is realized by the sets of $Fx_x f(j)$, $Fx_{x3}(j)$, and $Fx_{x4}(j)$ representing a present operation state, be obtained by executing a subroutine shown in FIG. 19 so as to determine the sensitivities of $K_{fy}$, $K_{3y}$, $K_{4y}$, $K_{fM}$, $K_{3M}$, and $K_{4M}$.

(The Second Sets of the Wheel Drive Forces)

The controller 8 calculates sets of wheel drive forces $Fx_y f(k)$, $Fx_{y3}(k)$, and $Fx_{y4}(k)$ (k=1, 2, . . . ) which realize the vehicle front/aft force Fx and the vehicle yaw moment M generated by the dynamic wheel drive force target values Fxf, Fx₃, and Fx₄ determined in the step S60**, in the following manner.

First, the controller 8 determines minute drive force variation amounts ΔFxf', ΔFx₃', and ΔFx₄' of the wheels 1-4 in the present operation state that do not bring about a variation in the vehicle front/aft force and the vehicle yaw moment. The controller 8 adds the values of ΔFxf', ΔFx₃', and ΔFx₄' to the dynamic wheel drive force target value ΔFxf, ΔFx₃, ΔFx₄**, respectively. The results are $Fx_y f(1)$, $Fx_{y3}(1)$, and $Fx_{y4}(1)$.

Further, the controller 8 calculates ΔFxf', ΔFx₃', and ΔFx₄' again on the basis of the drive force distribution ratio e to the left front wheel 2, the wheel load Wi of each wheel, the wheel skid angle βi of each wheel, the road surface friction coefficient μi of each wheel, and $Fx_y f(1)$, $Fx_{y3}(1)$, and $Fx_{y4}(1)$, to calculate $Fx_y f(2)$, $Fx_{y3}(2)$, and $Fx_{y4}(2)$ by adding the newly calculated values ΔFxf', ΔFx₃', and ΔFx₄' to $Fx_y f(1)$, $Fx_{y3}(1)$, and $Fx_{y4}(1)$, respectively.

By repeating the above processing, the controller 8 finally obtains $Fx_y f(j)$, $Fx_{y3}(j)$, and $Fx_{y4}(j)$. With respect to ΔFxf', ΔFx₃', ΔFx₄', a set of ΔFxf', ΔFx₃', ΔFx₄' for increasing ΔFxf', and a set of ΔFxf', ΔFx₃', ΔFx₄' for decreasing ΔFxf' may coexist in the present operation state. In this case, the controller 8 preferably calculates the wheel drive forces for both sets to finally obtain a set of $Fx_y f(j)$, $Fx_{y3}(j)$, and $Fx_{y4}(j)$.

A method for obtaining ΔFxf', ΔFx₃', and ΔFx₄' in the present operation state is described below.

The controller 8 calculates ΔFxf', ΔFx₃', and ΔFx₄' to satisfy the equation S100 from the aforesaid sensitivities $K_{fx}$, $K_{3x}$, $K_{4x}$, $K_{fM}$, $K_{3M}$, and $K_{4M}$ by substituting a minute value for ΔFxf'. There may be a case where the solution is not found depending on the combination of the sensitivities as in the case of the equation (63). If such a case is encountered, ΔFxf', ΔFx₃', and ΔFx₄' are calculated to satisfy the equation (64) by substituting a minute value for ΔFx₃' or ΔFx₄'.

$$\begin{bmatrix} \Delta Fx \\ \Delta M \end{bmatrix} = \begin{bmatrix} 0 \\ 0 \end{bmatrix} = \begin{bmatrix} K_{fx} & K_{3x} & K_{4x} \\ K_{fM} & K_{3M} & K_{4M} \end{bmatrix} \begin{bmatrix} \Delta Fx_f \\ \Delta Fx_3 \\ \Delta Fx_4 \end{bmatrix} \quad (64)$$

It is also possible to calculate ΔFxf', ΔFx₃', and ΔFx₄' by substituting a minute value for any of ΔFxf', ΔFx₃', and ΔFx₄' such that the relation (30) holds.

Providing that the response delay of the forces acting on the tire is sufficiently small, when one or both of the vehicle front/aft force and the vehicle lateral force varies due to a variation in the wheel drive forces, the wheel loads on the wheels also vary. When ΔFxf, ΔFx₃, and ΔFx₄ are newly calculated, therefore, it is further preferable that the wheel load on each wheel, which is realized by the sets of $Fx_x f(k)$, $Fx_{x3}(k)$, and $Fx_{x4}(k)$ representing a present operation state, be obtained by executing a subroutine shown in FIG. 19 so as to determine the sensitivities of $K_{fx}$, $K_{3x}$, $K_{4x}$, $K_{fM}$, $K_{3M}$, and $K_{4M}$.

Alternatively, the controller 8 may calculate sets of wheel drive forces $Fx_y f(k)$, $Fx_{y3}(k)$, and $Fx_{y4}(k)$ (k=1, 2, . . . ) to realize the relation (34), i.e., ΔFx:ΔFy:ΔM=cos β:sin β:0, as the second sets.

A method for obtaining $Fx_y f(k)$, $Fx_{y3}(k)$, and $Fx_{y4}(k)$ is described below.

First, the controller 8 determines minute drive force variation amounts ΔFxf', ΔFx₃', and ΔFx₄' of the wheels 1-4 in the present operation state that do not bring about a variation in the relation ΔFx:ΔFy:ΔM=cos β:sin β:0. The controller 8 adds the values of ΔFxf', ΔFx₃', and ΔFx₄' to the dynamic wheel drive force target values ΔFxf, ΔFx₃, and ΔFx₄**, respectively. The results are $Fx_y f(1)$, $Fx_{y3}(1)$, and $Fx_{y4}(1)$.

Further, the controller 8 calculates ΔFxf', ΔFx₃', and ΔFx₄' again on the basis of the drive force distribution ratio e to the left front wheel 2, the wheel load Wi of each wheel, the wheel skid angle βi of each wheel, the road surface friction coefficient μi of each wheel, and $Fx_y f(1)$, $Fx_{y3}(1)$, and $Fx_{y4}(1)$, to calculate $Fx_y f(2)$, $Fx_{y3}(2)$, and $Fx_{y4}(2)$ by adding the newly calculated values ΔFxf', ΔFx₃', and ΔFx₄' to Fxf(1), $Fx_{y3}(1)$, and $Fx_{y4}(1)$, respectively.

By repeating the above processing, the controller finally obtains $Fx_y f(k)$, $Fx_{y3}(k)$, and $Fx_{y4}(k)$.

A set of ΔFxf', ΔFx₃', and ΔFx₄' which increases ΔFxf', and another set of ΔFxf', ΔFx₃', and ΔFx₄' which decreases ΔFxf' may coexist in the present operation state. In this case, the controller 8 preferably calculates the wheel drive forces for both sets to finally obtain sets of $Fx_y f(k)$, $Fx_{y3}(k)$, and $Fx_{y4}(k)$.

A method for obtaining ΔFxf', ΔFx₃', and ΔFx₄' in the present operation state is described below.

The controller 8 calculates ΔFxf', ΔFx₃', and ΔFx₄' to satisfy the equation (65) on the basis of the aforesaid sensitivities $K_{fy}$, $K_{3y}$, $K_{4y}$, $K_{fM}$, $K_{3M}$, and $K_{4M}$ by substituting a minute value for ΔFxf'. There may be a case where the solution is not found depending on the combination of the sensitivities as in the case of the equation (63) or the equation (64). If such a case is encountered, ΔFxf', ΔFx₃', and ΔFx₄' are calculated to satisfy the equation (65) by substituting a minute value for ΔFx₃' or ΔFx₄'.

$$\begin{bmatrix} \sin\beta \Delta Fx - \cos\beta \Delta Fy \\ \Delta M \end{bmatrix} = \begin{bmatrix} 0 \\ 0 \end{bmatrix} \quad (65)$$

$$= \begin{bmatrix} \sin\beta K_{fx} - \cos\beta K_{fy} & \sin\beta K_{3x} - \cos\beta K_{3y} & \sin\beta K_{4x} - \cos\beta K_{4y} \\ K_{2m} & K_{3m} & K_{4m} \end{bmatrix}$$

$$\begin{bmatrix} \Delta Fx_f \\ \Delta Fx_3 \\ \Delta Fx_4 \end{bmatrix}$$

It is also possible to calculate $\Delta Fxf'$, $\Delta Fx_3'$, and $\Delta Fx_4'$ by substituting a minute value for any of $\Delta Fxf'$, $\Delta Fx_3'$, and $\Delta Fx_4'$ such that the relation (35) holds.

Providing that the response delay of the forces acting on the tire is sufficiently small, when one or both of the vehicle front/aft force and the vehicle lateral force varies due to a variation in the wheel drive forces, the wheel loads on the wheels also vary. When $\Delta Fxf$, $\Delta Fx_3$, and $\Delta Fx_4$ are newly calculated, therefore, it is further preferable that the wheel load on each wheel, which is realized by the sets of $Fx_xf(k)$, $Fx_{x3}(k)$, and $Fx_{x4}(k)$ representing a present operation state, be obtained by executing a subroutine shown in FIG. 19 so as to determine the sensitivities of $K_{fx}$, $K_{3x}$, $K_{4x}$, $K_{fM}$, $K_{3M}$, and $K_{4M}$.

In a step S100, the controller 8 extracts sets of the wheel drive forces residing within the ranges defined respectively by the drive force upper limiting values $Fxf_{max}$, $Fx_{3max}$, and $Fx_{4max}$, and the drive force lower limiting values $Fxf_{min}$, $Fx_{3min}$, and $Fx_{4min}$ determined in the step S70, from the sets of $Fx_xf(j)$, $Fx_{x3}(j)$, and $Fx_{x4}(j)$ for realizing the vehicle lateral force Fy and the vehicle yaw moment M generated by the dynamic wheel drive force target values $Fxf^{}$, $Fx_3^{}$, and $Fx_4^{**}$ obtained in the step S60. The extracted sets of the wheel drive forces are expressed as $Fx_xf(l)$, $Fx_{x3}(l)$, and $Fx_x(l)$ (l=1, 2, ...).

A method for extracting the sets of the wheel drive forces $Fx_xf(l)$, $Fx_{x3}(l)$, and $Fx_{x4}(l)$ will be described.

First, the controller 8 extracts all j with respect to the front wheels that satisfy the relation $Fxf_{min} \leq Fx_xf(j) \leq Fxf_{max}$.

Next, with respect to the left rear wheel 3, the controller 8 further extracts j that satisfy the relation $Fx_{3min} \leq Fx_{x3}(j) \leq Fx_{3max}$ within the set of the extracted j. The same processing is performed with respect to the right rear wheel 4 to finally obtain the sets of the wheel drive forces which can be realized.

On the other hand, if there is no set of the wheel drive forces in the sets of $Fx_xf(j)$, $Fx_{x3}(j)$, and $Fx_{x4}(j)$ that resides within the ranges defined respectively by the upper limiting values $Fxf_{max}$, $Fx_{3max}$, and $Fx_{4max}$, and the lower limiting values $Fxf_{min}$, $Fx_{3min}$, and $Fx_{4min}$, the controller 8 resets a flag $flg_x$ to zero, while setting the flag $flg_x$ to unity when at least a set of the wheel drive forces satisfying the above condition exists.

It is preferable that, as in the case of the step S80, the controller 8 estimates a required electric power including the inverter loss or the like when each of the sets of the wheel drive forces $Fx_xf(j)$, $Fx_{x3}(j)$, and $Fx_{x4}(j)$ is output. The controller 8 then extracts only the sets of the wheel drive forces that require an electric power smaller than the electric power available for each electric motor.

The controller 8 further extracts sets of the wheel drive forces that realize the vehicle front/aft force Fx and the vehicle yaw moment M generated by the dynamic wheel drive force target values $Fxf^{}$, $Fx_3^{}$, and $Fx_4^{**}$ and reside within the ranges defined respectively by the upper limiting values $Fxf_{max}$, $Fx_{3max}$, and $Fx_{4max}$ and the lower limiting values $Fxf_{min}$, $Fx_{3min}$, and $Fx_{4min}$.

Alternatively, the controller 8 further extracts sets of the wheel drive forces that satisfy the relation $\Delta Fx:\Delta Fy:\Delta M = \cos\beta:\sin\beta:0$, and reside within the ranges defined respectively by the upper limiting values $Fxf_{max}$, $Fx_{3max}$, and $Fx_{4max}$ and the lower limiting values $Fxf_{min}$, $Fx_{3min}$, and $Fx_{4min}$.

The results obtained through any of the above methods are expressed as $Fx_yf(n)$, $Fx_{y3}(n)$, $Fx_{y4}(n)$ (n=1, 2, ...).

If there is no set of the wheel drive forces in the set of $Fx_yf(k)$, $Fx_{y3}(k)$, and $Fx_{y4}(k)$ that resides within the square of the errors defined respectively by the upper limiting values $Fxf_{max}$, $Fx_{3max}$, and $Fx_{4max}$, and the lower limiting values $Fxf_{min}$, $Fx_{3min}$, and $Fx_{4min}$, the controller 8 resets a flag $flg_y$ to zero, while setting the flag $flg_y$ to unity when at least a set of the wheel drive force satisfying the above condition exists.

It is preferable that, as in the case of the step S80, the controller 8 estimates a required electric power including the inverter loss or the like when each of the sets of the wheel drive forces $Fx_yf(k)$, $Fx_{y3}(k)$, and $Fx_{y4}(k)$ is output. The controller 8 then extracts only the sets of the wheel drive force that require an electric power smaller than the electric power available for each electric motor.

In a step S110, the controller 8 determines wheel drive force command values within the sets of the wheel drive forces obtained in the step S100.

A first method for determining the wheel drive force command values within the sets of the wheel drive forces will be described.

When the flag $flg_x$ is at unity, the controller 8 selects a set of the wheel drive forces that give a smallest value with respect to the sum total of a square of the errors between each set of the wheel drive forces and the dynamic wheel drive forces $Fxf^{}$, $Fx_3^{}$, and $Fx_4^{}$, and sets the selected set of the wheel drive forces as the wheel drive force command values $Fxf^{*}$, $Fx_3^{*}$, and $Fx_4^{*}$.

By thus selecting a set of the wheel drive forces, an abrupt variation in the wheel drive force of each wheel is prevented, thereby reducing loads exerted on the wheel driving motors 12, 15, 16 and the transmission 13 and bringing about a preferable effect in enhancing the durability and driving performance of the vehicle.

It is preferable that, when it is found that a wheel is in slippage, the controller 8 selects the wheel drive force to this wheel corresponding to an upper limiting value of the drive force that can terminate the slippage. The upper limiting value is determined in the manner disclosed in the aforesaid JPH6-117285, for example, as in the step S70.

Specifically, the upper limiting value is obtained through feedback control of the drive force depending on a deviation of a wheel rotation speed from a target wheel rotation speed or a deviation of a wheel slip amount from a target wheel slip amount.

By thus determining the upper limiting value, when the road surface friction coefficient of the wheel shifts to increase, the wheel in slippage can retrieve a normal driving state immediately, thereby increasing the driving performance of the vehicle. The same control is preferably applied for wheel lock.

When the flag $flg_x$ is at zero, since there is no set of the wheel drive forces within the limiting ranges, the controller 8 sets $\lambda Fxf^{}$, $\lambda Fx_3^{}$, and $\lambda Fx_4^{}$ as the wheel drive force command values $Fxf^{*}$, $Fx_3^{*}$, and $Fx_4^{*}$. Herein, $\lambda$ is a maximum value of positive decreasing constants defined such that all the dynamic wheel drive force target values $Fxf^{}$, $Fx_3^{}$, and $Fx_4^{**}$ after being multiplied by the constant $\lambda$ fall into the respective limiting ranges.

A second method for determining the wheel drive force command values $Fxf^{*}$, $Fx_3^{*}$, and $Fx_4^{*}$ within the sets of the wheel drive forces obtained in the step S100** will be described.

When the flag $flg_x$ is at unity, the controller 8 first calculates a vehicle front/aft force realized by each set of the wheel drive forces $Fx_xf(l)$, $Fx_{x3}(l)$, and $Fx_{x4}(l)$. The controller 8 also calculates a vehicle front/aft force realized by the dynamic wheel drive force target values $Fxf^{}$, $Fx_3^{}$, and $Fx_4^{}$ determined in the step S60**. A method for these calculations will be described later.

The controller 8 then selects a set of the wheel drive forces within the sets $Fx_xf(l)$, $Fx_{x3}(l)$, and $Fx_{x4}(l)$ such that a difference between the vehicle front/aft force realized by the selected set of the wheel drive forces and the vehicle front/aft force realized by the dynamic wheel drive force target values $Fxf^{}$, $Fx_3^{}$, and $Fx_4^{**}$ reaches a minimum.

When the flag $flg_x$ is at zero, however, the controller 8 sets $\lambda Fxf^{}$, $\lambda Fx_3^{}$, and $\lambda Fx_4^{}$ as the wheel drive force command values $Fxf^{*}$, $Fx_3^{*}$, and $Fx_4^{*}$.

If there are plural sets of the wheel drive forces that decrease the vehicle front/aft force realized by the dynamic wheel drive force target values $Fxf^{}$, $Fx_3^{}$, and $Fx_4^{}$, it is preferable that the controller 8 selects a set of the wheel drive forces from among the sets as the wheel drive force command values $Fxf^{}$, $Fx_3^{*}$, and $Fx_4^{*}$ such that a difference between the vehicle front/aft force realized by the selected set and the vehicle front/aft force realized by the dynamic wheel drive force target values $Fxf^{}$, $Fx_3^{}$, and $Fx_4^{**}$ reaches a minimum. This selection tends to decrease the vehicle speed and helps the driver to take safety measures when the vehicle encounters a hazard.

A method for calculating a vehicle front/aft force, the vehicle lateral force, and the vehicle yaw moment realized by the selected set of the wheel drive forces will now be described. When the wheel drive forces $Fxf$, $Fx_3$, and $Fx_4$ are given, the vehicle front/aft force $Fx$, the vehicle lateral force $Fy$, and the vehicle yaw moment $M$, realized by $Fxf$, $Fx_3$, and $Fx_4$, are calculated using the following equations (66)-(68).

$$Fx = Fx'_1 + Fx'_2 + Fx'_3 + Fx'_4 \quad (66)$$

$$Fy = Fy'_1 + Fy'_2 + Fy'_3 + Fy'_4 \quad (67)$$

$$M(l) = \{(Fx'_2 + Fx'_4) - (Fx'_1 + Fx'_3)\} \times \frac{Lt}{2} + \quad (68)$$
$$\{(Fy'_1 + Fy'_2) \times Lf - (Fy'_3 + Fy'_4) \times Lr\}$$

where
$Fx'_i = Fx_i \cos\delta_i - Fy_i \sin\delta_i$, $Fy'_i = Fx_i \sin\delta_i + Fy_i \cos\delta_i$, and $Fx_1 = e\,Fxf$, $Fx_2 = (1-e)\,Fxf$.

Figure 18A:
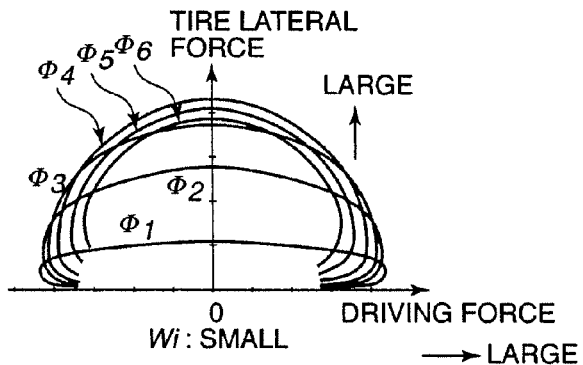
FIGS. 18A and 18B are diagrams showing the characteristic of a tire characteristic map stored by the controller.
Figure 18B:
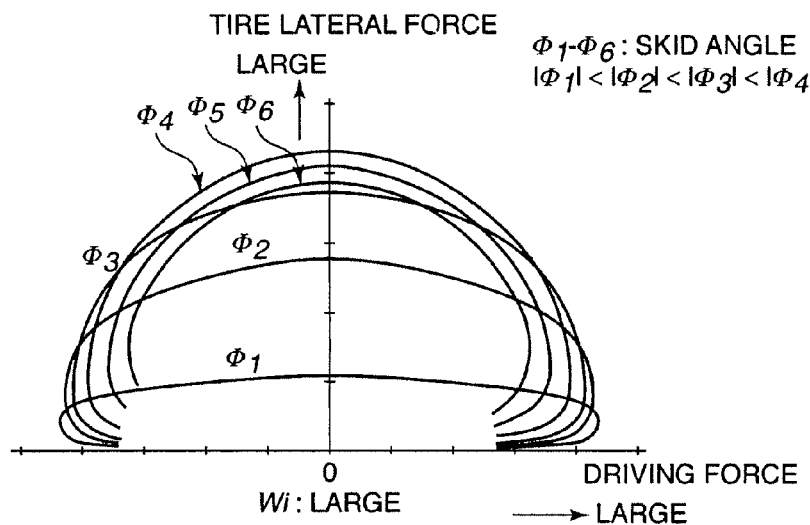

Herein, $Fy_i$ denotes a tire lateral force which is generated when the wheel drive force $Fx_i$ is exerted on each wheel in the present operation state of the vehicle and is determined on the basis of the wheel skid angle $\beta i$ and the wheel load $Wi$ of each wheel 1-4 determined in the step S30, by referring to a tire characteristic map shown in FIGS. 18A and 18B. The map defines a relationship between a tire drive force and the tire lateral force. This map is common to all the wheels 1-4.

A third method for determining the wheel drive force command values $Fxf^{*}$, $Fx_3^{*}$, and $Fx_4^{*}$ within the sets of the wheel drive forces obtained in the step S100** will be described.

This method relates to a case in which any of the first and second method is applied for selecting the wheel drive force command values $Fxf^{}$, $Fx_3^{*}$, and $Fx_4^{*}$ in the step S110** while the flag $flg_x$ is at zero.

In this case, the controller 8 performs the third method instead of the first or second method.

When the flag $flg_x$ is at zero while the flag $flg_y$ is at unity, the controller 8 selects a set of the wheel drive forces that gives the smallest value with respect to the sum total of a square of the errors between the values of each set obtained in the step S100 and the dynamic wheel drive forces $Fxf^{}$, $Fx_3^{}$, and $Fx_4^{}$ obtained in the step S60. The selected set of the wheel drive force is set as the wheel drive force command values $Fxf^{}$, $Fx_3^{*}$, and $Fx_4^{*}$.

When the flag $flg_x$ is at zero while the flag $flg_y$ is also at zero, the controller 8 sets $\lambda Fxf^{}$, $\lambda Fx_3^{}$, and $\lambda Fx_4^{}$ as the wheel drive force command values $Fxf^{*}$, $Fx_3^{*}$, $Fx_4^{*}$.

A fourth method for determining the wheel drive force command values $Fxf^{*}$, $Fx_3^{*}$, and $Fx_4^{*}$ within the sets of the wheel drive forces obtained in the step S100** will be described.

In the step S110, the controller 8 selects a set of wheel drive force command values $Fxf^{*}$, $Fx_3^{*}$, and $Fx_4^{***}$ in the manner below.

The controller 8 calculates a vehicle front/aft force $Fx_x(l)$ and a vehicle lateral force $Fy_x(l)$ realized by each set of the wheel drive forces within the sets of the wheel drive forces $Fx_xf(l)$, $Fx_{x3}(l)$, and $Fx_{x4}(l)$ obtained in the step S100 in a similar manner to the equations (66) and (67).

First, the controller 8 calculates a vehicle front/aft force $Fx_y(n)$ and a vehicle lateral force $Fy_y(n)$ realized by each set of the wheel drive forces within the sets of the wheel drive forces $Fx_yf(n)$, $Fx_{y3}(n)$, and $Fx_{y4}(n)$ obtained in the step S100.

Next, the controller 8 calculates the vehicle front/aft force $Fx^{}$ and the vehicle lateral force $Fy^{}$ realized by the dynamic wheel drive force target values $Fxf^{}$, $Fx_3^{}$, and $Fx_4^{}$ obtained in the step S60** in a similar manner to the equations (66) and (67).

The controller 8 selects a set of the wheel drive force target values within the sets of $Fx_xf(l)$, $Fx_{x3}(l)$, and $Fx_{x4}(l)$ and the sets of $Fx_yf(n)$, $Fx_{y3}(n)$, and $Fx_{y4}(n)$ such that the resultant vehicle front/aft force and vehicle lateral force brought about by the selected set of the wheel drive force target values minimize an evaluation function J expressed by the following equations (69) and (70).

$$J=Q_x(Fx_x(l)-Fx^{})^2+Q_y(Fy_x(l)-Fy^{})^2 (l=1,2,\ldots) \quad (69)$$

$$J=Q_x(Fx_y(n)-Fx^{})^2+Q_y(Fy_y(n)-Fy^{})^2 (n=1,2,\ldots) \quad (70)$$

It should be noted that $Qx$, $Qy$ in the equation (69) are weighted coefficients set equal to 0.1 and 1.0, respectively, in this embodiment.

The weighted coefficients $Qx$, $Qy$ are set to have a characteristic preferred by the driver. For example, when the vehicle is advancing straight forward, $Qx$ is preferably set to be greater than $Qy$. When the vehicle is making a turn, $Qy$ is preferably set to be greater than $Qx$.

With respect to the evaluation function J expressed by the equations (69) and (70), a stability of the wheel drive force of each wheel is increased by further evaluating a sum total of the square of the errors between each set of the wheel drive forces within the sets of $Fx_xf(1)$, $Fx_{x3}(1)$, $Fx_{x4}(1)$ and the sets of $Fx_yf(n)$, $Fx_{y3}(n)$, $Fx_{y4}(n)$, and the dynamic wheel drive force target values $Fxf^{}$, $Fx_3^{}$, and $Fx_4^{**}$.

When the flag $flg_x$ is at zero and the flag $flg_y$ is at zero, $\lambda Fxf^{}$, $\lambda Fx_3^{}$, and $\lambda Fx_4^{}$ are set as the wheel drive force command values $Fxf^{*}$, $Fx_3^{*}$, and $Fx_4^{*}$, respectively.

In the step S130, the controller 8 controls the output torque of the internal combustion engine 10 and the electric motors 12, 15, 16, the speed ratio of the transmission 13, and engaging/disengaging of the clutch 11 such that the wheel drive force command values $Fxf^{*}$, $Fx_3^{*}$, and $Fx_4^{***}$ are materialized.

Figure 19:
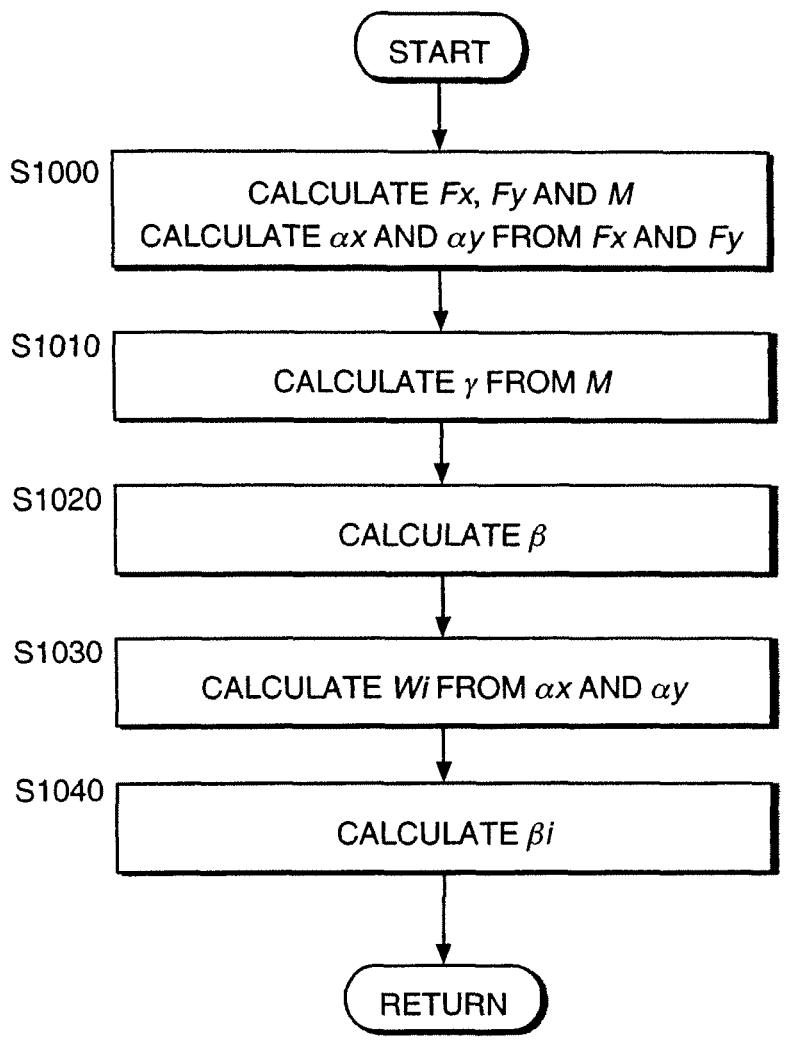
FIG. 19 is a flowchart describing a subroutine performed in the drive force distribution control routine of FIGS. 12A and 12B for calculating a vehicle yaw rate, a vehicle skid angle, a wheel load, and a tire skid angle.

Next, referring to a flowchart of FIG. 19, the sub routine executed in the step S30 in the flowchart of FIGS. 12A and 12B, for calculating a vehicle yaw rate $\gamma$, a vehicle skid angle $\beta$, a wheel load Wi of each wheel, and a tire skid angle $\beta i$ of each wheel, will be described.

In a step S1000, the controller 8 calculates the vehicle front/aft force Fx, the vehicle lateral force Fy, and the vehicle yaw moment M generated in response to the wheel drive force command values $Fxf^{*}$, $Fx_3^{*}$, and $Fx_4^{***}$ in a similar manner to the equations (66)-(68).

The controller divides the vehicle front/aft force Fx and the vehicle lateral force Fy by the mass of the vehicle to calculate a vehicle front/aft acceleration $\alpha x$ and a vehicle lateral acceleration $\alpha y$. It is also preferable to calculate $\alpha x$ and $\alpha y$ considering air resistance.

In a step S1010, the controller 8 divides the vehicle yaw moment M by a vehicle yaw moment of inertia I. The controller 8 then calculates an integral of the resultant value to obtain the vehicle yaw rate $\gamma$. The initial value of the vehicle yaw rate $\gamma$ is zero.

In a step S1020, the controller 8 calculates a time differential p[of the vehicle skid angle $\beta$ using the equation (71) below. The controller 8 then calculates an integral of $\beta$ to obtain the vehicle skid angle $\beta$. Herein, the initial value of the vehicle skid angle $\beta$ is zero.

$$\overset{*}{\beta} = \frac{F_y \cos\beta(k-1) - F_x \sin\beta(k-1)}{mV} - \gamma \quad (71)$$

where $\beta(k-1)$ is a vehicle skid angle $\beta$ calculated on the immediately preceding occasion when the subroutine was performed.

In a step S1030, the controller 8 calculates the wheel load Wi of each wheel using the equations (72)-(75) below.

$$W_1 = \frac{mgLr}{2Ll} - \frac{mh\alpha_x}{2Ll} - \frac{mh\alpha_y}{Lt} \quad (72)$$

$$W_2 = \frac{mgLr}{2Ll} - \frac{mh\alpha_x}{2Ll} + \frac{mh\alpha_y}{Lt} \quad (73)$$

$$W_3 = \frac{mgLf}{2Ll} + \frac{mh\alpha_x}{2Ll} - \frac{mh\alpha_y}{Lt} \quad (74)$$

$$W_4 = \frac{mgLf}{2Ll} + \frac{mh\alpha_x}{2Ll} + \frac{mh\alpha_y}{Lt} \quad (75)$$

where g is a gravitational acceleration, and h is a height of the center of gravity of the vehicle.

In a step S1040, the controller 8 calculates the wheel skid angle $\beta i$ of each wheel using the equations (76)-(79) below.

$$\beta_1 = \tan^{-1}\left(\frac{V\sin\beta + \gamma \times Lf}{V\cos\beta - 0.5 \times \gamma \times Lt}\right) - \delta_1 \quad (76)$$

$$\beta_2 = \tan^{-1}\left(\frac{V\sin\beta + \gamma \times Lf}{V\cos\beta + 0.5 \times \gamma \times Lt}\right) - \delta_2 \quad (77)$$

$$\beta_3 = \tan^{-1}\left(\frac{V\sin\beta - \gamma \times Lr}{V\cos\beta - 0.5 \times \gamma \times Lt}\right) - \delta_3 \quad (78)$$

$$\beta_4 = \tan^{-1}\left(\frac{V\sin\beta - \gamma \times Lr}{V\cos\beta + 0.5 \times \gamma \times Lt}\right) - \delta_4 \quad (79)$$

As described above, according to this embodiment, the vehicle lateral force Fy and the vehicle yaw moment M generated by the dynamic wheel drive force target values $Fxf^{}$, $Fx_3^{}$, and $Fx_4^{}$ is calculated, and the sets of wheel drive forces $Fx_xf(j)$, $Fx_{x3}(j)$, and $Fx_{x4}(j)$ that can realize the vehicle lateral force Fy and the vehicle yaw moment M are obtained. A set of wheel drive forces in which the wheel drive forces fall into the respective ranges defined by the upper limiting values $Fxf_{max}$, $Fx_{3max}$, and $Fx_{4max}$, and the lower limiting values $Fxf_{min}$, $Fx_{3min}$, and $Fx_{4min}$ is then selected and set as the wheel drive force command values $Fxf^{*}$, $Fx_3^{*}$, and $Fx_4^{*}$.

As a result, when the wheel drive force of each wheel has varied or is required to vary due to slippage in any of the wheels 1-4, overheating in any of the electric motors 12, 15, 16, and so on, especially during a turn in which an upset in the vehicle lateral force Fy and the vehicle yaw moment M causes a serious problem, the variation in the vehicle lateral force Fy and the vehicle yaw moment M is suppressed, thereby increasing the driving performance of the vehicle.

Further, among the sets of the wheel drive forces $Fx_xf(1)$, $Fx_{x3}(1)$, and $Fx_{x4}(1)$ that reside within the ranges defined respectively by the upper limiting values $Fxf_{max}$, $Fx_{3max}$, and $Fx_{4max}$, and the lower limiting values $Fxf_{min}$, $Fx_{3min}$, and $Fx_{4min}$, a set of the wheel drive forces is selected such that the sum total of the square of errors between the selected set of the wheel drive forces and the target values $Fxf^{}$, $Fx_3^{}$, $Fx_4^{**}$ of the wheel drive forces reaches a minimum, and hence the stability of the wheel drive force of each wheel is enhanced, thereby reducing the load exerted on the electric motor 12, 15, 16 and the transmission 13. This increases the durability and the driving performance of the vehicle.

Still further, a set of the wheel drive forces is selected from among the sets of the wheel drive forces $Fx_xf(1)$, $Fx_{x3}(1)$, and $Fx_{x4}(1)$ such that the error between the vehicle front/aft force generated by the selected set of the wheel drive forces and the vehicle front/aft force generated by the dynamic wheel drive force target values $Fxf^{}$, $Fx_3^{}$, and $Fx_4^{**}$ reaches a minimum, and hence an abrupt variation in the vehicle front/aft force is prevented and the driving performance of the vehicle can be increased.

Still further, the sets of the wheel drive forces $Fx_yf(k)$, $Fx_{y3}(k)$, and $Fx_{y4}(k)$ that realize the vehicle front/aft force Fx and the vehicle yaw moment M generated by the dynamic wheel drive force target values $Fxf^{}$, $Fx_3^{}$, and $Fx_4^{}$ are determined, and the sets of the wheel drive forces $Fx_yf(n)$, $Fx_{y3}(n)$, and $Fx_{y4}(n)$ reside within the respective ranges defined by the upper limiting values $Fxf_{max}$, $Fx_{3max}$, and $Fx_{4max}$ and the lower limiting values $Fxf_{min}$, $Fx_{3min}$, and $Fx_{4min}$, are selected from the sets of the wheel drive forces $Fx_yf(k)$, $Fx_{y3}(k)$, and $Fx_{y4}(k)$. When the flag $flg_x$ is at zero and the flag $flg_y$ is at unity, a set of the wheel drive forces is selected from the sets of the wheel drive forces $Fx_y f(n)$, $Fx_{y3}(n)$, and $Fx_{y4}(n)$ such that a sum total of the square of the errors between the selected wheel drive forces and the dynamic wheel drive force target values $Fxf^{}$, $Fx_3^{}$, and $Fx_4^{}$ reaches a minimum. The selected set of the wheel drive forces is then set as the wheel drive force command values $Fxf^{*}$, $Fx_3^{*}$, $Fx_4^{***}$. This processing enables redistribution of the drive force even when there is no set of wheel drive forces in the above ranges that realizes the vehicle lateral force Fy and the vehicle yaw moment M, thereby increasing the driving performance of the vehicle.

Still further, the vehicle front/aft force $Fx_x(l)$ and the vehicle lateral force $Fy_x(l)$ realized by the sets of the wheel drive forces $Fx_x f(l)$, $Fx_{x3}(l)$, and $Fx_{x4}(l)$, and the vehicle front/aft force $Fxx(n)$ and the vehicle lateral force $Fyx(n)$ realized by the sets of the wheel drive forces $Fx_y f(n)$, $Fx_{y3}(n)$, and $Fx_{y4}(n)$ are calculated. The vehicle front/aft force $Fx^{}$ and the vehicle lateral force $Fy^{}$ realized by the dynamic wheel drive force target values $Fxf^{}$, $Fx_3^{}$, and $Fx_4^{}$ are also calculated. The difference between the vehicle front/aft force $Fx_x(l)$, $Fxy(l)$ and the vehicle front/aft force $Fx^{}$ and the vehicle lateral force $Fy^{}$, the difference between the vehicle front/aft force $Fxx(n)$, $Fx_y(n)$ and the vehicle front/aft force $Fx^{}$ and the vehicle lateral force $Fy^{}$ are respectively calculated using an evaluation function J. Finally, a set of the wheel drive forces that generates the vehicle front/aft force Fx and the vehicle lateral force Fy that minimize the evaluation function J is selected as the wheel drive force command values $Fxf^{*}$, $Fx_3^{*}$, and $Fx_4^{*}$. According to the above processing, when the variation amount in the vehicle front/aft force Fx is sufficiently small under the wheel drive forces that realize the vehicle lateral force Fy and the vehicle yaw moment M, the wheel drive forces that maintain the current vehicle front/aft force Fx and the vehicle yaw moment M can be selected, thereby increasing the driving performance of the vehicle.

Still further, since the sets of the wheel drive forces $Fx_x f(j)$, $Fx_{x3}(j)$, and $Fx_{x4}(j)$ realizing the vehicle lateral force Fy and the vehicle yaw moment M generated by the dynamic wheel drive force target values $Fxf^{}$, $Fx_3^{}$, and $Fx_4^{**}$ are calculated on the basis of the sensitivity $K_{fy}$, $K_{3y}$, $K_{4y}$ of the tire lateral force acting on each wheel and a sensitivity $K_{fM}$, $K_{3M}$, $K_{4M}$ of the yaw moment acting on each wheel, the sets of the wheel drive forces $Fx_x f(j)$, $Fx_{x3}(j)$, and $Fx_{x4}(j)$ can be determined with a high precision, thereby increasing the driving performance of the vehicle.

Still further, since a set of the wheel drive forces $Fx_y f(k)$, $Fx_{y3}(k)$, and $Fx_{y4}(k)$ realizing the vehicle front/aft force Fx and the vehicle yaw moment M generated by the dynamic wheel drive force target values $Fxf^{}$, $Fx_3^{}$, and $Fx_4^{**}$ is calculated on the basis of the sensitivity $K_{fy}$, $K_{3y}$, $K_{4y}$ of the lateral forces acting on the respective wheels and a sensitivity $K_{fM}$, $K_{3M}$, $K_{4M}$ of the yaw moments acting on the respective wheels, a set of the wheel drive forces $Fx_y f(k)$, $Fx_{y3}(k)$, and $Fx_{y4}(k)$ can be determined with a higher precision, thereby increasing the driving performance of the vehicle.

A second embodiment of this invention will now be described.

The components of the vehicle according to this embodiment are identical to those of the first embodiment. In this embodiment, control processing partially differs from that of the first embodiment. With respect to the components and the steps that are identical to those of the first embodiment, the description is herein omitted.

Figure 20A:
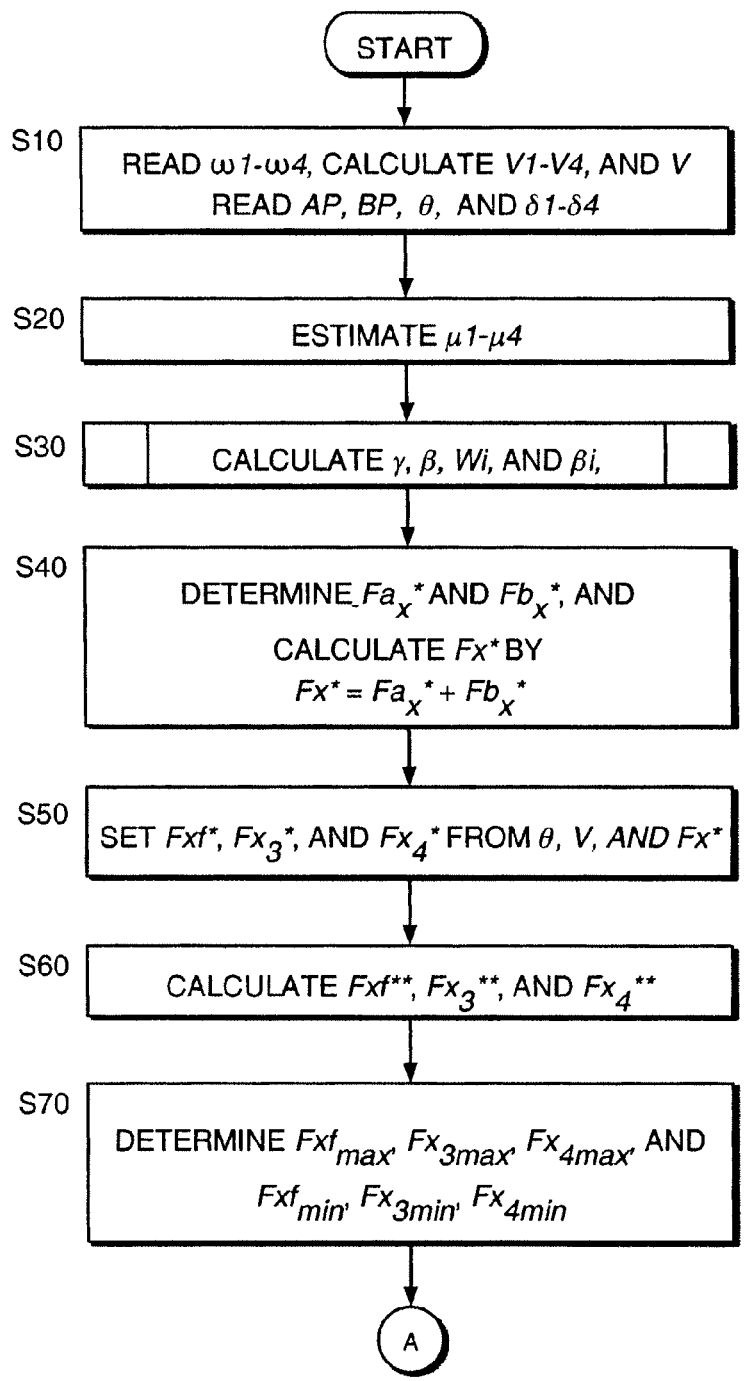
FIGS. 20A and 20B are similar to FIGS. 12A and 12B, but show a second embodiment of this invention.
Figure 20B:
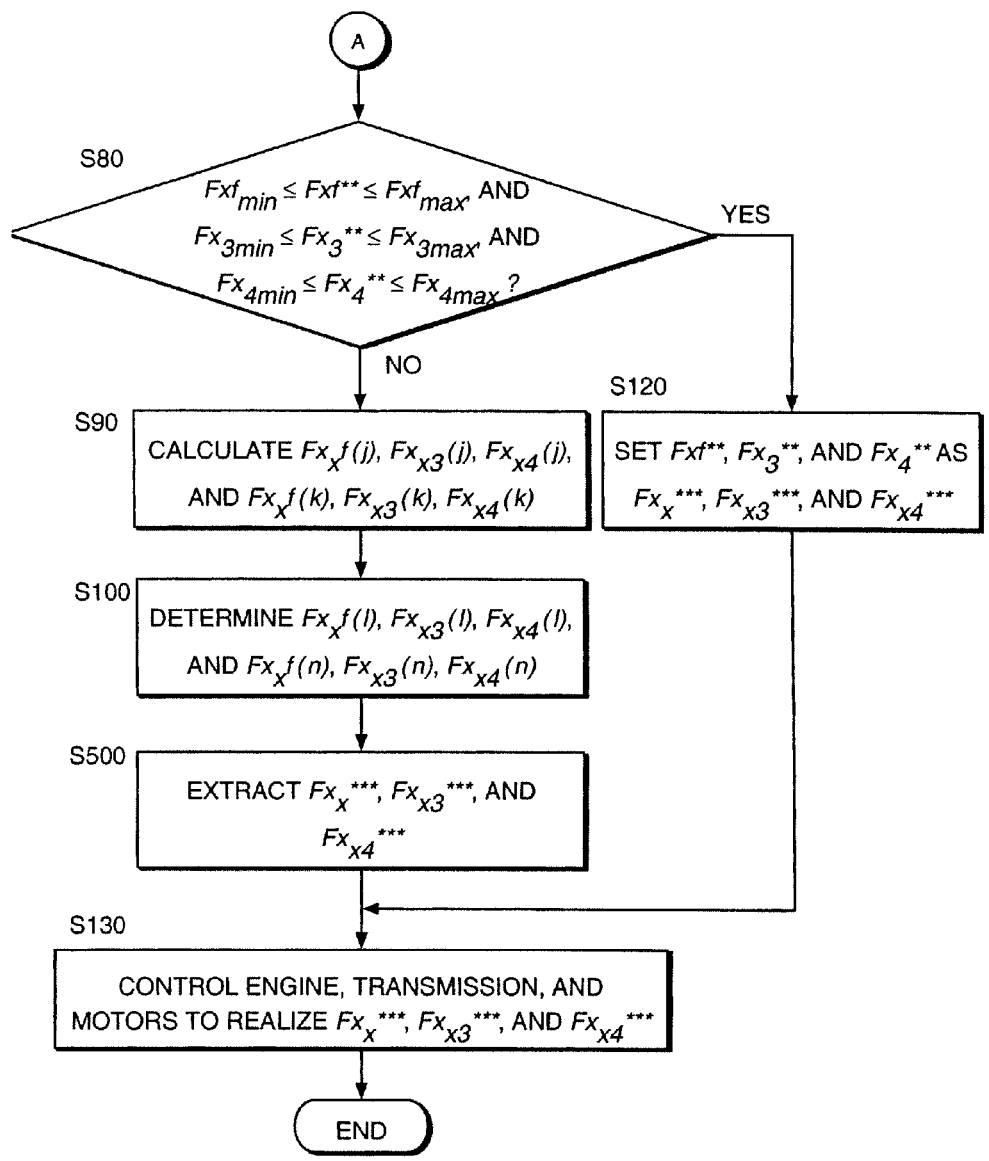

Referring to FIG. 20, the steps S10-S100, S120, and S130 are identical to those of the first embodiment. In this embodiment, a step S500 replaces the step S110 of the first embodiment.

In the step S500, the controller 8 selects a set of the wheel drive force command values from among the sets of the wheel drive forces obtained in the step S100 by applying the following methods.

As a first method, when the flag $flg_y$ is at unity, a set of the wheel drive forces is selected from among the sets of the wheel drive forces $Fx_y f(n)$, $Fx_{y3}(n)$, and $Fx_{y4}(n)$ obtained in the step S100 such that a sum total of the square of the errors between the selected set of the wheel drive forces and the dynamic wheel drive force target values $Fxf^{}$, $Fx_3^{}$, and $Fx_4^{}$ reaches a minimum, and the selected set of the wheel drive forces is output as the wheel drive force command values $Fxf^{*}$, $Fx_3^{*}$, and $Fx_4^{*}$.

By thus selecting the wheel drive forces, the wheel drive force of each wheel is stabilized and the loads exerted on the electric motors and the transmission are reduced, thereby increasing the durability and the driving performance of the vehicle.

When the flag $flg_y$ is at zero, on the other hand, there is no set of wheel drive forces within the limiting ranges of the wheel drive force of each wheel, and the wheel drive forces $\lambda Fxf^{}$, $\lambda Fx_3^{}$, $\lambda Fx_4^{}$ are set as the wheel drive force command values $Fxf^{*}$, $Fx_3^{*}$, and $Fx_4^{*}$, respectively.

Herein, $\lambda$ is a constant. A maximum value among positive constants that decrease the absolute values of the wheel drive force command values $Fxf^{*}$, $Fx_3^{*}$, and $Fx_4^{***}$ to fall into the respective limitation ranges defined by the upper and lower limiting values at a constant rate is set as the constant A.

As a second method, the wheel drive force command values $Fxf^{*}$, $Fx_3^{*}$, and $Fx_4^{***}$ may be selected in the step S500 in the following manner.

Specifically, when the flag $flg_y$ is at unity, a vehicle lateral force realized by each set of the wheel drive forces $Fx/(n)$, $Fx_{y3}(n)$, and $Fx_{y4}(n)$ obtained in the step S100 and a vehicle lateral force realized by the dynamic wheel drive force target values $Fxf^{}$, $Fx_3^{}$, and $Fx_4^{**}$ obtained in the step S60 are calculated respectively in the manner described later.

When, for example, within the sets of $Fx_y f(n)$, $Fx_{y3}(n)$, and $Fx_{y4}(n)$, a set of the wheel drive forces is selected such that the error between the vehicle lateral force realized by the selected set of the wheel drive forces and the vehicle lateral force realized by the dynamic wheel drive force target values $Fxf^{}$, $Fx_3^{}$, and $Fx_4^{}$ reaches a minimum. The selected set of the wheel drive forces is output as the wheel drive force command values $Fxf^{*}$, $Fx_3^{*}$, and $Fx_4^{*}$.

When the flag $flg_y$ is at zero, $\lambda Fxf^{}$, $\lambda Fx_3^{}$, and $\lambda Fx_4^{}$ are set as the wheel drive force command values $Fxf^{*}$, $Fx_3^{*}$, and $Fx_4^{*}$.

Further, when sets of the wheel drive forces that realize a vehicle lateral force smaller than the vehicle lateral force realized by the dynamic wheel drive force target values $Fxf^{}$, $Fx_3^{}$, and $Fx_4^{}$ exist, it is preferable that a set of the wheel drive forces is selected from these sets such that the error between the vehicle lateral force realized by the selected set and the vehicle lateral force realized by $Fxf^{}$, $Fx_3^{}$, and $Fx_4^{}$ reaches a minimum, and the controller 8 outputs the selected set as the wheel drive force command values $Fxf^{*}$, $Fx_3^{*}$, and $Fx_4^{***}$. As a result, the vehicle speed tends to reduce and the driver can take safety measures easily when the vehicle encounters a hazard.

Now, a method will be described for calculating the vehicle front/aft force, the vehicle lateral force, and the vehicle yaw moment realized by the wheel drive forces. When the wheel drive forces Fxf, $Fx_3$, and $Fx_4$ are given, the vehicle front/aft force Fx, the vehicle lateral force Fy, and the vehicle yaw moment M realized by Fxf, $Fx_3$, and $Fx_4$ are calculated using the aforesaid equations (66)-(68).

If the flag $flg_y$ is at zero when determining the wheel drive force command values Fxf*, $Fx_3$*, and $Fx_4$*** using any of the above two methods in the step S500, the following processing is performed.

Specifically, when the $flg_y$ is at zero while the flag $flg_x$ is at unity, a set of the wheel drive forces is selected from the sets of the wheel drive forces $Fx_xf(l)$, $Fx_{x3}(l)$, and $Fx_{x4}(l)$ obtained in the step S100 such that the sum total of the square of the errors between the selected set of the wheel drive forces and the dynamic wheel drive force target values Fxf, $Fx_3$, and $Fx_4$ reaches a minimum and the selected set of the wheel drive forces is set as the wheel drive force command values Fxf*, $Fx_3$*, and $Fx_4$*.

When the $flg_y$ is at zero while the flag $flg_x$ is at zero, $\lambda$Fxf, $\lambda Fx_3$, and $\lambda Fx_4$ are set as the wheel drive force command values Fxf*, $Fx_3$* and $Fx_4$*.

As a third method, the wheel drive force command values Fxf*, $Fx_3$*, and $Fx_4$*** may be selected in the step S500 in the following manner.

The vehicle front/aft forces $Fx_x(l)$ and the vehicle lateral forces $Fy_x(l)$ realized by the sets of the wheel drive forces $Fx_xf(l)$, $Fx_{x3}(l)$, and $Fx_{x4}(l)$ obtained in the step S100 are calculated using the aforesaid equations (66) and (67). The vehicle front/aft forces Fxx(n) and the vehicle lateral forces Fyx(n) realized by the sets of the wheel drive forces $Fx_yf(n)$, $Fx_{y3}(n)$, and $Fx_{y4}(n)$ obtained in the step S100 are also calculated in the same manner.

Next, the vehicle front/aft force Fx and the vehicle lateral force Fy realized by the dynamic wheel drive force target values Fxf, $Fx_3$, $Fx_4$** obtained in the step S60 are calculated in a similar manner to the equations (66) and (67).

A set of the wheel drive forces realizing the vehicle front/aft force and the vehicle lateral force that minimize the evaluation coefficient J expressed by the aforesaid equations (69) and (70) is then selected from the sets of $Fx_xf(l)$, $Fx_{x3}(l)$, and $Fx_{x4}(l)$, and the sets of $Fx_yf(n)$, $Fx_{y3}(n)$, and $Fx_{y4}(n)$.

It should be noted that Qx, Qy in the equation (69) are weighted coefficients set equal to 0.1 and 1.0, respectively, in this embodiment.

The weighted coefficients Qx, Qy are set to have a characteristic preferred by the driver. For example, when the vehicle is advancing straight forward, Qx is preferably set to be greater than Qy. When the vehicle is making a turn, Qy is preferably set to be greater than Qx.

With respect to the evaluation function J expressed by the equations (69) and (70), a stability of the wheel drive force acting on each wheel is increased by further evaluating a sum total of the square of the errors between each set of $Fx_xf(l)$, $Fx_{x3}(l)$, and $Fx_{x4}(l)$ and the dynamic wheel drive force target values Fxf, $Fx_3$, and $Fx_4$ as well as a sum total of the square of the errors between each set of $Fx_yf(n)$, $Fx_{y3}(n)$, and $Fx_{y4}(n)$ and the dynamic wheel drive force target values Fxf, $Fx_3$, and $Fx_4$.

When the flag $flg_x$ is at zero and the flag $flg_y$ is at zero, $\lambda$Fxf, $\lambda Fx_3$, and $\lambda Fx_4$ are set as the wheel drive force command values Fxf*, $Fx_3$*, and $Fx_4$*, respectively.

In the step S130, the controller 8 controls the output torque of the internal combustion engine 10 and the electric motors 12, 15, 16, the speed ratio of the transmission 13, and engaging/disengaging of the clutch 11 such that the wheel drive force command values Fxf*, $Fx_3$*, and $Fx_4$*** are materialized.

As described above, according to this embodiment, the sets of the wheel drive forces $Fx_yf(k)$, $Fx_{y3}(k)$, and $Fx_{y4}(k)$ that realize the vehicle front/aft force Fx and the vehicle yaw moment M generated by the dynamic wheel drive force target values Fxf, $Fx_3$, and $Fx_4$ are determined. From these sets of the wheel drive forces $Fx_yf(k)$, $Fx_{y3}(k)$, and $Fx_{y4}(k)$, a set of the wheel drive forces in which the wheel drive forces fall into the respective limitation ranges defined by the upper limiting values $Fxf_{max}$, $Fx_{3max}$, and $Fx_{4max}$ and the lower limiting values $Fxf_{min}$, $Fx_{3min}$, $Fx_{4min}$, is set as the wheel drive force command values Fxf*, $Fx_3$*, and $Fx_4$*.

As a result, when the wheel drive force of each wheel has varied or is required to vary due to slippage in any of the wheels 1-4, overheating in any of the electric motors 12, 15, 16, and so on, especially in a turn during which an upset in the vehicle lateral force Fy and the vehicle yaw moment M causes a serious problem, the variation in the vehicle lateral force Fy and the vehicle yaw moment M is suppressed, and hence the driving performance of the vehicle is enhanced.

The vehicle lateral force Fy and the vehicle yaw moment M have strong mutual dependency. When a response of one of the vehicle lateral force Fy and the vehicle yaw moment M is determined, therefore, a response of the other is determined substantially.

This characteristic can be explained from the following equation (80) which defines a relationship between the vehicle yaw rate $\gamma$ and the vehicle centripetal acceleration $\alpha$. V in the equation (80) is a vehicle speed, and $\dot{\beta}$ is a time differential of the vehicle skid angle $\beta$.

$$\alpha = V \times (\gamma + \dot{\beta}) \quad (80)$$

As is clear from the equation (80), the degree of freedom between the vehicle yaw rate $\gamma$ and the vehicle centripetal acceleration $\alpha$ is only $\dot{\beta}$, and hence the vehicle yaw rate $\gamma$ and the vehicle centripetal acceleration $\alpha$ have strong mutual dependency. The vehicle yaw rate $\gamma$ is a value corresponding to a time integral of the vehicle yaw moment divided by the yaw moment of inertia. Since the vehicle centripetal acceleration $\alpha$ is substantially equal to the vehicle lateral force Fy when the vehicle skid angle fi is sufficiently small, the vehicle lateral force Fy and the vehicle yaw moment M are understood to have strong mutual dependency.

Due to the above reason, variations in the vehicle front/aft force Fx, the vehicle lateral force Fy, and the vehicle and the vehicle yaw moment M are suppressed in a situation where a drive force limitation is applied to each wheel except for a case where a steep turn with large $\dot{\beta}$ is performed and a case where the lane is changed. As a result, the driving performance of the vehicle is increased.

Further, a set of the wheel drive forces is selected from among the sets of the wheel drive forces $Fx_yf(n)$, $Fx_{y3}(n)$, $Fx_{y4}(n)$ in which the wheel drive forces reside within the respective limiting ranges defined by the upper limiting values $Fxf_{max}$, $Fx_{3max}$, and $Fx_{4max}$ and the lower limiting values $Fxf_{min}$, $Fx_{3min}$, and $Fx_{4min}$ such that the sum total of the square of the errors between the wheel drive forces and the target values reaches a minimum. As a result, control stability of the wheel drive force of each wheel is increased and the loads exerted on the electric motor 12, 15, 16 and the transmission 13 are reduced, thereby increasing the durability and the driving performance of the vehicle.

Still further, a set of the wheel drive forces is selected from among the sets of the wheel drive forces $Fx_yf(n)$, $Fx_{y3}(n)$, and $Fx_{y4}(n)$ such that the error between the vehicle lateral force realized by the selected set of the wheel drive forces and the vehicle lateral force realized by the dynamic wheel drive force target values Fxf, $Fx_3$, and $Fx_4$** reaches a minimum. As a result, the variation in the vehicle lateral force Fy is suppressed and the driving performance of the vehicle is increased.

Still further, the vehicle lateral force Fy and the vehicle yaw moment M generated by the dynamic wheel drive force target values Fxf, Fx$_3$, and Fx$_4$ is calculated and the sets of the wheel drive forces Fx$_x$f(j), Fx$_{x3}$(j), and Fx$_{x4}$(j) that can realize the vehicle lateral force Fy and the vehicle yaw moment M are obtained. A set of the wheel drive forces Fx$_x$f(l), Fx$_{x3}$(l), and Fx$_{x4}$(l) is further selected from the sets of Fx$_x$f(j), Fx$_{x3}$(j), and Fx$_{x4}$(j) on the condition that the wheel drive forces fall into the respective ranges defined by the upper limiting values Fxf$_{max}$, Fx$_{3max}$, and Fx$_{4max}$ and the lower limiting values Fxf$_{min}$, Fx$_{3min}$, and Fx$_{4min}$. When the flg$_y$ is at zero while the flag flg$_x$ is at unity, a set of the wheel drive forces is selected from the sets of the wheel drive forces Fx$_x$f(l), Fx$_{x3}$(l), and Fx$_{x4}$(l) such that the sum total of the square of the errors between the selected set of the wheel drive forces and the dynamic wheel drive force target values Fxf, Fx$_3$, and Fx$_4$ reaches a minimum and the selected set of the wheel drive forces is set as the wheel drive force command values Fxf*, Fx$_3$*, and Fx$_4$***. As a result, even when there is no set of wheel drive forces realizing the vehicle front/aft force Fx and the vehicle yaw moment M so as to ensure the wheel drive forces acting on the wheels to stay in the respective limiting ranges, the drive force is appropriately redistributed such that the driving performance of the vehicle is increased.

Still further, the vehicle front/aft force Fx$_x$(l) and the vehicle lateral force Fy$_x$(l) realized by the set of the wheel drive forces Fx$_x$f(l), Fx$_{x3}$(l), and Fx$_{x4}$(l) and the vehicle front/aft force Fxx(n) and the vehicle lateral force Fyx(n) realized by the set of the wheel drive forces Fx$_y$f(n), Fx$_{y3}$(n), and Fx$_{y4}$(n) are calculated respectively. The vehicle front/aft force Fx and the vehicle lateral force Fy realized by the dynamic wheel drive force target values Fxf, Fx$_3$, and Fx$_4$ are also calculated. The controller 8 calculates the differences between the vehicle front/aft force Fx$_x$(l) and the vehicle front/aft force Fx, the vehicle front/aft force Fxx(n) and the vehicle front/aft force Fx, the vehicle lateral force Fy$_x$(l) and the vehicle lateral force Fy, and the vehicle lateral force Fyx(n) and the vehicle lateral force Fy. The evaluation coefficient J is then calculated using these differences, and a set of the wheel drive forces realizing the vehicle front/aft force and the vehicle lateral force that minimize the evaluation coefficient J is selected as the wheel drive force command values Fxf*, Fx$_3$*, and Fx$_4$*.

Accordingly, in a case where a set of the wheel drive forces is selected for realizing the vehicle lateral force Fy and the vehicle yaw moment M, a set of the wheel drive forces that maintains the vehicle lateral force Fy and the vehicle yaw moment M can be applied as long as the variation amount in the vehicle front/aft force Fx is sufficiently small. In a case where a set of the wheel drive forces is selected for realizing the vehicle front/aft force Fx and the vehicle yaw moment M, a set of the wheel drive forces that maintain the vehicle front/aft force Fx and the vehicle yaw moment M can be applied as long as the variation amount in the vehicle lateral force Fy is sufficiently small. As a result, the driving performance of the vehicle is increased.

Still further, since a set of the wheel drive forces Fx$_y$f(k), Fx$_{y3}$(k), and Fx$_{y4}$(k) realizing the vehicle front/aft force Fx and the vehicle yaw moment M generated by the dynamic wheel drive force target values Fxf, Fx$_3$, and Fx$_4$** is calculated on the basis of the sensitivity K$_{fi}$, K$_{3y}$, K$_{4y}$ of the lateral forces acting on the respective wheels and a sensitivity K$_{fM}$, K$_{3M}$, K$_{4M}$ of the yaw moments acting on the respective wheels, a set of the wheel drive forces Fx$_y$f(k), Fx$_{y3}$(k) and Fx$_{y4}$(k) can be determined with a higher precision, thereby increasing the driving performance of the vehicle.

Still further, since the sets of the wheel drive forces Fx$_x$f(j), Fx$_{x3}$(j), and Fx$_{x4}$(j) realizing the vehicle lateral force Fy and the vehicle yaw moment M generated by the dynamic wheel drive force target values Fxf, Fx$_3$, and Fx$_4$** are calculated on the basis of the sensitivity K$_{fi}$, K$_{3y}$, K$_{4y}$ of the tire lateral force acting on each wheel and the sensitivity K$_{fM}$, K$_{3M}$, K$_{4M}$ of the yaw moment acting on each wheel, the sets of the wheel drive forces Fx$_x$f(j), Fx$_{x3}$(j), and Fx$_{x4}$(j) can be determined with a high precision, thereby increasing the driving performance of the vehicle.

The contents of Tokugan 2006-254108, with a filing date of Sep. 20, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, the controller 8 may be configured to calculate only one set of the wheel drive forces that realizes any of the vehicle lateral force Fy and the vehicle yaw moment M, the vehicle front/aft force Fx and the vehicle yaw moment M, and the relation ΔFx, ΔFy, ΔM=cos β:sin β:0, in the step S90.

In the first embodiment, priority is given to determining the wheel drive force command values Fxf*, Fx$_3$*, Fx$_4$* such that the vehicle lateral force Fy and the vehicle yaw moment M generated by the dynamic wheel drive force target values Fxf, Fx$_3$, and Fx$_4$ are realized. In the second embodiment, priority is given to determining the wheel drive force command values Fxf*, Fx$_3$*, Fx$_4$* such that the vehicle front/aft force Fx and the vehicle yaw moment M generated by the dynamic wheel drive force target values Fxf, Fx$_3$, and Fx$_4$, or the relation among the variation amounts ΔFx, ΔFy, ΔM in the vehicle front/aft force Fx, the vehicle lateral force Fy and the vehicle yaw moment M which satisfy ΔFx:ΔFy:ΔM=cos β:sin β:0, are realized.

It is possible to selectively apply the first embodiment and the second embodiment depending on the vehicle steering speed such that achieving the vehicle front/aft force Fx and the vehicle yaw moment M is given priority when the steering speed is high and achieving the vehicle lateral force Fy and the vehicle yaw moment M is given priority when the steering speed is low. Shifting the priority may also be performed by an operation of a switch performed by the driver of the vehicle.

In the first embodiment, this invention is applied to a vehicle in which the front wheels 1, 2, the right rear wheel 4, and the left rear wheel 3 are driven independently of each other. It is also possible to apply this invention to a vehicle in which the right front wheel 2, the left front wheel 1, and the rear wheels 3, 4 are driven independently of each other, by considering the wheel drive force characteristic of the rear wheels 3, 4 via the differential gear mechanism.

Figure 21:
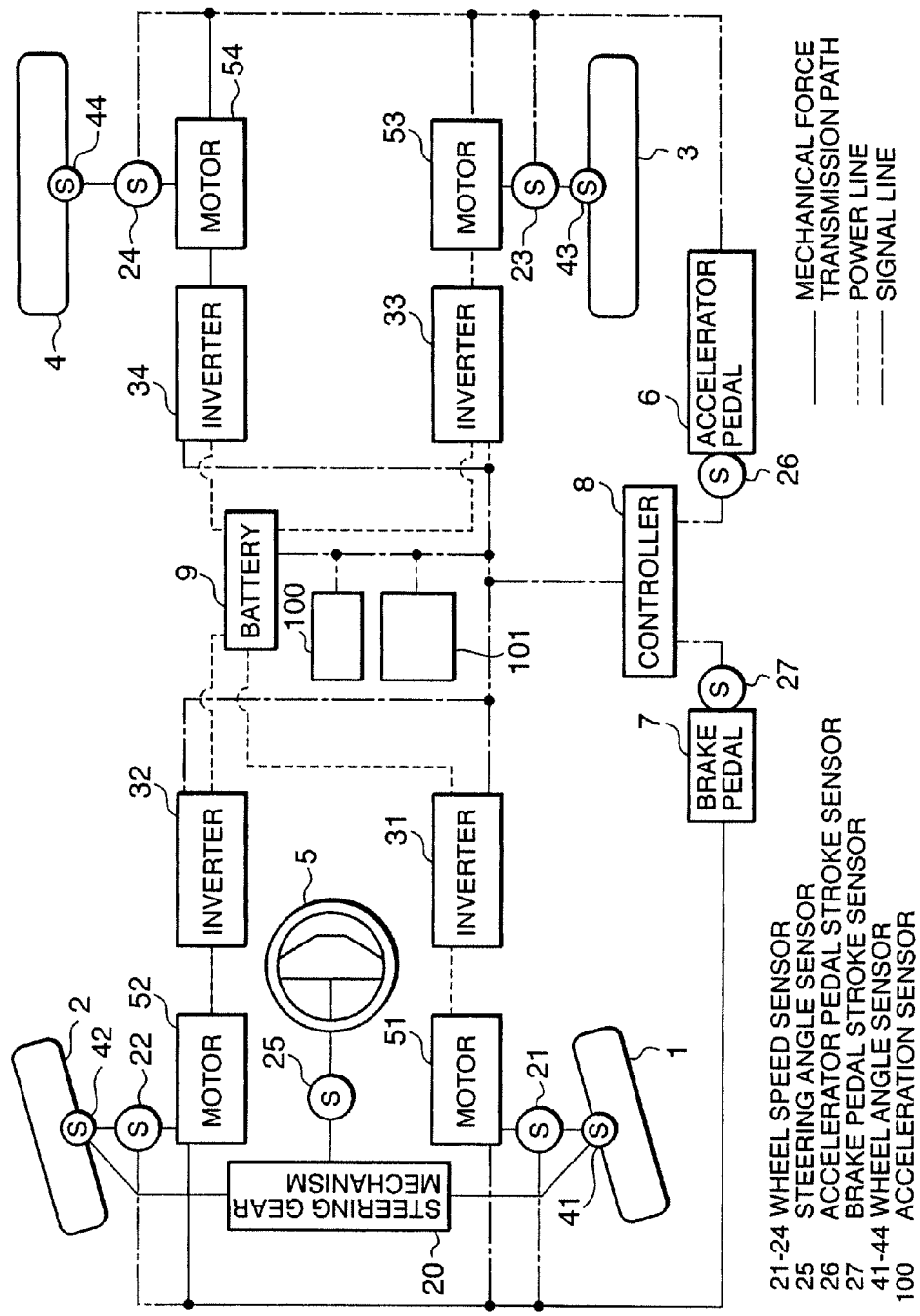
FIG. 21 is similar to FIG. 11, but shows another configuration of the four-wheel drive vehicle to which this invention can be applied.

This invention can also be applied to a four-wheel drive vehicle in which the right front wheel 2 is driven by an electric motor 52, the left front wheel 1 is driven by an electric motor 51, the right rear wheel 4 is driven by an electric motor 54, and the left rear wheel 4 is driven by an electric motor 53, as shown in FIG. 21.

What is claimed is:

1. A driving/braking force control system for a vehicle having at least a pair of a right wheel and a left wheel which are independently controlled, comprising:

a driving/braking force regulating mechanism configured to apply a wheel driving/braking force to each of the wheels; and
a programmable controller programmed to:
set dynamic wheel driving/braking force target values on the basis of a present operation state;
calculate a vehicle front/aft force, a vehicle lateral force and a vehicle yaw moment as parameters representing vehicle behavior generated by the dynamic wheel driving/braking force target values;
calculate a wheel driving/braking force limiting range for each of the dynamic wheel driving/braking force target values;
determine, when one of the dynamic wheel driving/braking force target values is not within the wheel driving/braking force limiting range, a vehicle behavior variation amount target value that is based at least on variation amount target values of the vehicle front/aft force, the vehicle lateral force, and the vehicle yaw moment, the vehicle behavior variation amount target value being determined so as to maintain a ratio between the variation amount of the vehicle front/aft force and the variation amount of the vehicle lateral force maintained at cos β/sin β, where β is a vehicle skid angle;
calculate a variation in a tire lateral force of each wheel accompanying a variation in the wheel driving/braking force of each wheel on the basis of a sensitivity of the tire lateral force of each wheel;
calculate a plurality of sets of wheel driving/braking forces that achieve the vehicle behavior variation amount target value even when a variation in the tire lateral force of each wheel accompanying a variation in the wheel driving/braking force of each wheel occurs;
select a set of wheel driving/braking forces from the plurality of sets of wheel driving/braking forces as wheel driving/braking force command values such that each of the wheel driving/braking forces in the selected set is within the driving/braking force limiting range; and
control the driving/braking force regulating mechanism to apply wheel driving/braking forces to the right wheel and the left wheel according to the wheel driving/braking force command values.

2. The driving/braking force control system as defined in claim 1, wherein the controller is further programmed to determine the vehicle behavior variation amount target value which can suppress a variation in the vehicle lateral force and a variation in the vehicle yaw moment generated by the dynamic wheel driving/braking force target values.

3. The driving/braking force control system as defined in claim 1, wherein the controller is further programmed to determine the vehicle behavior variation amount target value which can suppress a variation in the vehicle front/aft force and a variation in the vehicle yaw moment generated by the dynamic wheel driving/braking force target values.

4. The driving/braking force control system as defined in claim 1, wherein the controller is further programmed to determine the vehicle behavior variation amount target value which can suppress a variation in the vehicle skid angle and a variation in the vehicle yaw moment generated by the dynamic wheel driving/braking force target values.

5. A driving/braking force control system for a vehicle having at least a pair of a right wheel and a left wheel which are independently controlled, comprising:
a driving/braking force regulating mechanism which applies a wheel driving/braking force to each of the wheels; and
a programmable controller programmed to:
set dynamic wheel driving/braking force target values on the basis of a present operation state;
calculate a vehicle front/aft force, a vehicle lateral force and a vehicle yaw moment as parameters representing vehicle behavior generated by the dynamic wheel driving/braking force target values;
calculate a wheel driving/braking force limiting range for each of the dynamic wheel driving/braking force target values;
determine, when one of the dynamic wheel driving/braking force target values is not within the wheel driving/braking force limiting range, a vehicle behavior variation amount target value which is represented by a ratio of variation amount target values of the vehicle front/aft force, the vehicle lateral force, and the vehicle yaw moment;
calculate a variation in a tire lateral force of each wheel accompanying a variation in the wheel driving/braking force of each wheel on the basis of a sensitivity of the tire lateral force of each wheel;
calculate a plurality of sets of wheel driving/braking forces that achieve the vehicle behavior variation amount target value even when a variation in the tire lateral force of each wheel accompanying a variation in the wheel driving/braking force of each wheel occurs;
select a set of wheel driving/braking forces from the plurality of sets of wheel driving/braking forces as wheel driving/braking force command values such that each of the wheel driving/braking forces in the selected set is within the driving/braking force limiting range; and
control the driving/braking force regulating mechanism to apply wheel driving/braking forces to the right wheel and the left wheel according to the wheel driving/braking force command values,
wherein the controller is further programmed to determine the vehicle behavior variation amount target value which can suppress a variation in the vehicle skid angle and a variation in the vehicle yaw moment generated by the dynamic wheel driving/braking force target values, and
wherein the controller is further programmed to determine the vehicle behavior variation amount target value which can suppress the variation in the vehicle yaw moment while maintaining a ratio between the variation amount of the vehicle front/aft force and the variation amount of the vehicle lateral force maintained at cos β/sin β, where β is a vehicle skid angle.

6. The driving/braking force control system as defined in claim 1, wherein the controller is further programmed to determine the wheel driving/braking force command values by multiplying the dynamic wheel driving/braking force target values by a positive decreasing constant when one of the wheel driving/braking force command values is not within the wheel driving/braking force limiting range.

7. The driving/braking force control system as defined in claim 1, wherein the controller is further programmed to determine the vehicle behavior variation amount target value on the basis of an operation state of the vehicle.

8. The driving/braking force control system as defined in claim 1, wherein the controller is further programmed to select a set of the wheel driving/braking forces such that a deviation of the wheel driving/braking forces in the selected set from the dynamic wheel driving/braking force target values is minimal when plural sets of the wheel driving/braking forces exist within the driving/braking force limiting range.

9. A driving/braking force control system for a vehicle having at least a pair of a right wheel and a left wheel which are independently controlled, comprising:
- means for regulating a wheel driving/braking force which is applied to each of the wheels;
- means for setting dynamic wheel driving/braking force target values on the basis of a present operation state;
- means for calculating a vehicle front/aft force, a vehicle lateral force and a vehicle yaw moment as parameters representing vehicle behavior generated by the dynamic wheel driving/braking force target values;
- means for calculating a wheel driving/braking force limiting range for each of the dynamic wheel driving/braking force target values;
- means for determining, when one of the dynamic wheel driving/braking force target values is not within the wheel driving/braking force limiting range, a vehicle behavior variation amount target value that is based at least on variation amount target values of the vehicle front/aft force, the vehicle lateral force and the vehicle yaw moment, the vehicle behavior variation amount target value being determined so as to maintain a ratio between the variation amount of the vehicle front/aft force and the variation amount of the vehicle lateral force maintained at cos $\beta$/sin $\beta$, where $\beta$ is a vehicle skid angle;
- means for calculating a variation in a tire lateral force of each wheel accompanying a variation in the wheel driving/braking force of each wheel on the basis of a sensitivity of the tire lateral force of each wheel;
- means for calculating a plurality of sets of wheel driving/braking forces that achieve the vehicle behavior variation amount target value even when a variation in the tire lateral force of each wheel accompanying a variation in the wheel driving/braking force of each wheel occurs;
- means for selecting a set of wheel driving/braking forces from the plurality of sets of wheel driving/braking forces as driving/braking force command values such that each of the wheel driving/braking forces in the selected set is within the driving/braking force limiting range; and
- means for controlling the driving/braking force regulating to apply wheel driving/braking forces to the right wheel and the left wheel according to the wheel driving/braking force command values.

10. A driving/braking force control method for a vehicle having at least a pair of a right wheel and a left wheel which are independently controlled, and a driving/braking force regulating mechanism which applies a wheel driving/braking force to each of the wheels, the method comprising:
- setting dynamic wheel driving/braking force target values on the basis of a present operation state;
- calculating a vehicle front/aft force, a vehicle lateral force and a vehicle yaw moment as parameters representing vehicle behavior generated by the wheel dynamic driving/braking force target values;
- calculating a wheel driving/braking force limiting range for each of the dynamic wheel driving/braking force target values;
- determining, when one of the dynamic wheel driving/braking force target values is not within the wheel driving/braking force limiting range, a vehicle behavior variation amount target value that is based at least on variation amount target values of the vehicle front/aft force, the vehicle lateral force and the vehicle yaw moment, the vehicle behavior variation amount target value being determined so as to maintain a ratio between the variation amount of the vehicle front/aft force and the variation amount of the vehicle lateral force maintained at cos $\beta$/sin $\beta$, where $\beta$ is a vehicle skid angle;
- calculating a variation in a tire lateral force of each wheel accompanying a variation in the wheel driving/braking force of each wheel on the basis of a sensitivity of the tire lateral force of each wheel;
- calculating a plurality of sets of wheel driving/braking forces that achieve the vehicle behavior variation amount target value even when a variation in the tire lateral force of each wheel accompanying a variation in the wheel driving/braking force of each wheel occurs;
- selecting a set of wheel driving/braking forces from the plurality of sets of the wheel driving/braking forces as driving/braking force command values such that each of the wheel driving/braking forces in the selected set is within the driving/braking force limiting range; and
- controlling the driving/braking force regulating mechanism to apply wheel driving/braking forces to the right wheel and the left wheel according to the wheel driving/braking force command values.

11. A driving/braking force control system for a vehicle having at least a pair of a right wheel and a left wheel which are independently controlled, comprising:
- a driving/braking force regulating mechanism which applies a wheel driving/braking force to each of the wheels; and
- a programmable controller programmed to:
    - set dynamic wheel driving/braking force target values on the basis of a present operation state;
    - calculate a vehicle front/aft force, a vehicle lateral force and a vehicle yaw moment as parameters representing vehicle behavior generated by the dynamic wheel driving/braking force target values;
    - calculate a wheel driving/braking force limiting range for each of the dynamic wheel driving/braking force target values;
    - determine, when one of the dynamic wheel driving/braking force target values is not within the wheel driving/braking force limiting range, a vehicle behavior variation amount target value which is represented by a ratio of variation amount target values of the vehicle front/aft force, the vehicle lateral force, and the vehicle yaw moment;
    - calculate a variation in a tire lateral force of each wheel accompanying a variation in the wheel driving/braking force of each wheel on the basis of a sensitivity of the tire lateral force of each wheel;
    - calculate a plurality of sets of wheel driving/braking forces that achieve the vehicle behavior variation amount target value even when a variation in the tire lateral force of each wheel accompanying a variation in the wheel driving/braking force of each wheel occurs;
    - select a set of wheel driving/braking forces from the plurality of sets of wheel driving/braking forces as wheel driving/braking force command values such that each of the wheel driving/braking forces in the selected set is within the driving/braking force limiting range; and
    - control the driving/braking force regulating mechanism to apply wheel driving/braking forces to the right wheel and the left wheel according to the wheel driving/braking force command values,
- wherein the controller is further programmed to determine the wheel driving/braking force command values by multiplying the dynamic wheel driving/braking force target values by a positive decreasing constant when one of the wheel driving/braking force command values is not within the wheel driving/braking force limiting range.

12. A driving/braking force control system for a vehicle having at least a pair of a right wheel and a left wheel which are independently controlled, comprising:
- a driving/braking force regulating mechanism configured to apply a wheel driving/braking force to each of the wheels; and
- a programmable controller programmed to:
  - set dynamic wheel driving/braking force target values on the basis of a present operation state;
  - calculate a vehicle front/aft force, a vehicle lateral force and a vehicle yaw moment as parameters representing vehicle behavior generated by the dynamic wheel driving/braking force target values;
  - calculate a wheel driving/braking force limiting range for each of the dynamic wheel driving/braking force target values;
  - determine, when one of the dynamic wheel driving/braking force target values is not within the wheel driving/braking force limiting range, a vehicle behavior variation amount target value that is based at least on variation amount target values of the vehicle front/aft force, the vehicle lateral force, and the vehicle yaw moment;
  - calculate a variation in a tire lateral force of each wheel accompanying a variation in the wheel driving/braking force of each wheel on the basis of a sensitivity of the tire lateral force of each wheel;
  - calculate a plurality of sets of wheel driving/braking forces that achieve the vehicle behavior variation amount target value even when a variation in the tire lateral force of each wheel accompanying a variation in the wheel driving/braking force of each wheel occurs;
  - select a set of wheel driving/braking forces from the plurality of sets of wheel driving/braking forces as wheel driving/braking force command values such that each of the wheel driving/braking forces in the selected set is within the driving/braking force limiting range, the wheel driving/braking force command values being determined by multiplying the dynamic wheel driving/braking force target values by a positive decreasing constant when one of the wheel driving/braking force command values is not within the wheel driving/braking force limiting range; and
  - control the driving/braking force regulating mechanism to apply wheel driving/braking forces to the right wheel and the left wheel according to the wheel driving/braking force command values.

13. The driving/braking force control system as defined in claim 12, wherein the controller is further programmed to determine the vehicle behavior variation amount target value which can suppress a variation in the vehicle lateral force and a variation in the vehicle yaw moment generated by the dynamic wheel driving/braking force target values.

14. The driving/braking force control system as defined in claim 12, wherein the controller is further programmed to determine the vehicle behavior variation amount target value which can suppress a variation in the vehicle front/aft force and a variation in the vehicle yaw moment generated by the dynamic wheel driving/braking force target values.

15. The driving/braking force control system as defined in claim 12, wherein the controller is further programmed to determine the vehicle behavior variation amount target value which can suppress a variation in the vehicle skid angle and a variation in the vehicle yaw moment generated by the dynamic wheel driving/braking force target values.

16. The driving/braking force control system as defined in claim 12, wherein the controller is further programmed to determine the vehicle behavior variation amount target value which can suppress the variation in the vehicle yaw moment while maintaining a ratio between the variation amount of the vehicle front/aft force and the variation amount of the vehicle lateral force maintained at $\cos \beta / \sin \beta$, where $\beta$ is a vehicle skid angle.

17. The driving/braking force control system as defined in claim 12, wherein the controller is further programmed to determine the vehicle behavior variation amount target value on the basis of an operation state of the vehicle.

18. The driving/braking force control system as defined in claim 12, wherein the controller is further programmed to select a set of the wheel driving/braking forces such that a deviation of the wheel driving/braking forces in the selected set from the dynamic wheel driving/braking force target values is minimal when plural sets of the wheel driving/braking forces exist within the driving/braking force limiting range.

* * * * *